(12) United States Patent
Hirota et al.

(10) Patent No.: US 6,708,486 B2
(45) Date of Patent: Mar. 23, 2004

(54) EXHAUST GAS PURIFICATION DEVICE OF INTERNAL COMBUSTION ENGINE

(75) Inventors: Shinya Hirota, Susono (JP); Toshiaki Tanaka, Numazu (JP); Shunsuke Toshioka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 54 days.

(21) Appl. No.: 10/259,560

(22) Filed: Sep. 30, 2002

(65) Prior Publication Data

US 2003/0066287 A1 Apr. 10, 2003

(30) Foreign Application Priority Data

Oct. 4, 2001 (JP) ........................................ 2001-309110

(51) Int. Cl.7 ................................................. F01N 3/00
(52) U.S. Cl. .......................... 60/297; 60/286; 60/292; 60/287; 60/295; 60/303; 60/324; 55/DIG. 30
(58) Field of Search .......................... 60/284, 285, 286, 60/278, 280, 287, 288, 292, 295, 297, 300, 303, 301, 324; 55/DIG. 30, 483, 484, 524; 423/213.2, 213.5

(56) References Cited

U.S. PATENT DOCUMENTS 5,701,735 A * 12/1997 Kawaguchi ................ 60/274
5,715,677 A * 2/1998 Wallman et al. ............ 60/274
5,853,459 A * 12/1998 Kuwamoto et al. ......... 95/273
5,974,791 A * 11/1999 Hirota et al. ............... 60/276
6,568,178 B2 * 5/2003 Hirota et al. ............... 60/297

FOREIGN PATENT DOCUMENTS

| JP | B2 7-106290 | 11/1995 |
| JP | A 2000-186537 | 7/2000 |
| JP | A 2000-345831 | 12/2000 |

* cited by examiner

Primary Examiner—Binh Tran
(74) Attorney, Agent, or Firm—Oliff & Berridge, PLC

(57) ABSTRACT

A pair of particulate filters arranged in parallel in an exhaust passage and a combustion device for supplying to the filters exhaust gas having a temperature elevation capability higher than the temperature elevation capability of the engine exhaust gas able to raise the filter temperature are provided. An $NO_x$ catalyst and oxidizing substance are carried on each filter. When the $NO_x$ absorbed in an $NO_x$ catalyst should be reduced, the flow of engine exhaust gas into the filter carrying the $NO_x$ catalyst for reduction of the $NO_x$ is suppressed and a rich air-fuel ratio exhaust gas is supplied from the combustion device to the filter so that the filter temperature is maintained higher than a particulate continuous oxidation temperature in the $NO_x$ reduction temperature range.

19 Claims, 45 Drawing Sheets

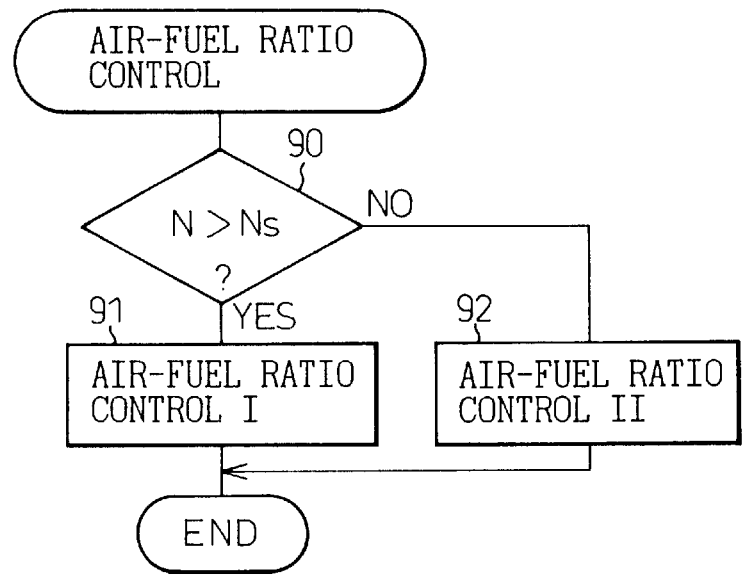
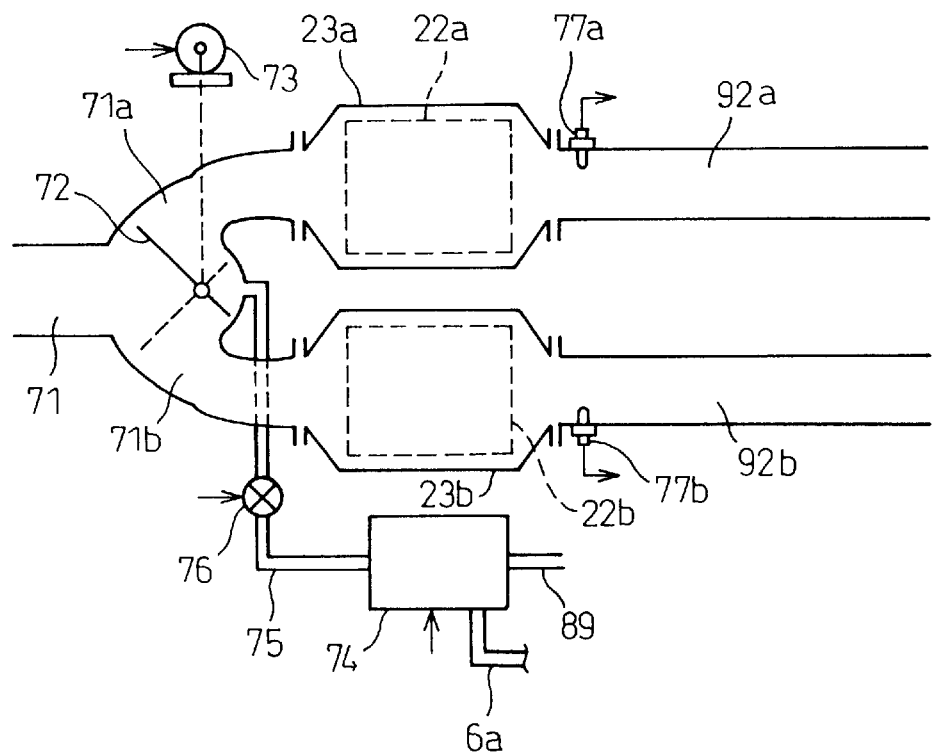

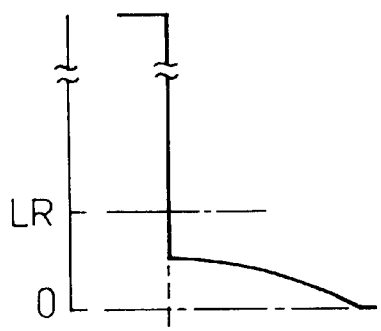
Fig.28A [O₂]
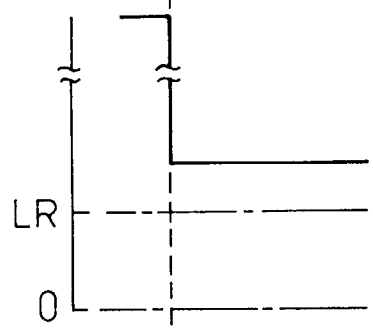
Fig.28B [O₂]
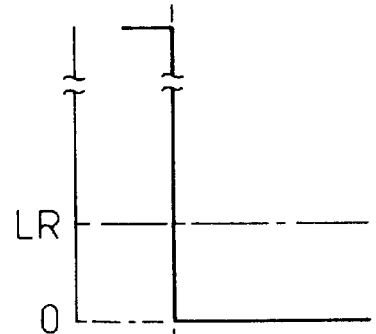
Fig.28C [O₂]
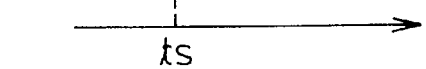
Fig.28D  t Fig.30A [O₂]
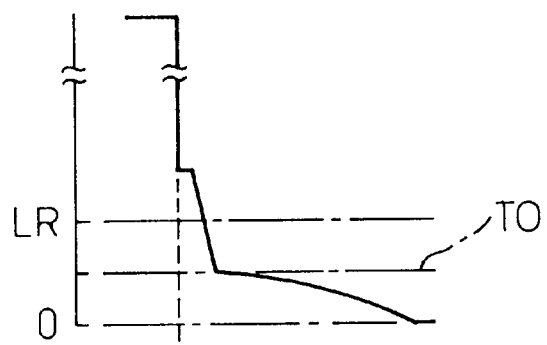
Fig.30B [O₂]
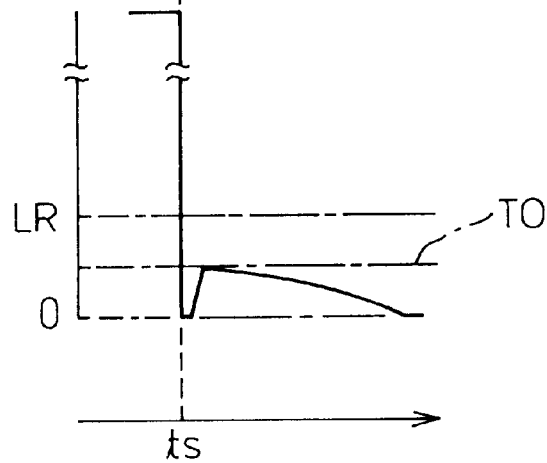
Fig.30C  t

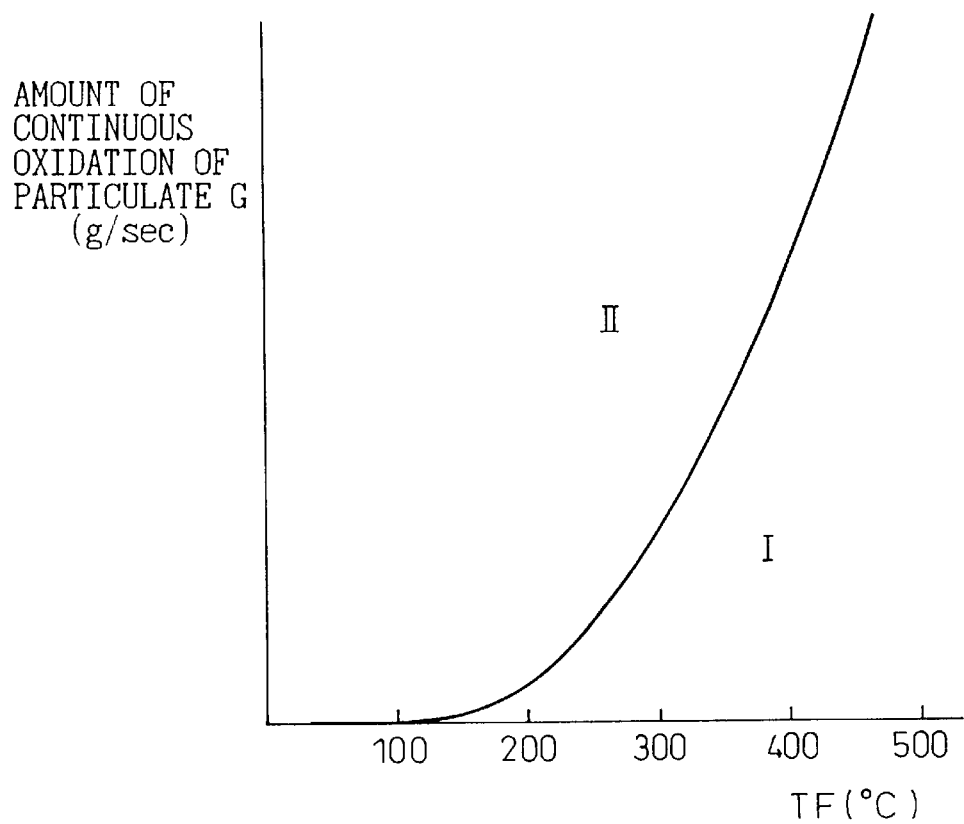

Fig.46
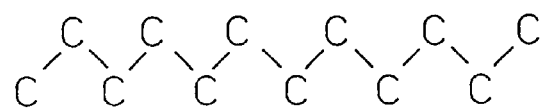
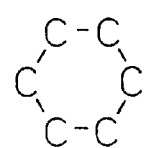 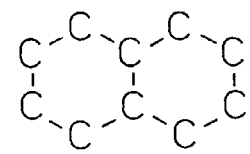
Fig.47
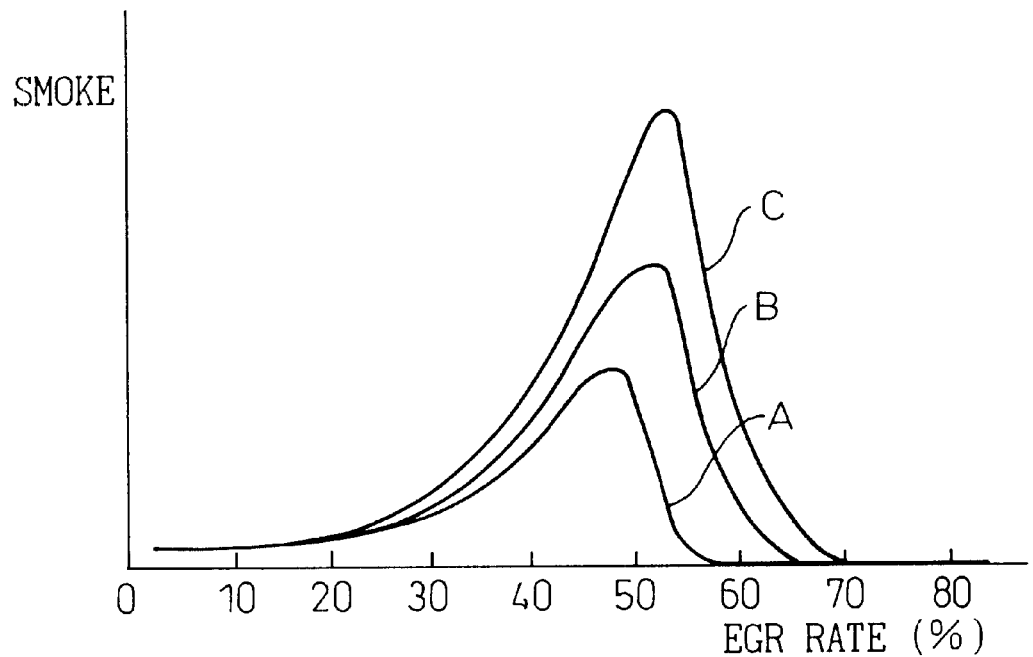

EXHAUST GAS PURIFICATION DEVICE OF INTERNAL COMBUSTION ENGINE

BACKGROUND OF THE INVENTION

1. Field of the Invention

The present invention relates to an exhaust gas purification device of an internal combustion engine.

2. Description of the Related Art

A particulate filter which carries an active oxygen release agent for releasing active oxygen and an $NO_x$ catalyst for purifying $NO_x$ has already been filed (Japanese Patent Application No. 2000-122409). An active oxygen release agent oxidizes and removes the particulate trapped on a particulate filter by active oxygen continuously in a short time. On the other hand, when the air-fuel ratio of the inflowing exhaust gas is lean, the catalyst absorbs the $NO_x$ in the exhaust gas, while when the air-fuel ratio of the inflowing exhaust gas becomes rich, it releases the absorbed $NO_x$ and reduces and purifies the $NO_x$ by the hydrocarbons in the exhaust gas.

Now, the particulate filter described in the above patent application continuously oxidizes a greater amount of particulate per unit time the higher the temperature (hereinafter referred to as "the filter temperature"). That is, the amount of the particulate which can be oxidized and removed continuously by the particulate filter described in the above patent application (hereinafter referred to as "the unit amount of continuous oxidation of particulate") becomes greater the higher the filter temperature. Therefore, there is a temperature at which the particulate in the inflowing exhaust gas can be continuously removed by oxidation in accordance with the unit amount of inflowing particulate for the particulate filter described in the above patent application (hereinafter referred to as "the continuous oxidation temperature of the particulate").

Therefore, the above patent application calls for the filter temperature to be controlled so that the filter temperature becomes higher than the particulate continuous oxidation temperature so that the unit amount of continuous oxidation of particulate becomes greater than the amount of particulate flowing into the particulate filter per unit time (hereinafter referred to as "the unit amount of inflowing particulate").

On the other hand, the $NO_x$ catalyst described in the above patent application absorbs the $NO_x$ once in advance while the air-fuel ratio of the inflowing exhaust gas is lean and releases, reduces, and purifies the absorbed $NO_x$ when the air-fuel ratio of the inflowing exhaust gas becomes rich. Therefore, to maintain the $NO_x$ purification rate of the $NO_x$ catalyst high as a whole, it is necessary to maintain the $NO_x$ absorption rate of the $NO_x$ catalyst high. Here, the $NO_x$ catalyst can absorb the $NO_x$ at a high absorption rate when its temperature is within a certain temperature range (hereinafter referred to as the "$NO_x$ absorption temperature range"). Therefore, to maintain the $NO_x$ purification rate of the $NO_x$ catalyst high, it is necessary to maintain the filter temperature in the $NO_x$ absorption temperature range.

Therefore, the above patent application calls for the filter temperature to be controlled so that the temperature of the $NO_x$ catalyst is kept within the above $NO_x$ absorption temperature range when controlling the filter temperature so that the unit amount of continuous oxidation of the particulate becomes greater than the unit amount of inflowing particulate.

That is, the above patent application calls for the filter temperature to be controlled so that the filter temperature becomes higher than the particulate continuous oxidation temperature in the $NO_x$ absorption temperature range so as to maintain the particulate oxidation removal level and $NO_x$ purification level of the particulate filter at high levels.

Further, the above patent application calls for the temperature of the exhaust gas emitted from the internal combustion engine to be raised and the particulate filter to be heated by that high temperature exhaust gas so that the filter temperature becomes higher than the particulate continuous oxidation temperature in the $NO_x$ absorption temperature range when the filter temperature becomes lower than the low temperature of the $NO_x$ absorption temperature range or becomes lower than the particulate continuous oxidation temperature.

In the above patent application, however, when the $NO_x$ absorbed in the $NO_x$ catalyst should be reduced and purified, rich air-fuel ratio exhaust gas is supplied to the particulate filter, whereby $NO_x$ is made to be released from the $NO_x$ catalyst and the released $NO_x$ is reduced and purified by the hydrocarbons (HC) in the exhaust gas. The $NO_x$ catalyst described in the above patent application, however, can reduce and purify the $NO_x$ when its temperature is within a certain temperature range (hereinafter referred to as the "$NO_x$ reduction temperature range").

Therefore, to reduce the $NO_x$ with a high reduction rate, when supplying rich air-fuel ratio exhaust gas to the particulate filter, it is necessary that the filter temperature be kept in this $NO_x$ reduction temperature range. Further, even while reducing and purifying the $NO_x$, a continuous oxidation and removal action of the particulate trapped on the particulate filter is preferable for maintaining the particulate oxidation removal level high.

In the particulate filter described in the above patent application, however, nothing at all is described regarding the point of control of the filter temperature during $NO_x$ reduction and purification. Therefore, there is room left for raising the particulate oxidation removal level and $NO_x$ purification level further even for the particulate filter described in the above patent application.

Therefore, an object of the present invention is to provide an exhaust gas purification device provided with particulate filters which can continuously oxidize and remove particulate and purify $NO_x$ where the particulate oxidation removal level and the $NO_x$ purification level are improved.

SUMMARY OF THE INVENTION

A first aspect of the invention for solving the above problems provides an exhaust gas purification device of an internal combustion engine provided with a pair of particulate filters arranged in parallel in an engine exhaust passage, an exhaust flow switching means for switching almost all of the engine exhaust gas emitted from an engine to cause it to flow into one of the particulate filters, and a combustion device for feeding to a particulate filter an exhaust gas having a higher temperature elevation capability than a temperature elevation capability of an engine exhaust gas able to cause the temperature of the particulate filters to rise, an $NO_x$ catalyst able to absorb $NO_x$ in the exhaust gas when an air-fuel ratio of the inflowing exhaust gas is lean and to release the absorbed $NO_x$ when the air-fuel ratio of the inflowing exhaust gas becomes rich so as to enable the $NO_x$ to be reduced and purified by hydrocarbons in the exhaust gas and an oxidizing substance able to continuously oxidize and remove particulate being carried in the particulate filters, said $NO_x$ catalyst being able to release and reduce $NO_x$ when its temperature is in an $NO_x$ reduction temperature range, and said oxidizing substance being able to continuously oxidize and remove almost all inflowing particulate when the temperature of said oxidizing substance is higher than a particulate continuous oxidation temperature, characterized by being provided with a reduction judging means for judging if the $NO_x$ absorbed in the $NO_x$ catalyst should be reduced, suppressing by said exhaust flow switching means the inflow of engine exhaust gas to the one of the particulate filters carrying the $NO_x$ catalyst for which it is judged the $NO_x$ absorbed in the $NO_x$ catalyst should be reduced when it is judged by said reduction judging means that the $NO_x$ absorbed in the NC should be reduced, and feeding rich air-fuel ratio exhaust gas to said particulate filter from a combustion device so that the temperature of said particulate filter is maintained higher the particulate continuous oxidation temperature in a $NO_x$ reduction temperature range. That is, according to the present invention, rich air-fuel ratio is fed from the combustion device to a particulate filter in a state where the amount of the engine exhaust gas flowing into the particulate filter is reduced so that the temperature of the particulate filter is maintained higher than the particulate continuous oxidation temperature in the $NO_x$ reduction temperature range.

A second aspect of the invention provides the first aspect of the invention characterized by suppressing the inflow of engine exhaust gas to said particulate filter by said exhaust flow switching means when it is judged by said reduction judging means the $NO_x$ absorbed in the $NO_x$ catalyst should be reduced and when the temperature of the one of the particulate filters carrying the $NO_x$ catalyst for which it is judged that said $NO_x$ should be reduced is lower than a low temperature of the $NO_x$ reduction temperature range, feeding a rich air-fuel ratio exhaust gas having a concentration of oxygen higher than a predetermined concentration from said combustion device to said particulate filter to raise the temperature of said particulate filter to within the $NO_x$ reduction temperature range when the temperature of said combustion device is lower than said predetermined concentration, and feeding to said particulate filter a rich air-fuel ratio exhaust gas having a concentration of oxygen lower than said predetermined concentration from said combustion device when the temperature of said particulate filter becomes in the $NO_x$ reduction temperature range. According to this, rich air-fuel ratio exhaust gas for reducing the $NO_x$ is fed to the particulate filter only when the temperature of the particulate filter is in the $NO_x$ reduction temperature range.

A third aspect of the invention provides the first aspect of the invention characterized, when it is judged by said reduction judging means that the $NO_x$ absorbed in the $NO_x$ catalyst should be reduced, by suppressing the inflow of engine exhaust gas to the one of the particulate filters provided with the $NO_x$ for which it is judged said $NO_x$ should be reduced and feeding lean air-fuel ratio exhaust gas from said combustion device to said particulate filter to make the temperature of said particulate filter rise to within the $NO_x$ reduction temperature range when the temperature of said one particulate filter is lower than the low temperature of the $NO_x$ reduction temperature range and feeding rich air-fuel ratio exhaust gas from said combustion device to said particulate filter when the temperature of said particulate filter becomes within the $NO_x$ reduction temperature range. According to this, rich air-fuel ratio exhaust gas for reducing the $NO_x$ is fed to a particulate filter only when the temperature of the particulate filter is in the $NO_x$ reduction temperature range.

A fourth aspect of the invention provides the first aspect of the invention characterized by feeding lean air-fuel ratio exhaust gas from said combustion device to said particulate filter when the reduction of the $NO_x$ absorbed in the $NO_x$ catalyst is completed. According to this, when the reduction of the $NO_x$ absorbed in the $NO_x$ catalyst is completed, the hydrocarbons deposited on a particulate filter are burned off by the lean air-fuel ratio exhaust gas fed from the combustion device to the particulate filter.

A fifth aspect of the invention provides one of the first to fourth aspects of the invention characterized by being provided with an air-fuel ratio sensor able to detect the air-fuel ratio of the exhaust gas flowing out from a particulate filter and controlling the air-fuel ratio of the exhaust gas being fed from said combustion device to said particulate filter based on the output of said air-fuel ratio sensor.

A sixth aspect of the invention provides the first aspect of the invention characterized by suppressing the inflow of engine exhaust gas to one of the particulate filters by said exhaust flow switching means at the time of engine startup and feeding exhaust gas from said combustion device to said one particulate filter to make the temperature of said one particulate filter rise. According to this, exhaust gas is fed from the combustion device to a particulate filter in a state where the amount of the engine exhaust gas flowing into the particulate filter is reduced.

A seventh aspect of the invention provides the sixth aspect of the invention characterized by being provided with an engine operation controlling means for selectively executing a first engine operation where the engine operation is controlled based on a required torque and engine speed and a second engine operation where an engine exhaust gas having a temperature higher than the temperature of the engine exhaust gas emitted from the engine when said first engine operation is executed is made to be emitted from the engine and by executing second engine operation control by said engine operation controlling means to make the temperature of the other particulate filter rise at the time of engine startup. That is, according to this, one of the particulate filters is fed with exhaust gas from the combustion device, while the other of the particulate filters is supplied with engine exhaust gas from the engine.

An eighth aspect of the invention provides the first aspect of the invention characterized by having said $NO_x$ catalyst able to absorb a sulfur ingredient in the exhaust gas when the air-fuel ratio of the inflowing exhaust gas is lean and to release the absorbed sulfur ingredient when the air-fuel ratio of the inflowing exhaust gas becomes rich and its temperature is higher than a sulfur ingredient release temperature where the absorbed sulfur ingredient can be released; being provided with a sulfur ingredient release judging means for judging whether the sulfur ingredient absorbed in the $NO_x$ catalyst should be released from the $NO_x$ catalyst; causing the temperature of said particulate filter to rise to a sulfur ingredient release temperature when it is judged by said sulfur ingredient release judging means that the sulfur ingredient absorbed in the $NO_x$ catalyst should be released and the temperature of the one of the particulate filters for which it is judged that the sulfur ingredient should be released is lower than a sulfur ingredient release temperature and suppressing the inflow of engine exhaust gas to said particulate filter by said exhaust flow switching means and feeding rich air-fuel ratio exhaust gas from said combustion device to said particulate filter when the temperature of said particulate filter reaches the sulfur ingredient release temperature.

A ninth aspect of the invention provides the first aspect of the invention characterized by having said $NO_x$ catalyst able to absorb a sulfur ingredient in the exhaust gas when the air-fuel ratio of the inflowing exhaust gas is lean and to release the absorbed sulfur ingredient when the air-fuel ratio of the inflowing exhaust gas becomes rich and its temperature is higher than a sulfur ingredient release temperature where the absorbed sulfur ingredient can be released; being provided with a sulfur ingredient release judging means for judging whether the sulfur ingredient absorbed in the $NO_x$ catalyst should be released from the $NO_x$ catalyst; causing the temperature of said particulate filter to rise to a sulfur ingredient release temperature when it is judged by said sulfur ingredient release judging means that the sulfur ingredient absorbed in the $NO_x$ catalyst should be released and the temperature of the one of the particulate filters for which it is judged that the sulfur ingredient should be released is lower than a sulfur ingredient release temperature and suppressing the inflow of engine exhaust gas to said particulate filter by said exhaust flow switching means and alternately feeding rich air-fuel ratio exhaust gas and lean air-fuel ratio exhaust gas from said combustion device to said particulate filter when the temperature of said particulate filter reaches the sulfur ingredient release temperature. According to this, after the temperature of a particulate filter reaches the sulfur ingredient release temperature, the sulfur ingredient is released from the $NO_x$ catalyst while the rise of that temperature is suppressed.

A 10th aspect of the invention provides the ninth aspect of the invention characterized by maintaining the air-fuel ratio of the exhaust gas fed from said combustion device to the particulate filter lean when the sulfur ingredient is being released from the $NO_x$ catalyst and the engine speed becomes smaller than a predetermined value.

An 11th aspect of the invention provides the eighth or ninth aspect of the invention characterized by being provided with an engine operation controlling means for selectively executing a first engine operation where engine operation is controlled based on a required torque and engine speed and a second engine operation for making the engine emit an engine exhaust gas having a temperature higher than the temperature of the engine exhaust gas emitted from the engine when said first engine operation is executed and by executing the second engine operation by said engine operation controlling means so as to make the temperature of the one of the particulate filters for which it is judged that said sulfur ingredient should be released rise to the sulfur ingredient release temperature when it is judged by said sulfur ingredient release judging means that the sulfur ingredient absorbed in the $NO_x$ catalyst should be released.

A 12th aspect of the invention provides any one of the first to 11th aspects of the invention characterized by having said combustion device take in engine exhaust gas and cause the fuel to burn by the oxygen in said engine exhaust gas.

A 13th aspect of the invention provides the 12th aspect of the invention characterized by having an air feeding means for feeding air into the engine exhaust gas which said combustion device takes in.

A 14th aspect of the invention provides any one of the first to 11th aspects of the invention characterized by having said combustion device take in air and take in exhaust gas.

A 15th aspect of the invention provides the 14th aspect of the invention characterized by having said combustion device take in exhaust gas flowing out from a particulate filter.

A 16th aspect of the invention provides any one of the first to 11th aspects of the invention characterized by being provided with outflow suppressing means for suppressing the outflow of exhaust gas from downstream of a particulate filter and by suppressing the output of exhaust gas to downstream of one of the particulate filters by said outflow suppressing means when suppressing the inflow of engine exhaust gas to said one of the particulate filters by said exhaust flow switching means.

A 17th aspect of the invention provides the 16th aspect of the invention characterized by being provided with a pressure sensor for detecting a pressure in a particulate filter, detecting by a pressure sensor the pressure in one of the particulate filters when suppressing the inflow of engine exhaust gas to said one of the particulate filters by said exhaust flow switching means and suppressing the outflow of exhaust gas from downstream of said one of the particulate filters by said outflow suppressing means, and controlling the degree of suppression of outflow by said outflow suppressing means so that the pressure in said one of the particulate filters does not exceed a pressure so high as to inhibit operation of the combustion device.

An 18th aspect of the invention provides the first aspect of the invention characterized by separately extending engine exhaust passages of a downstream side of the particulate filters over at least predetermined distances from said particulate filters and setting said predetermined distances to distances where the engine exhaust gas flowing out from the other of the particulate filters will not flow to one of the particulate filters from downstream when suppressing the inflow of engine exhaust gas to one of the particulate filters by said exhaust flow switching means so as to cause almost all of the engine exhaust gas to flow into the other of the particulate filters.

The 19th aspect of the invention provides the first aspect of the invention characterized in that a check valve for preventing back flow of an exhaust gas from a particulate filter to the combustion device is arranged in an exhaust feed passage feeding exhaust gas from said combustion device to the particulate filter.

BRIEF DESCRIPTION OF THE DRAWINGS

The present invention may be more fully understood from the description of the preferred embodiments of the invention set forth below together with the accompanying drawings, in which:

FIG. 11 is a flow chart for execution of air-fuel ratio control.

FIG. 12 is a view showing exhaust gas purification device of another embodiment.

FIGS. 28A–28D are time charts showing change of oxygen concentration.

FIGS. 30A–30C are time charts showing change of oxygen concentration.

FIG. 43 is a view showing relationship between unit amount of continuous oxidation of particulate and temperature of particulate filter.

FIG. 46 is a view showing fuel molecule.

FIG. 47 is a view showing relationship between amount of production of smoke and EGR rate.

DESCRIPTION OF THE PREFERRED EMBODIMENTS

Figure 1:
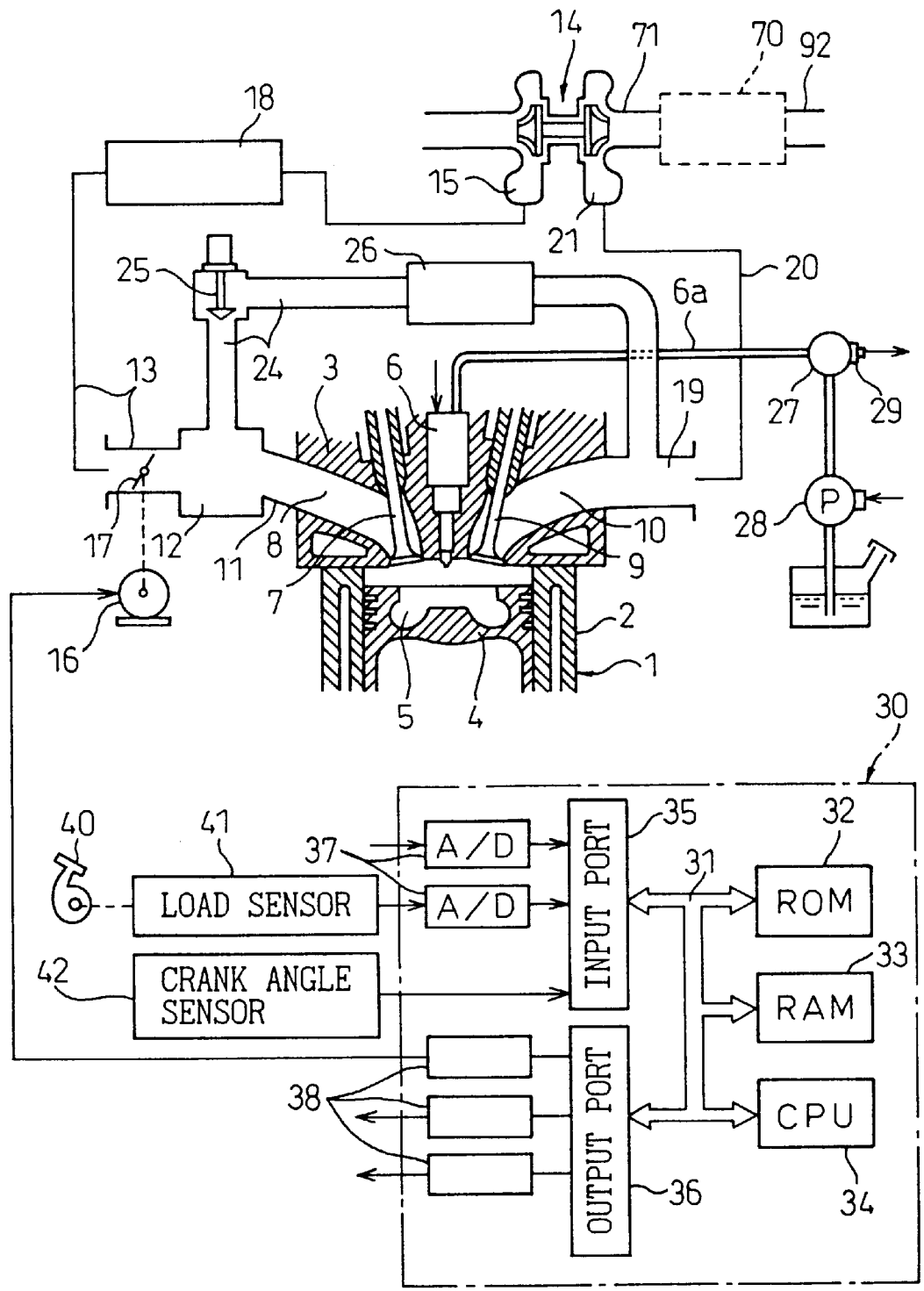
FIG. 1 is a view of internal combustion engine.

The present invention will be described next with reference to the illustrated embodiments. FIG. 1 shows the case of application of the present invention to a compression ignition-type internal combustion engine. Note that the present invention can also be applied to a spark ignition-type internal combustion engine, in particular a direct injection gasoline engine. Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected to a compressor 15 of an exhaust turbo charger 14 through an intake duct 13.

Inside the intake duct 13 is arranged a throttle valve 17 driven by a step motor 16. Further, around the intake duct 13 is arranged a cooling device 18 for cooling the intake air flowing through the intake duct 13. In the embodiment shown in FIG. 1, engine coolant water is led into the cooling device 18 and intake air is cooled by this engine coolant water. On the other hand, the exhaust port 10 is connected to an exhaust turbine 21 of the exhaust turbo charger 14 through an exhaust manifold 19 and exhaust pipe 20. The outlet of the exhaust turbine 21 is connected to an exhaust gas purification device 70 through an engine exhaust passage 71.

Figure 2:
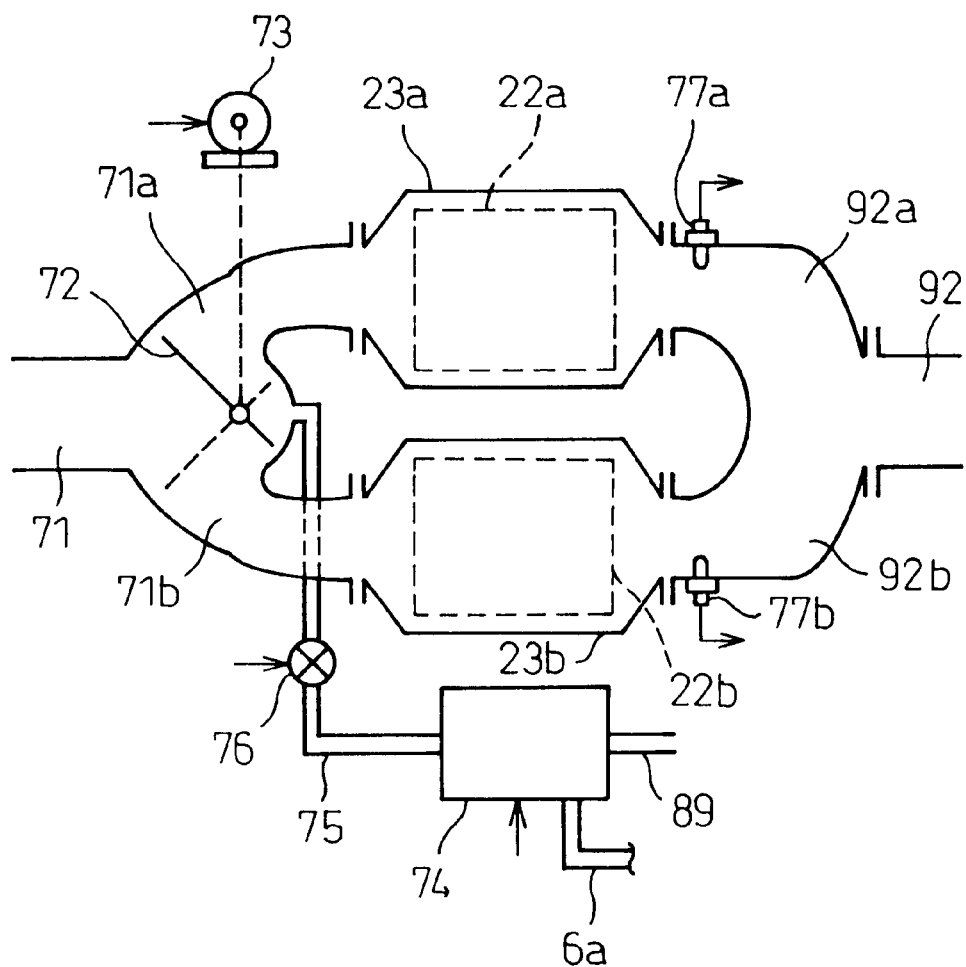
FIG. 2 is a view of exhaust gas purification device.

Details of the exhaust gas purification device 70 are shown in FIG. 2. Referring to FIG. 2, the engine exhaust passage 71 is branched into a pair of exhaust branch passages 71a and 71b. The first exhaust branch passage 71a has connected to it a first casing 23a serving as part of the engine exhaust passage 71, while the second exhaust branch passage 71b similar has a second casing 23b connected to it serving as part of the engine exhaust passage 71. The first casing 23a houses a first particulate filter 22a, while the second casing 23b houses a second particulate filter 22b. Therefore, the exhaust gas purification device 70 has a pair of particulate filters 22a and 22b arranged in parallel in the exhaust gas purification device 70.

The particulate filters 22a and 22b trap particulate in the exhaust gas and carry an oxidizing substance able to continuously oxidize and remove the trapped particulate. The configuration and action of this oxidizing substance will be explained in detail later, but explaining the action simply here, the oxidizing substance is able to oxidize the particulate when its temperature becomes higher than a certain temperature. The amount of particulate which can be oxidized per unit time (hereinafter called "the unit amount of continuous oxidation of particulate") becomes greater the higher the temperature.

Therefore, if the filter temperature is maintained at a temperature where the unit amount of continuous oxidation of particulate becomes greater than the amount of particulate flowing into the particulate filters 22a and 22b per unit time (hereinafter referred to as the "particulate continuous oxidation temperature"), the oxidizing substance can oxidize and remove almost all of the particulate flowing into the particulate filters 22a and 22b.

Further, the particulate filters 22a and 22b carry a $NO_x$ catalyst able to purify $NO_x$. The configuration and action of this $NO_x$ catalyst will be explained in detail later, but explaining the action simply here, the $NO_x$ catalyst can absorb the $NO_x$ in the exhaust gas when the air-fuel ratio of the inflowing exhaust gas when its temperature is within a certain temperature range (hereinafter referred to as "the $NO_x$ absorption temperature range") is lean and release the absorbed $NO_x$ and reduce and purify the $NO_x$ by the unburned hydrocarbons (HC) in the exhaust gas when the air-fuel ratio of the inflowing exhaust gas when its temperature is in a certain temperature range (hereinafter referred to as "the $NO_x$ reduction temperature range") becomes rich.

Upstream of the particulate filters 22a and 22b at the region where the engine exhaust passage 71 is branched into the pair of exhaust branch passages 71a and 71b (hereinafter referred to as "the exhaust passage branching region") is arranged a switch valve 72. The switch valve 72 has a step motor 73 connected to it. The switch valve 72 can switch the operating state between the operating state shown by the solid line in FIG. 2 (hereinafter referred to as "the first operating state") and the operating state shown by the broken line in FIG. 2 (hereinafter referred to as "the second operating state").

When the operating state of the switch valve 72 is the first operating state, the first exhaust branch passage 71a upstream of the first particulate filter 22a (hereinafter referred to as "the first upstream side exhaust branch passage") is shut and conversely the second exhaust branch passage 71b upstream of the second particulate filter 22b (hereinafter referred to as "the second upstream side exhaust branch passage") is opened. Therefore, when the operating state of the switch valve 72 is the first operating state, almost all of the exhaust gas emitted from the combustion chamber 5 of the internal combustion engine (hereinafter referred to as "the engine exhaust gas") flows into the second particulate filter 22b and almost none of the engine exhaust gas flows into the first particulate filter 22a. That is, when the operating state of the switch valve 72 is the first operating state, the switch valve 72 suppresses the flow of engine exhaust gas into the first particulate filter 22a and causes almost all of the engine exhaust gas to flow into the second particulate filter 22b.

On the other hand, when the operating state of the switch valve 72 is the second operating state, the switch valve 72 suppresses the flow of engine exhaust gas into the second particulate filter 22b and causes almost all of the engine exhaust gas to flow into the first particulate filter 22a.

On the other hand, when the operating state of the switch valve 72 is positioned right between the first operating state and the second operating state (hereinafter referred to as "the neutral operating state"), the engine exhaust gas flows substantially equally to the two particulate filters 22a and 22b.

The exhaust gas purification device 70 has a combustion type heater 74 as the combustion device emitting exhaust gas when burning fuel. The combustion type heater 74 has connected to it the same fuel feed pipe 6a as the fuel feed pipe 6a for feeding fuel to the engine body 1 and an air feed pipe 89. The combustion type heater 74 is fed fuel through the fuel feed pipe 6a and is fed air through the air feed pipe 89.

Further, the combustion type heater 74 is connected to the exhaust passage branching region through the exhaust feed pipe 75. It is possible to feed exhaust gas to the exhaust passage branching region through this exhaust feed pipe 75. The exhaust feed pipe 75 has arranged at it a check valve 76 able to shut the exhaust feed pipe 75 so as to prevent back flow of the exhaust gas from the exhaust passage branching region to the combustion type heater 74 through the exhaust feed pipe 75. The check valve 76 is closed and shuts the exhaust feed pipe 75 when the combustion type heater 74 is not operating.

The combustion type heater 74 can control the amount of air taken in through the air feed pipe 89 and the amount of fuel mixed with this air so as to emit exhaust gas of different air-fuel ratios. Further, the temperature elevation capability by which the exhaust gas emitted from the combustion type heater 74 (hereinafter referred to as "the heater exhaust gas") can raise the temperature of a particulate filter is higher than the temperature elevation capability by which the engine exhaust gas can raise the temperature of a particulate filter. That is, the heater exhaust gas can raise the temperature of a particulate filter more efficiently than the engine exhaust gas from the viewpoints of the amount of fuel required for raising the temperature of the particulate filter and the time.

When the operating state of the switch valve 72 is the first operating state, the heater exhaust gas is fed to the first particulate filter 22a. On the other hand, when the operating state of the switch valve 72 is the second operating state, the heater exhaust gas is fed to the second particulate filter 22b. On the other hand, when the operating state of the switch valve 72 is the neutral operating state, the heater exhaust gas is equally fed to the two particulate filters 22a and 22b. Note that the operating state of the switch valve 72 normally is made the neutral operating state.

The exhaust branch passages 92a and 92b downstream of the casings 23a and 23b (hereinafter referred to as "the downstream side exhaust branch passages") have arranged at them temperature sensors 77a and 77b for detecting the temperature of the exhaust gas flowing out from the particulate filters 22a and 22b so as to estimate the temperatures of the corresponding particulate filters 22a and 22b. Further, the downstream side exhaust branch passages 92a and 92b are merged and connected to a common engine exhaust passage 92.

Note that the combustion type heater 74 may be a heater of a type simply burning fuel (hydrocarbons), but for example may also be a catalyst burner having an oxidation catalyst. This catalyst burner has the advantage of easy ignitability even with little oxygen. Further, the combustion type heater 74 of the present embodiment generates a rich air-fuel ratio exhaust gas by combustion at a rich air-fuel ratio. Instead of this combustion type heater, however, it is also possible to employ a device which generates, as a gas able to perform a similar role as the role played by the rich air-fuel ratio exhaust gas generated from the combustion type heater 74 in the particulate filter, a gas including vaporized light oil or a gas including hydrolyzed light oil.

Further, the combustion type heater 74 of the present embodiment is of a type which breaks down the fuel (hydrocarbons) at a high temperature and performs combustion generating exhaust gas containing a relatively large amount of carbon monoxide (CO) when producing a rich air-fuel ratio exhaust gas. According to this type of combustion type heater 74, when the rich air-fuel ratio exhaust gas from the combustion type heater 74 is fed to the particulate filter and the HC and $NO_x$ in the exhaust gas are reduced and reacted in a particulate filter, the heat of reaction of the HC and $NO_x$ becomes smaller. According to this, the filter temperature becoming high all at once and the $NO_x$ being released all at once from the $NO_x$ catalyst is suppressed. If a large amount of $NO_x$ being released from a $NO_x$ catalyst all at once is suppressed in this way, the flow of $NO_x$ from the particulate filter downstream without being reduced by the HC is suppressed.

Referring again to FIG. 1, the exhaust manifold 19 and the surge tank 12 are connected through an exhaust gas recirculation (EGR) passage 24. The EGR passage 24 has arranged inside it an EGR control valve 25. Further, the EGR passage 24 has arranged around it a cooling device 26 for cooling the EGR gas flowing inside the EGR passage 24. In the embodiment shown in FIG. 1, the engine coolant water is guided inside the cooling device 26 and the EGR gas is cooled by the engine coolant water.

On the other hand, fuel injectors 6 are connected to a fuel reservoir, a so-called common rail 27, through fuel feed pipes 6a. Fuel is fed into the common rail 27 from an electrically controlled variable discharge fuel pump 28. The fuel fed into the common rail 27 is fed to the fuel injectors 6 through the fuel feed pipes 6a. The common rail 27 has a fuel pressure sensor 29 attached to it for detecting the fuel pressure in the common rail 27. The discharge of the fuel pump 28 is controlled based on the output signal of the fuel pressure sensor 29 so that the fuel pressure in the common rail 27 becomes a target fuel pressure.

An electronic control unit 30 is comprised of a digital computer provided with a ROM (read only memory) 32, RAM (random access memory) 33, CPU (microprocessor) 34, input port 35, and output port 36 connected to each other through a bidirectional bus 31. The output signals of the fuel pressure sensor 29 and temperature sensors 77a and 77b are input through corresponding AD converters 37 to the input port 35.

An accelerator pedal 40 has connected to it a load sensor 41 generating an output voltage proportional to the amount of depression L of the accelerator pedal 40. The output voltage of the load sensor 41 is input to the input port 35 through the corresponding AD converter 37. Further, the input port 35 has connected to it a crank angle sensor 42 generating an output pulse each time a crankshaft rotates by for example 30 degrees.

On the other hand, the output port 36 is connected to the fuel injectors 6, a throttle valve driving step motor 16, EGR control valve 25, fuel pump 28, and switch valve 72 driving step motor.

In this embodiment, however, at the time of normal engine operation other than at the later explained $NO_x$ reduction processing, S-ingredient release processing, temperature elevation processing, etc., the operating state of the switch valve 72 is made either the first operating state or the second operating state. For example, when the operating state of the switch valve 72 is the first operating state, almost all of the engine exhaust gas flows into the second particulate filter 22b, so the particulate in the engine exhaust gas is trapped at the second particulate filter 22b. Here, if the temperature of the particulate filter 22b is higher than the particulate continuous oxidation temperature, the trapped particulate is continuously oxidized and removed in the second particulate filter 22b.

Further, in the internal combustion engine of the present embodiment, the engine is made to operate by a lean air-fuel ratio at the major portion of the engine operating regions. Therefore, since the air-fuel ratio of the engine exhaust gas is lean in the major portion of the engine operating regions, when for example the operating state of the switch valve 72 is the first operating state, the $NO_x$ in the engine exhaust gas flowing into the second particulate filter 22b is absorbed by the $NO_x$ catalyst of the second particulate filter 22b if the temperature of the second particulate filter 22b is in the $NO_x$ absorption temperature range.

Note that however there is a limit to the amount of $NO_x$ which a $NO_x$ catalyst can absorb. Therefore, if the operating state of the switch valve 72 is the first operating state over a certain constant period, the amount of the $NO_x$ absorbed by the $NO_x$ catalyst of the second particulate filter 22b (hereinafter referred to as "the second $NO_x$ catalyst") ends up reaching the $NO_x$ absorption limit of the second $NO_x$ catalyst. Of course, when the operating state of the switch valve 72 is the second operating state over a certain constant period, the amount of the $NO_x$ absorbed in the $NO_x$ catalyst of the first particulate filter 22a (hereinafter referred to as "the first $NO_x$ catalyst") ends up reaching the $NO_x$ absorption limit of the first $NO_x$ catalyst.

In this case, since the $NO_x$ catalyst of the particulate filter can no longer absorb $NO_x$, if the engine exhaust gas continues to flow into the particulate filter, $NO_x$ will end up flowing out downstream from the exhaust gas purification device 70. Due to this reason, to suppress the flow of $NO_x$ downstream from the exhaust gas purification device 70, it is desirable to reduce and purify the $NO_x$ absorbed in the $NO_x$ catalysts before the $NO_x$ absorbed in the $NO_x$ catalysts reaches the $NO_x$ absorption limit.

Therefore, in this embodiment, in the configuration shown in FIG. 2, the following $NO_x$ purification processing is executed. That is, in the $NO_x$ purification processing of the present embodiment, when it is judged that the $NO_x$ absorbed in a $NO_x$ catalyst should be reduced while the operating state of the switch valve 72 is made either the operating state of the first operating state and the second operating state, the operating state of the switch valve 72 is switched, the inflow of engine exhaust gas to the particulate filter provided with the $NO_x$ catalyst for which it was judged the $NO_x$ should be reduced is suppressed, then the check valve 76 is opened, the combustion type heater 74 is operated, and rich air-fuel ratio exhaust gas is fed from the combustion type heater 74 to that particulate filter.

If rich air-fuel ratio heater exhaust gas is fed to a particulate filter in this way, the atmosphere in the particulate filter will become a rich atmosphere. At this time, if the temperature of the particulate filter (hereinafter referred to as "the filter temperature") is within the $NO_x$ reduction temperature range, the $NO_x$ will be released from the $NO_x$ catalyst and the released $NO_x$ will be reduced and purified by the HC in the heater exhaust gas. Therefore, in the $NO_x$ purification processing of the present embodiment, the filter temperature is controlled so that the filter temperature is kept within the $NO_x$ reduction temperature range while rich air-fuel ratio heater exhaust gas is being fed to the particulate filter. If doing this, the $NO_x$ released from the $NO_x$ catalyst is reliably reduced. Therefore, according to the present embodiment, the $NO_x$ purification level of the exhaust gas purification device is maintained high overall.

Further, as explained above, the oxidizing substance of a particulate filter can continuously oxidize and remove almost all of the particulate flowing into the particulate filter when its temperature is at least the particulate continuous oxidation temperature. Even when exhaust gas is being fed from the combustion type heater 74 to the particulate filter, regardless of the quantity, since particulate flows into the particulate filter, it is desirable that the filter temperature be maintained higher than the particulate continuous oxidation temperature during the $NO_x$ purification processing so as to maintain the particulate oxidation removal level of the particulate filter high.

Therefore, in the $NO_x$ purification processing of the present embodiment, the filter temperature is maintained higher than the particulate continuous oxidation temperature in the $NO_x$ reduction temperature range while a rich air-fuel ratio heater exhaust gas is being fed to the particulate filter. If doing this, particulate is continuously oxidized and removed even during $NO_x$ purification processing. Therefore, according to the present embodiment, the particulate oxidation removal level of the exhaust gas purification device is maintained high overall.

Note that in the $NO_x$ purification processing of the present embodiment, whether or not the $NO_x$ absorbed in a $NO_x$ catalyst should be reduced is judged based on whether the total amount of $NO_x$ absorbed in the $NO_x$ catalyst (hereinafter referred to as "the total amount of absorbed $NO_x$") has reached the $NO_x$ absorption limit of the $NO_x$ catalyst. Here, as means for calculating the total amount of absorbed $NO_x$, there are the following:

That is, the amount of $NO_x$ absorbed in a particulate filter per unit time (hereinafter referred to as "the unit amount of $NO_x$ absorption") can be estimated from the amount of $NO_x$ released from the internal combustion engine per unit time (hereinafter referred to as "the unit amount of $NO_x$ release). The unit amount of $NO_x$ release is a function of the engine speed and the engine torque. Therefore, by finding the unit amount of $NO_x$ absorption by experiments etc. as a function of the engine speed and the engine torque, storing it in advance in the ROM as a map of a function with the engine speed and engine torque, and cumulatively adding the unit amounts $NO_x$ absorption calculated using this map, it is possible to calculate the total amount of absorbed $NO_x$.

Figure 3:
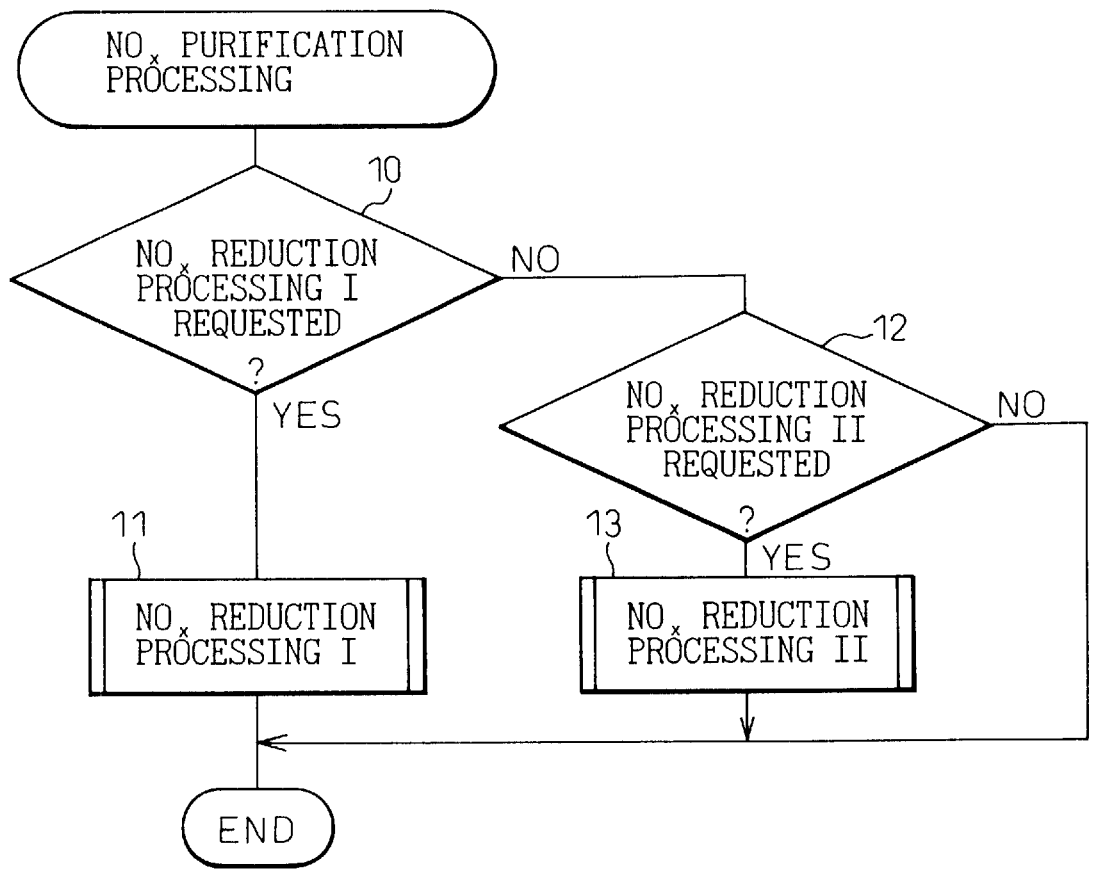
FIG. 3 is a flow chart for execution of $NO_x$ purification processing.
Figure 4:
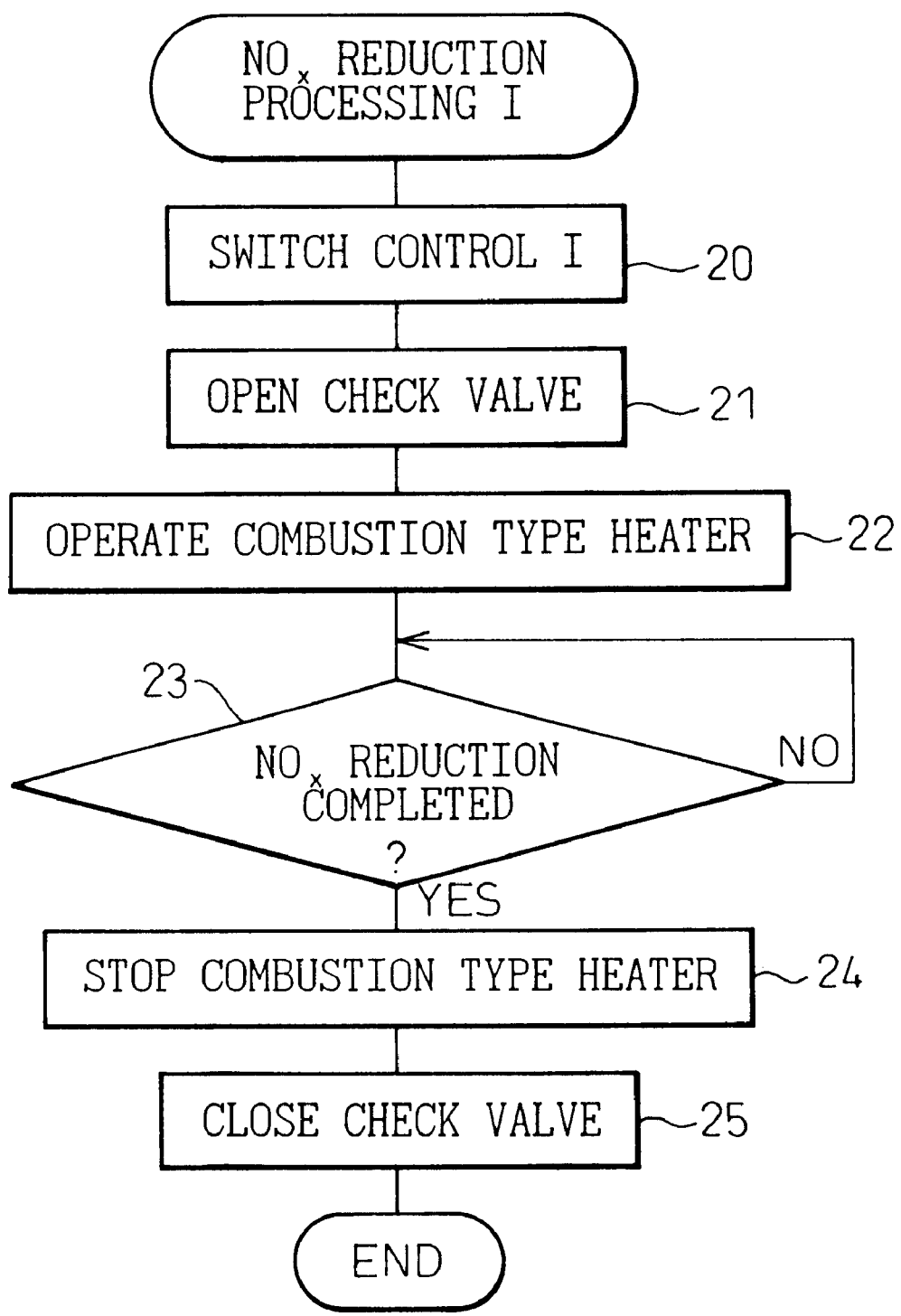
FIG. 4 is a flow chart for execution of $NO_x$ reduction processing I.
Figure 5:
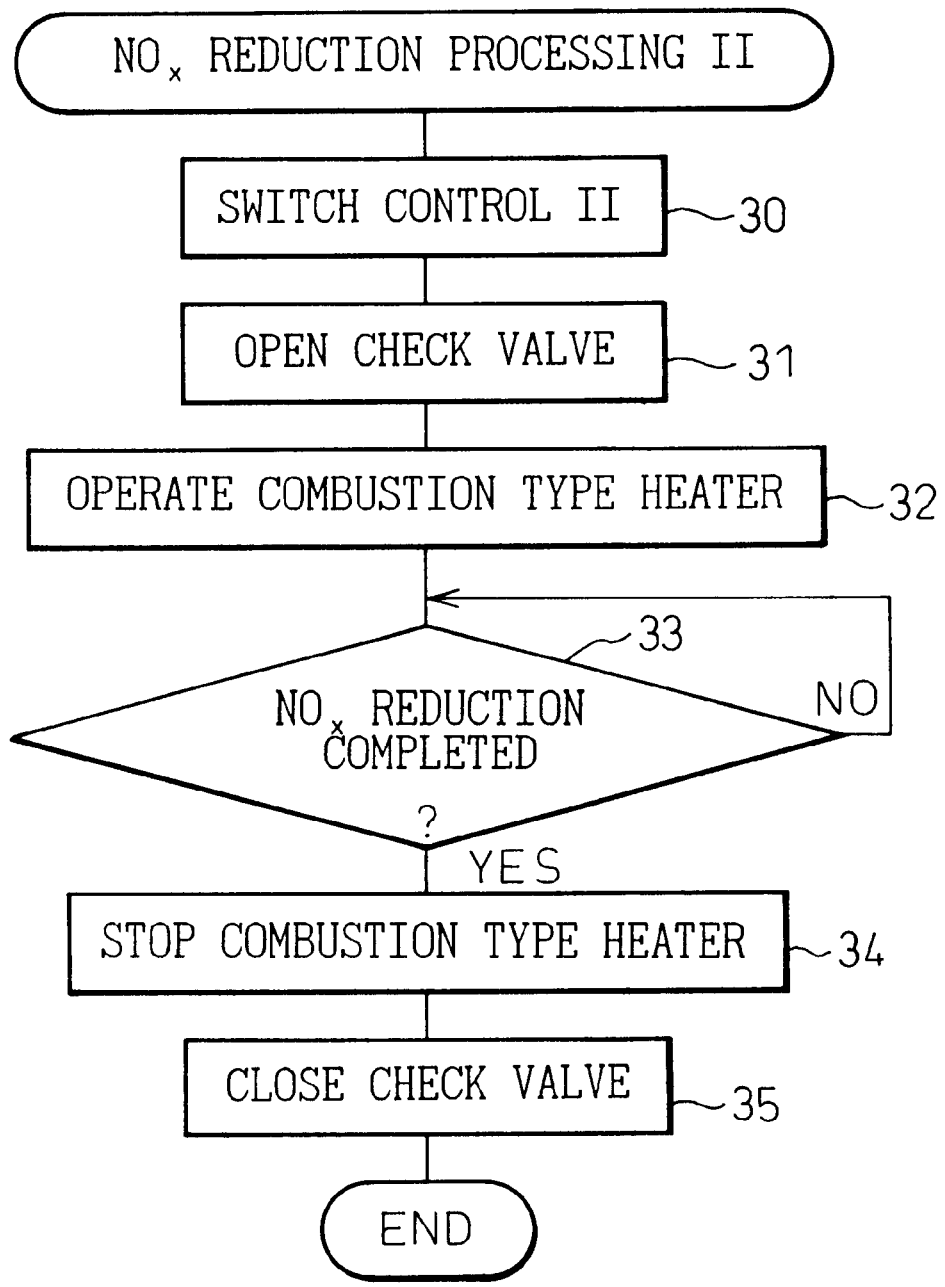
FIG. 5 is a flow chart for execution of $NO_x$ reduction processing II.

An example of the flow for executing the $NO_x$ purification processing of the present embodiment is shown in FIG. 3 to FIG. 5. In FIG. 3, first, at step 10, it is judged if the $NO_x$ reduction processing I is being requested, that is, if a reduction and purification action of the $NO_x$ absorbed in the $NO_x$ catalyst carried in the first particulate filter 22a is being requested. When it is judged at step 10 that the $NO_x$ reduction processing I is being requested, the routine proceeds to step 11, where the $NO_x$ reduction processing I is executed in accordance with the flow shown in FIG. 4. On the other hand, when it is judged at step 10 that the $NO_x$ reduction processing I is not being requested, the routine proceeds to step 12.

At step 12, it is judged if the $NO_x$ reduction processing II is being requested, that is, if a reduction and purification action of the $NO_x$ absorbed in the $NO_x$ catalyst carried in the second particulate filter 22b is being requested. When it is judged at step 12 that the $NO_x$ reduction processing II is being requested, the routine proceeds to step 13, where the $NO_x$ reduction processing II is executed in accordance with the flow shown in FIG. 5. On the other hand, when it is judged at step 12 that the $NO_x$ reduction processing II is not being requested, the routine ends.

In the $NO_x$ reduction processing shown in FIG. 4, first, at step 20, the switch control I is executed. In this switch control I, the operating state of the switch valve 72 is switched to the first operating state so that the flow of engine exhaust gas into the first particulate filter 22a is suppressed. Next, at step 21, the check valve 76 is opened, then at step 22, the combustion type heater 74 is operated. Here, a rich air-fuel ratio exhaust gas is fed from the combustion type heater 74 to the first particulate filter 22a, and the $NO_x$ absorbed in the first $NO_x$ catalyst is reduced and purified.

Next, at step 23, it is judged if the reduction and purification action of the $NO_x$ absorbed in the first $NO_x$ catalyst has been completed. When it is judged at step 23 that the NO reduction and purification action has not been completed, the routine returns to step 23. Therefore, the routine repeats step 23 until it is judged at step 23 that the $NO_x$ reduction and purification action has been completed. On the other hand, when it is judged at step 23 that the $NO_x$ reduction and purification action has been completed, the routine proceeds to step 24, where the operation of the combustion type heater 74 is stopped, then at step 25, the check valve 76 is closed and the routine is ended.

At the stage where this $NO_x$ reduction processing I is completed, the flow of the engine exhaust gas to the first particulate filter 22a is left suppressed. When the execution of the $NO_x$ reduction processing II starts, the engine exhaust gas is made to flow into the first particulate filter 22a.

On the other hand, in the $NO_x$ reduction processing II shown in FIG. 5, first, at step 30, the switch control II is executed. In this switch control II, the operating state of the switch valve 72 is switched to the second operating state so that the flow of the engine exhaust gas to the second particulate filter 22b is suppressed. Next, at step 31, the check valve 76 is opened, then at step 32, the combustion type heater 74 is operated. Here, rich air-fuel ratio exhaust gas is fed from the combustion type heater 74 to the second particulate filter 22b and the $NO_x$ absorbed in the second $NO_x$ catalyst is reduced and purified.

Next, at step 33, it is judged if the reduction and purification action of the $NO_x$ absorbed in the second $NO_x$ catalyst has been completed. When it is judged at step 33 that the $NO_x$ reduction and purification action has not been completed, the routine repeats step 33. When it is judged at step 33 that the $NO_x$ reduction and purification action has been completed, the routine proceeds to step 34, where the operation of the combustion type heater 74 is stopped, then at step 34, the check valve 75 is closed and the routine is ended.

At the stage where this $NO_x$ reduction processing II is ended, the flow of the engine exhaust gas to the second particulate filter 22b is left suppressed. When the execution of the $NO_x$ reduction processing I is started, the engine exhaust gas is made to flow into the second particulate filter 22b.

To maintain the particulate oxidation removal level of a particulate filter at a high level, however, it is desirable that the filter temperature be maintained at a temperature higher than the particulate continuous oxidation temperature. On the other hand, to maintain the $NO_x$ purification level of the $NO_x$ catalyst at a high level, it is desirable that the filter temperature be maintained in the $NO_x$ absorption temperature range when rich air-fuel ratio exhaust gas is flowing into the particulate filter. That is, overall, to maintain the particulate oxidation removal level and $NO_x$ purification level of the exhaust gas purification device 70 at high levels, it is desirable that the filter temperature be maintained at a temperature higher than the particulate continuous oxidation temperature in the $NO_x$ absorption temperature range when lean air-fuel ratio exhaust gas is flowing into the particulate filter.

Therefore, in the present embodiment, in the configuration shown in FIG. 2, the following filter temperature control is executed. That is, in the filter temperature control of this embodiment, when the filter temperature is lower than a low temperature of the $NO_x$ absorption temperature range or lower than the particulate continuous oxidation temperature, the operating state of the switch valve 72 is switched so that the inflow of engine exhaust gas into the particulate filter where the filter temperature is lower than the low temperature of the $NO_x$ absorption temperature range or lower than the particulate continuous oxidation temperature is suppressed, the heater exhaust gas is fed into that particulate filter from the combustion type heater 74 to heat the particulate filter so that the temperature of that particulate filter becomes higher than the particulate continuous oxidation temperature in the $NO_x$ absorption temperature range.

According to this, the temperature of the two particulate filters 22a and 22b is maintained higher than the particulate continuous oxidation temperature in the $NO_x$ absorption temperature range. Therefore, according to the present embodiment, the particulate oxidation removal level and $NO_x$ purification level of the exhaust gas purification device 70 are maintained at high levels overall.

Note that in the filter temperature control of the present embodiment, when the filter temperature is higher than the high temperature of the $NO_x$ absorption temperature range, the filter temperature is controlled so that the filter temperature becomes higher than the particulate continuous oxidation temperature in the $NO_x$ absorption temperature range.

Note that in the filter temperature control of the present embodiment, the particulate continuous oxidation temperature is found by finding in advance by experiments the relation between the filter temperature and the amount of particulate which can be continuously removed by oxidation per unit time, storing that relationship in the form of a map in the ROM, and finding the temperature from the stored relationship and the unit amount of inflowing particulate estimated from the engine operating state.

Further, when the filter temperature is lower than the particulate continuous oxidation temperature, the particulate gradually builds up in the particulate filter and the pressure loss of the particulate filter gradually rises, so it is also possible to judge that the filter temperature is lower than the particulate continuous oxidation temperature by the pressure loss of a particulate filter becoming higher than a predetermined value.

Figure 6:
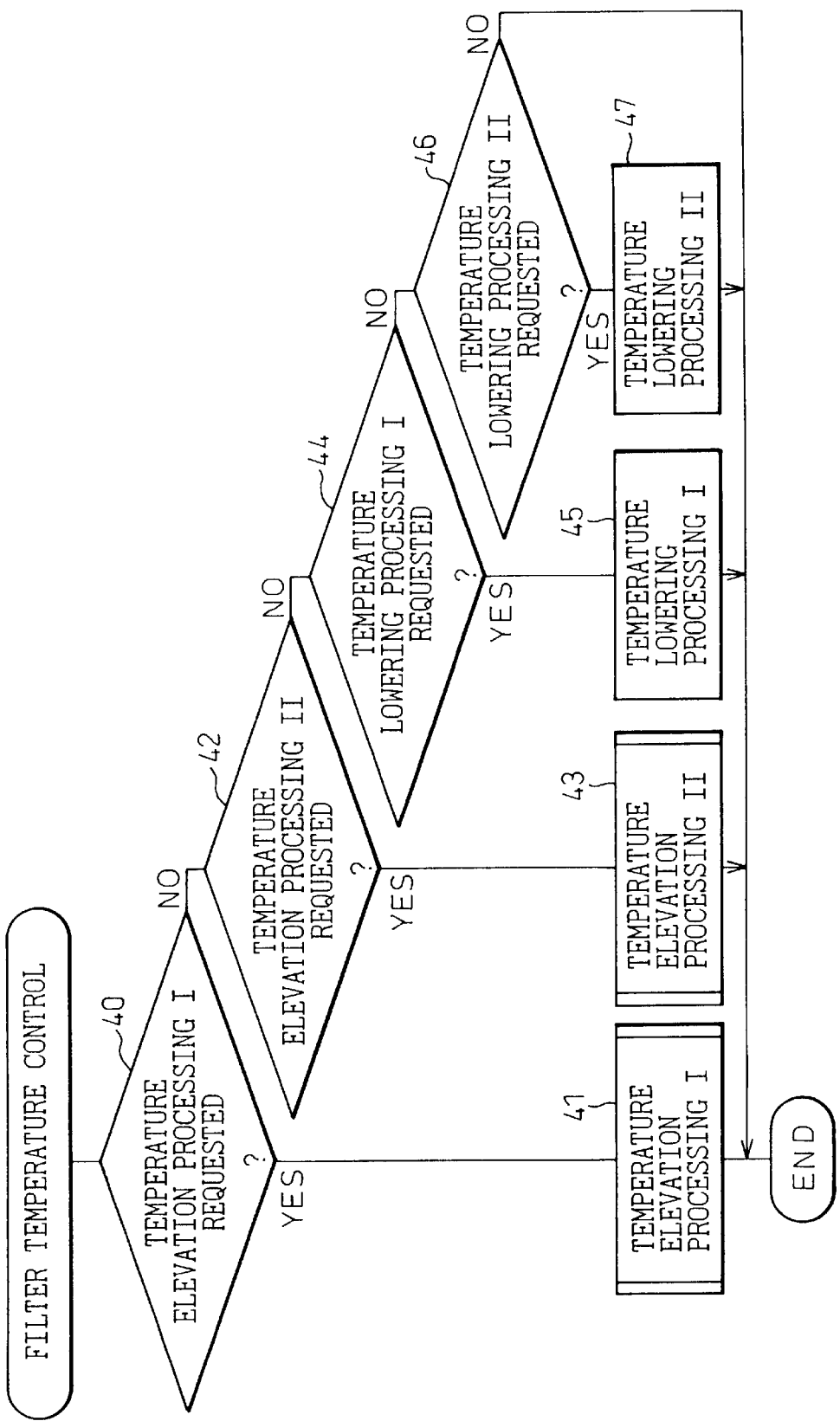
FIG. 6 is a flow chart for execution of filter temperature control.
Figure 7:
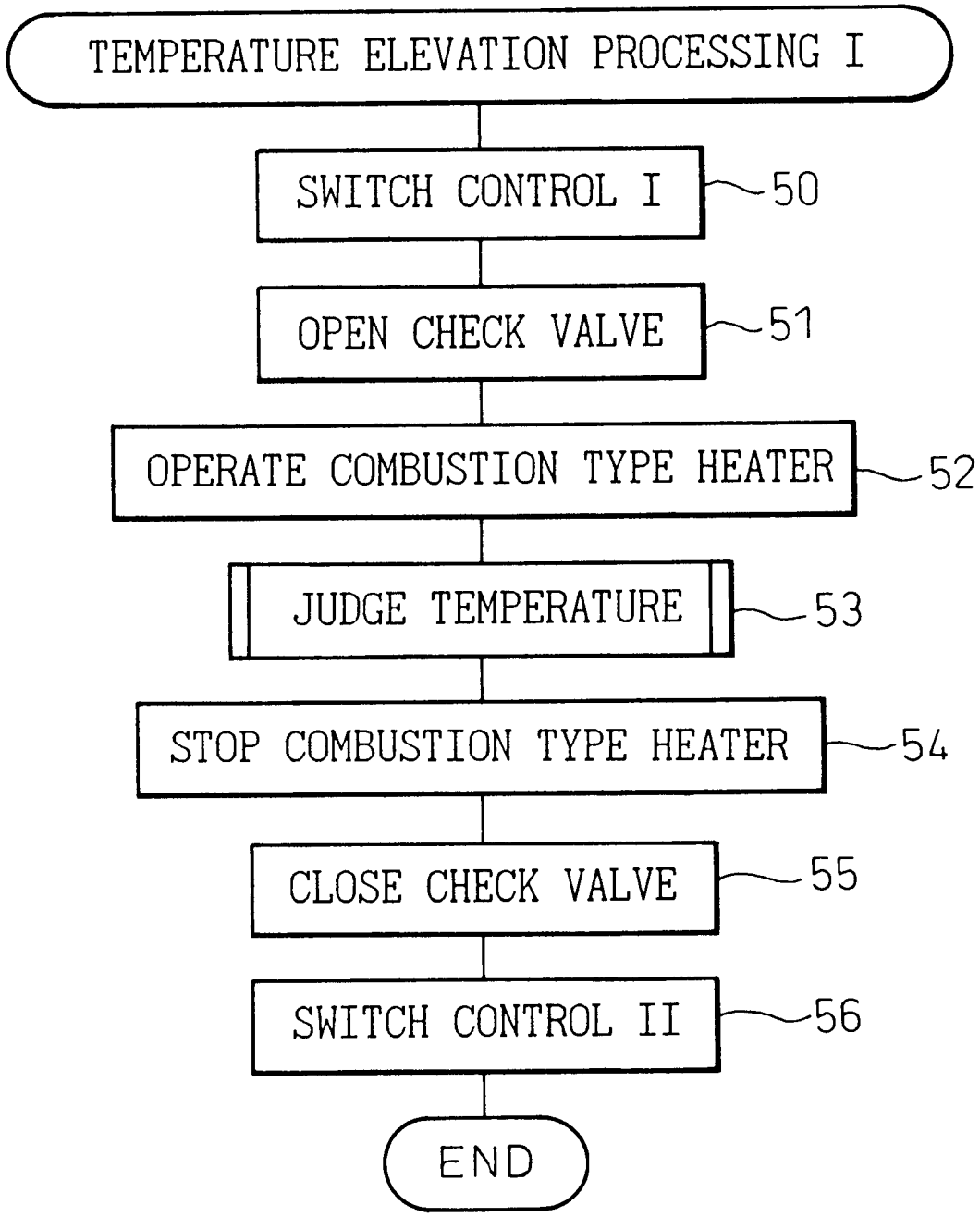
FIG. 7 is a flow chart for execution of temperature elevation processing I.
Figure 8:
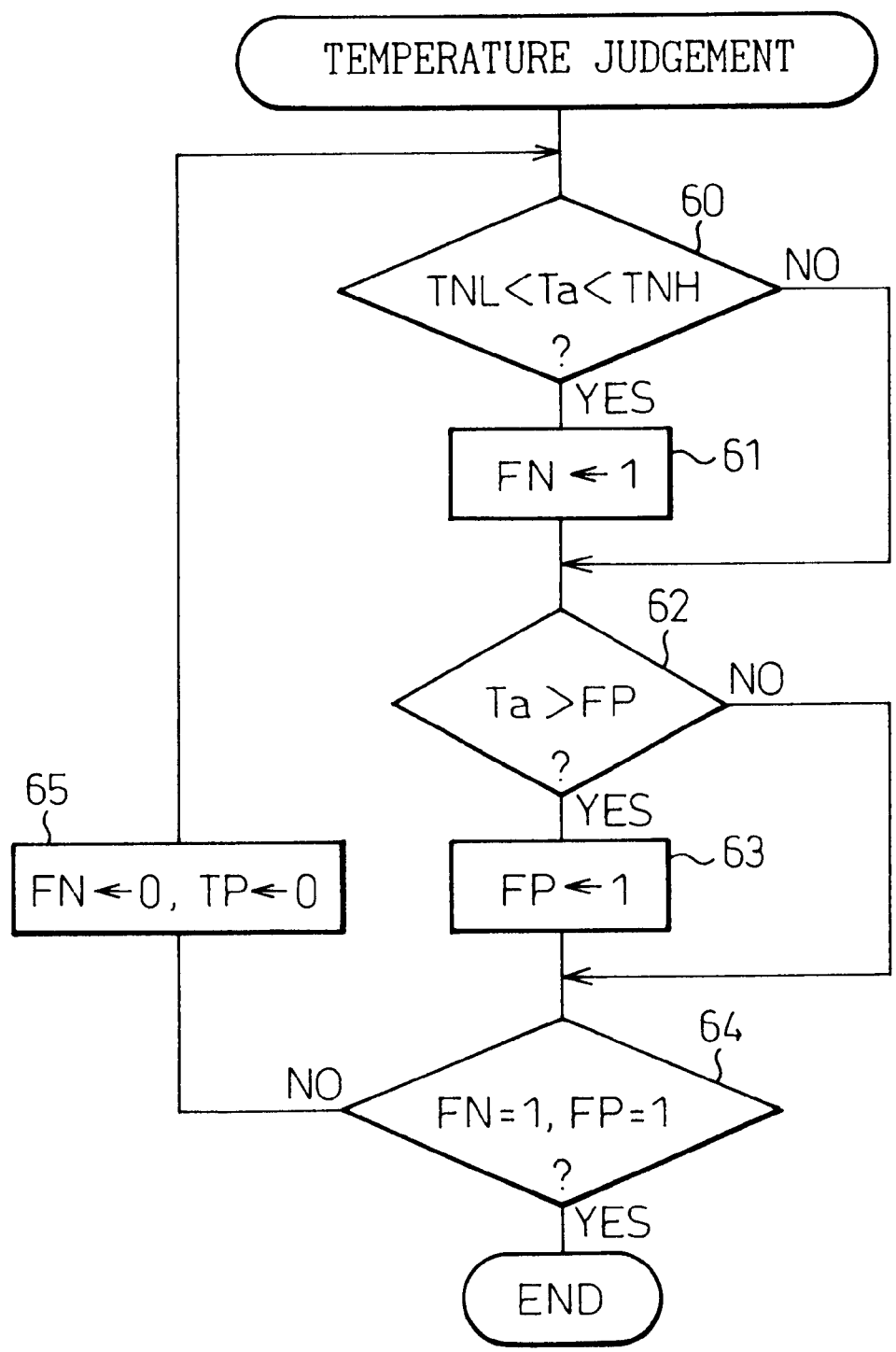
FIG. 8 is a flow chart for execution of temperature judgment.

An example of the flow for executing the filter temperature control of the present embodiment is shown in FIG. 6 to FIG. 8. In FIG. 6, first, at step 40, it is judged if the temperature elevation processing I is being requested, that is, if it is being requested that the temperature of the first particulate filter 22b be elevated so as to make the temperature of the first particulate filter 22a higher than the particulate continuous oxidation temperature in the $NO_x$ absorption temperature range. When it is judged at step 40 that the temperature elevation processing I is being requested, the routine proceeds to step 41, where the temperature elevation processing I is executed in accordance with the flow shown in FIG. 7.

In FIG. 7, first, at step 50, the switch control I is executed. In this switch control I, the operating state of the switch valve 72 is switched to the first operating state so that the inflow of engine exhaust gas to the first particulate filter 22a is suppressed. Next, at step 51, the check valve 76 is opened, then at step 52, the combustion type heater 74 is operated. Here, the lean air-fuel ratio exhaust gas is fed from the combustion type heater 74 to the first particulate filter 22a.

Next, at step 53, the temperature judgement is executed. This temperature judgement is executed according to the flow shown in FIG. 8. That is, in FIG. 8, first, at step 60, it is judged if the temperature Ta of the first particulate filter 22a is higher than the low temperature TNL of the $NO_x$ absorption temperature range and lower than the high temperature TNH of the $NO_x$ absorption temperature range, that is, if the filter temperature Ta is in the $NO_x$ absorption temperature range.

When it is judged at step 60 that TNL<Ta<TNH, the routine proceeds to step 61, where a $NO_x$ flag FN showing that the filter temperature Ta is in the $NO_x$ absorption temperature range is set. On the other hand, when it is judged that Ta≦TNL or it is judged that Ta≧TNH, the routine skips step 62.

At step 62, it is judged if the temperature Ta of the first particulate filter 22a is higher than the particulate continuous oxidation temperature TP. When it is judged at step 62 that Ta>TP, the routine proceeds to step 63, where a particulate flag TP showing that the filter temperature Ta is higher than the particulate continuous oxidation temperature is set. On the other hand, when it is judged at step 62 that Ta≦TP, the routine skips step 64.

Next, at step 64, it is judged if the $NO_x$ flag is set and the particulate flag FP is set. When it is judged at step 64 that these $NO_x$ flag FN and particulate flag FP are both set, the routine ends. At this time, the filter temperature Ta has become at least the particulate continuous oxidation temperature in the $NO_x$ absorption temperature range. On the other hand, when it is judged at step 64 that one of the $NO_x$ flag or particulate flag FP remains reset, at step 65, the $NO_x$ flag FN and the particulate flag FP are reset, the routine returns to step 60, and step 60 to step 64 are repeated. Therefore, steps 60 to 64 are repeated until it is judged at step 64 that the $NO_x$ flag FN and the particulate flag FP are both set.

When the flow in FIG. 8 ends, the routine proceeds to step 54 of FIG. 7, where the operation of the combustion type heater 74 is stopped, then at step 55, the check valve 76 is closed, then at step 56, the switch control II is executed. In the switch control II, the operating state of the switch valve 72 is switched to the second operating state so that engine exhaust gas flows into the first particulate filter 22a.

Note that when it is judged at step 40 of FIG. 6 that the temperature elevation processing I is not being requested, the routine proceeds to step 42, where it is judged if the temperature elevation processing II is being requested, that is, if it is being requested that the temperature of the second particulate filter 22b be elevated to make the temperature of the second particulate filter 22b higher than the particulate continuous oxidation temperature in the $NO_x$ absorption temperature range. When it is judged at step 42 that the temperature elevation processing II is not being requested, the routine proceeds to step 44. On the other hand, when it is judged at step 42 that the temperature elevation processing II is being requested, the routine proceeds to step 43, where the temperature elevation processing II is executed.

The temperature elevation processing II is executed by the same flow as the flow shown in FIG. 7 and FIG. 8 with the exception of the point explained below. In the temperature elevation processing II, at step 50 of FIG. 7, the switch control II is executed. In this switch control II, the operating state of the switch valve 72 is switched to the second operating state so that the flow of engine exhaust gas into the second particulate filter 22b is suppressed. Further, in the temperature elevation processing II, at step 56 of FIG. 7, the switch control I is executed. That is, the operating state of the switch valve 72 is switched to the first operating state so that the engine exhaust gas flows into the second particulate filter 22b.

Further, in the temperature elevation processing II, at step 60 of FIG. 8, it is judged if the temperature Tb of the second particulate filter 22b is higher than the low temperature TNL of the $NO_x$ absorption temperature range and lower than the high temperature TNH of the $NO_x$ absorption temperature range. Further, in the temperature elevation processing II, it is judged at step 62 of FIG. 8 if the temperature Tb of the second particulate filter 22b is higher than the particulate continuous oxidation temperature TP. The rest of the processing is the same as the processing in the $NO_x$ reduction processing I of the present embodiment.

Note that at step 44 of FIG. 6, it is judged if a temperature lowering processing I is being requested, that is, if it is being requested that the temperature of the first particulate filter 22a be lowered to maintain the temperature of the first particulate filter 22a in the $NO_x$ absorption temperature range while keeping it higher than the particulate continuous oxidation temperature. When it is judged at step 44 that the temperature lowering processing I is not being requested, the routine proceeds to step 46. On the other hand, when it is judged at step 44 that the temperature lowering processing I is being requested, the routine proceeds to step 45, where the temperature lowering processing I is executed. In this temperature lowering processing I, processing is executed to lower the temperature of the first particulate filter 22a so that the temperature of the first particulate filter 22a falls within the $NO_x$ absorption temperature range while keeping it higher than the particulate continuous oxidation temperature.

At step 46, it is judged if a temperature lowering processing II is being requested, that is, if it is being requested that the temperature of the second particulate filter 22b be lowered to maintain the temperature of the second particulate filter 22b in the $NO_x$ absorption temperature range while keeping it higher than the particulate continuous oxidation temperature. When it is judged at step 46 that the temperature lowering processing II is not being requested, the routine ends. On the other hand, when it is judged at step 46 that the temperature lowering processing II is being requested, the routine proceeds to step 47, where the temperature lowering processing II is executed. In this temperature lowering processing II, processing is performed to lower the temperature of the second particulate filter 22b so that the temperature of the second particulate filter 22b falls in the $NO_x$ absorption temperature range while keeping it higher than the particulate continuous oxidation temperature.

Note that instead of the above-mentioned filter temperature control, in the configuration shown in FIG. 2, it is also possible to execute the following filter temperature control. That is, in the filter temperature control of the present embodiment, when the filter temperature is lower than the low temperature of the $NO_x$ absorption temperature range or lower than the particulate continuous oxidation temperature, the operating state of the switch valve 72 is switched to the neutral operating state, then heater exhaust gas is fed from the combustion type heater 74 to the two particulate filters 22a and 22b to heat the two particulate filters 22a and 22b so that the filter temperature becomes higher than the particulate continuous oxidation temperature in the $NO_x$ absorption temperature range.

According to this, the temperature of the two particulate filters 22a and 22b is maintained higher than the particulate continuous oxidation temperature in the $NO_x$ absorption temperature range. Therefore, according to the present embodiment, the particulate oxidation removal level and $NO_x$ purification level of the exhaust gas purification device 70 are maintained at high levels overall.

Note that in the filter temperature control of the present embodiment, when the filter temperature is higher than the high temperature of the $NO_x$ absorption temperature range, the filter temperature is controlled so that the filter temperature becomes higher than the particulate continuous oxidation temperature in the $NO_x$ absorption temperature range.

As explained above, however, the $NO_x$ catalyst releases the absorbed $NO_x$ when its temperature is in the $NO_x$ absorption temperature range and the released $NO_x$ can be reduced by the HC. Therefore, to further raise the $NO_x$ reduction efficiency, it is desirable that the filter temperature already be in the $NO_x$ reduction temperature range when the rich air-fuel ratio heater exhaust gas starts to be fed to a particulate filter for reduction of the $NO_x$ absorbed in the $NO_x$ catalyst.

Of course, to further raise the particulate oxidation removal efficiency, it is desirable that the filter temperature be higher than the particulate continuous oxidation temperature when starting to feed the rich air-fuel ratio heater exhaust gas to a particulate filter to reduce the $NO_x$ absorbed in the $NO_x$ catalyst.

Therefore, in the configuration shown in FIG. 2, it is also possible to execute the following $NO_x$ purification processing. That is, in the $NO_x$ purification processing of the present embodiment, when it is judged that the $NO_x$ absorbed in the $NO_x$ catalyst should be reduced and purified, if the filter temperature is lower than the low temperature of the $NO_x$ reduction temperature range or lower than the particulate continuous oxidation temperature, the operating state of the switch valve 72 is switched so that the inflow of engine exhaust gas to the particulate filter provided with the $NO_x$ catalyst judged to be in a state where $NO_x$ should be reduced is suppressed, then the lean air-fuel ratio exhaust gas is fed from the combustion type heater 74 to that particulate filter. According to this, that particulate filter is heated by the heat of the heater exhaust gas without causing release of $NO_x$ from the $NO_x$ catalyst.

Further, in the $NO_x$ purification processing of the present embodiment, when the filter temperature has become higher than the particulate continuous oxidation temperature in the $NO_x$ reduction temperature range, the lean air-fuel ratio exhaust gas is fed from the combustion type heater 74 to that particulate filter.

According to this, when the rich air-fuel ratio heater exhaust gas is fed to a particulate filter, the filter temperature has already become higher than the particulate continuous oxidation temperature in the $NO_x$ reduction temperature range. Therefore, according to the present embodiment, the particulate oxidation removal level and $NO_x$ purification level of the exhaust gas purification device are further raised overall.

In the configuration shown in FIG. 2, however, it is also possible to execute the following $NO_x$ purification processing. That is, in the $NO_x$ purification processing of the present embodiment, when it is judged that the $NO_x$ absorbed in the $NO_x$ catalyst should be reduced and purified, the operating state of the switch valve 72 is switched so that the inflow of engine exhaust gas to the particulate filter provided with the $NO_x$ catalyst judged to be in a state where the $NO_x$ should be reduced is suppressed in the case where the filter temperature is lower than the low temperature of the $NO_x$ reduction temperature range or lower than the particulate continuous oxidation temperature, then heater exhaust gas having a rich air-fuel ratio with a relatively small richness and having a concentration of oxygen higher than a predetermined oxygen concentration is fed to that particulate filter.

That is, since the richness of the air-fuel ratio of the heater exhaust gas fed to the particulate filter at this time is small, almost no $NO_x$ is released from the $NO_x$ catalyst. On the other hand, the heater exhaust gas fed to the particulate filter at this time contains a relatively large amount of oxygen and HC. This oxygen and HC undergo an oxidation reaction at the particulate filter whereby heat is released, so the temperature of the particulate filter is made to rise quickly.

Further, in the $NO_x$ purification processing of the present embodiment, when the filter temperature becomes higher than the particulate continuous oxidation temperature in the $NO_x$ reduction temperature range, heater exhaust gas having a rich air-fuel ratio of a relatively large richness and having a concentration of oxygen lower than the above predetermined concentration of oxygen is fed to the particulate filter.

That is, since the richness of the air-fuel ratio of the heater exhaust gas fed to the particulate filter at this time is large overall, $NO_x$ is released from the $NO_x$ catalyst. Further, since the oxygen and HC contained in the heater exhaust gas fed to the particulate filter at this time are relatively small, there is no release of a large amount of heat due to an oxidation reaction of the oxygen and HC at the particulate filter and therefore release of $NO_x$ from the $NO_x$ catalyst all at once is suppressed.

Of course, in the $NO_x$ purification processing of the present embodiment, when it is judged that the $NO_x$ absorbed in the $NO_x$ catalyst should be reduced and purified, in the case where the filter temperature is higher than the particulate continuous oxidation temperature in the $NO_x$ reduction temperature range, heater exhaust gas having a rich air-fuel ratio of a relatively large degree of richness and having a concentration of oxygen lower than the above predetermined concentration of oxygen is immediately fed to the particulate filter without feeding a heater exhaust gas having a relatively small richness and having a concentration of oxygen higher than the above predetermined concentration of oxygen.

According to this, when rich air-fuel ratio heater exhaust gas having a relatively low concentration of oxygen is fed into the particulate filter, the filter temperature is already in the $NO_x$ reduction temperature range and higher than the particulate continuous oxidation temperature. Therefore, according to the present embodiment, the particulate oxidation removal level and $NO_x$ purification capability of the exhaust gas purification device are maintained at high levels.

Note that the above predetermined concentration of oxygen is set to the concentration of oxygen required for raising the filter temperature by a desired rate of rise.

Note that the $NO_x$ catalyst carried in a particulate filter also absorbs the sulfur ingredient in the exhaust gas (hereinafter referred to as "the S-ingredient"). If the $NO_x$ catalyst absorbs the S-ingredient in this way, the $NO_x$ absorption capability of the $NO_x$ catalyst will end up falling. Therefore, to maintain the $NO_x$ absorption capability of a $NO_x$ catalyst at a high level and as a result maintain the $NO_x$ purification capability of the $NO_x$ catalyst at a high level, it is desirable to cause the S-ingredient absorbed in the $NO_x$ catalyst to be released from the $NO_x$ catalyst.

The S-ingredient is released from the $NO_x$ catalyst when the temperature of the $NO_x$ catalyst, that is, the filter temperature, is at least a certain temperature (for example, 600° C.) and the atmosphere in the particulate filter becomes a rich atmosphere. Therefore, to cause the S-ingredient to be released from the $NO_x$ catalyst, it is sufficient to make the filter temperature at least the temperature where the S-ingredient is released from the $NO_x$ catalyst (hereinafter referred to as "the S-ingredient release temperature") and make the atmosphere in the particulate filter a rich atmosphere.

Therefore, in the present embodiment, in the configuration shown in FIG. 2, S-ingredient release control is executed in the following way for causing the S-ingredient to be released from the $NO_x$ catalyst. That is, in the S-ingredient release control of the present embodiment, when it is judged that the S-ingredient should be released from a $NO_x$ catalyst, the operating state of the switch valve 72 is switched so that the inflow of engine exhaust gas to the particulate filter provided with the $NO_x$ catalyst judged to be a state where the S-ingredient should be made to be released is suppressed and a lean air-fuel ratio heater exhaust gas is fed to the particulate filter. According to this, the particulate filter is heated by the heat of the lean air-fuel ratio heater exhaust gas and the filter temperature is made to rise.

Further, in the S-ingredient release control of the present embodiment, when the filter temperature reaches the S-ingredient release temperature, rich air-fuel ratio heater exhaust gas is fed to that particulate filter. According to this, due to the HC in the rich air-fuel ratio heater exhaust gas, the inside is made a rich atmosphere and the S-ingredient is released from the $NO_x$ catalyst.

Therefore, according to the present embodiment, since the S-ingredient is released from the $NO_x$ catalyst, as a result the $NO_x$ purification capability of the $NO_x$ catalyst is maintained at a high level. Note that instead of the lean air-fuel ratio heater exhaust gas used in the present embodiment, it is also possible to utilize the high temperature, lean air-fuel ratio engine exhaust gas produced by controlling the engine operation.

Further, in the configuration shown in FIG. 2, it is also possible to execute the following S-ingredient release control. That is, in the S-ingredient release control of the present embodiment, when it is judged that the S-ingredient should be released from a $NO_x$ catalyst, the engine operation is controlled to make high temperature engine exhaust gas be emitted from the engine body 1 and the operating state of the switch valve 72 is switched so as to make the engine exhaust gas flow into the particulate filter provided with the $NO_x$ catalyst judged to be in a state where the S-ingredient should be made to be released. According to this, since high temperature engine exhaust gas flows into the particulate filter provided with the $NO_x$ catalyst judged to be in a state where the S-ingredient should be made to be released, that particulate filter is heated by the heat of the engine exhaust gas and the filter temperature is made to rise.

Further, in the S-ingredient release control of the present embodiment, when the filter temperature reaches the S-ingredient release temperature, the operating state of the switch valve is switched so as to suppress the inflow of engine exhaust gas into the particulate filter provided with the $NO_x$ catalyst in a state where the S-ingredient should be made to be released, then rich air-fuel ratio exhaust gas is fed from the combustion type heater to that particulate filter. According to this, since the atmosphere in the particulate filter is made a rich atmosphere in the state where the filter temperature reaches the S-ingredient release temperature, the S-ingredient is made to be released from the $NO_x$ catalyst.

Note that in this embodiment, it is also possible to make the internal combustion engine perform the later explained low temperature combustion so as to make high temperature engine exhaust gas be emitted from the engine body. The details will be explained later, but the temperature of the exhaust gas emitted from the engine body when low temperature combustion is being performed is higher than the temperature of the exhaust gas emitted from the engine body when normal combustion is being performed. Therefore, according to this, it is possible to make the filter temperature rise to the S-ingredient release temperature.

Note that when making the S-ingredient be released from the $NO_x$ catalyst, if for example the engine operation becomes an idling operation, the amount of the exhaust gas flowing into the particulate filter per unit time becomes smaller. Therefore, at this time, the concentration of the S-ingredient in the exhaust gas flowing out from the particulate filter becomes high and the exhaust emission deteriorates. Therefore, to suppress deterioration of the exhaust emission due to this reason, when the engine operation is an idling operation, it is desirable to suppress the concentration of the S-ingredient in the exhaust gas flowing out from the particulate filter to not more than a certain level.

Therefore, in the configuration shown in FIG. 2, it is also possible to execute the following air-fuel ratio control during the S-ingredient release processing. That is, in the air-fuel ratio control of the present embodiment, in accordance with the S-ingredient release processing, after the filter temperature reaches the S-ingredient release temperature, the engine speed is detected and it is judged if the engine operation is an idling operation, more generally, if the engine speed is smaller than a predetermined value. Here, when it is judged that the engine speed is larger than a predetermined value, the rich air-fuel ratio heater exhaust gas is fed to the particulate filter. In this case, the S-ingredient is made to be released in relatively large amounts at a time from the $NO_x$ catalyst. On the other hand, when it is judged that the engine speed has become smaller than a predetermined value, the lean air-fuel ratio heater exhaust gas is fed to the particulate filter. In this case, almost no S-ingredient is released from the $NO_x$ catalyst.

According to the air-fuel ratio control of the present embodiment, when rich air-fuel ratio heater exhaust gas is fed to a particulate filter, the amount of the S-ingredient released from the $NO_x$ catalyst is relatively large, but at this time the engine speed is larger than a predetermined value and therefore the amount of the exhaust gas flowing out from the particulate filter is large, so as a result the concentration of the S-ingredient in the exhaust gas flowing out from the particulate filter is at a low level.

On the other hand, according to the air-fuel ratio control of the present embodiment, when lean air-fuel ratio exhaust gas is fed to a particulate filter, the engine speed is smaller than a predetermined value and therefore the amount of exhaust gas flowing out from the particulate filter is small, but at this time, the S-ingredient released from the $NO_x$ catalyst is substantially zero, so as a result the concentration of the S-ingredient in the exhaust gas flowing out from the particulate filter is maintained at a low level.

Therefore, according to the present embodiment, the concentration of the S-ingredient in the exhaust gas flowing out from the particulate filter is maintained at a low level overall.

Further, since the temperature of the lean air-fuel ratio heater exhaust gas is similarly high, even if feeding lean air-fuel ratio heater exhaust gas to the particulate filter as in the present embodiment, the filter temperature will not fall and will be maintained at least at the S-ingredient release temperature. Therefore, even if the air-fuel ratio of the heater exhaust gas fed to the particulate filter is switched from lean to rich, since the filter temperature is maintained at least at the S-ingredient release temperature, the S-ingredient is released from the $NO_x$ catalyst while the rich air-fuel ratio heater exhaust gas is just being introduced to the particulate filter. Therefore, even if the amount of fuel consumed by the combustion type heater 74 is small, the S-ingredient is released from the $NO_x$ catalyst in a short time.

Note that in the present embodiment, it is possible to suspend the feed of the heater exhaust gas to the particulate filter when the time where the engine speed is smaller than a predetermined value continues for more than a certain period. According to this, the deterioration of the fuel efficiency of the combustion type heater 74 is suppressed.

Note that in the present embodiment, instead of feeding lean air-fuel ratio heater exhaust gas to the particulate filter while the engine speed is smaller than a predetermined value, it is also possible to alternately feed a rich air-fuel ratio heater exhaust gas and lean air-fuel ratio heater exhaust gas to the particulate filter. According to this, the engine speed is smaller than a predetermined value and therefore the amount of exhaust gas flowing out from the particulate filter is small, but the S-ingredient released from the $NO_x$ catalyst is relatively small, so as a result the concentration of the S-ingredient in the exhaust gas flowing out from the particulate filter is maintained at a low level.

Of course, since the S-ingredient release temperature is a relatively high temperature, when making the filter temperature rise to the S-ingredient release temperature so that the S-ingredient is released from the $NO_x$ catalyst, the particulate deposited on the particulate filter is rapidly oxidized and removed. Therefore, even if executing the S-ingredient release processing, the particulate oxidation removal capability of the exhaust gas purification device can be improved.

Figure 9:
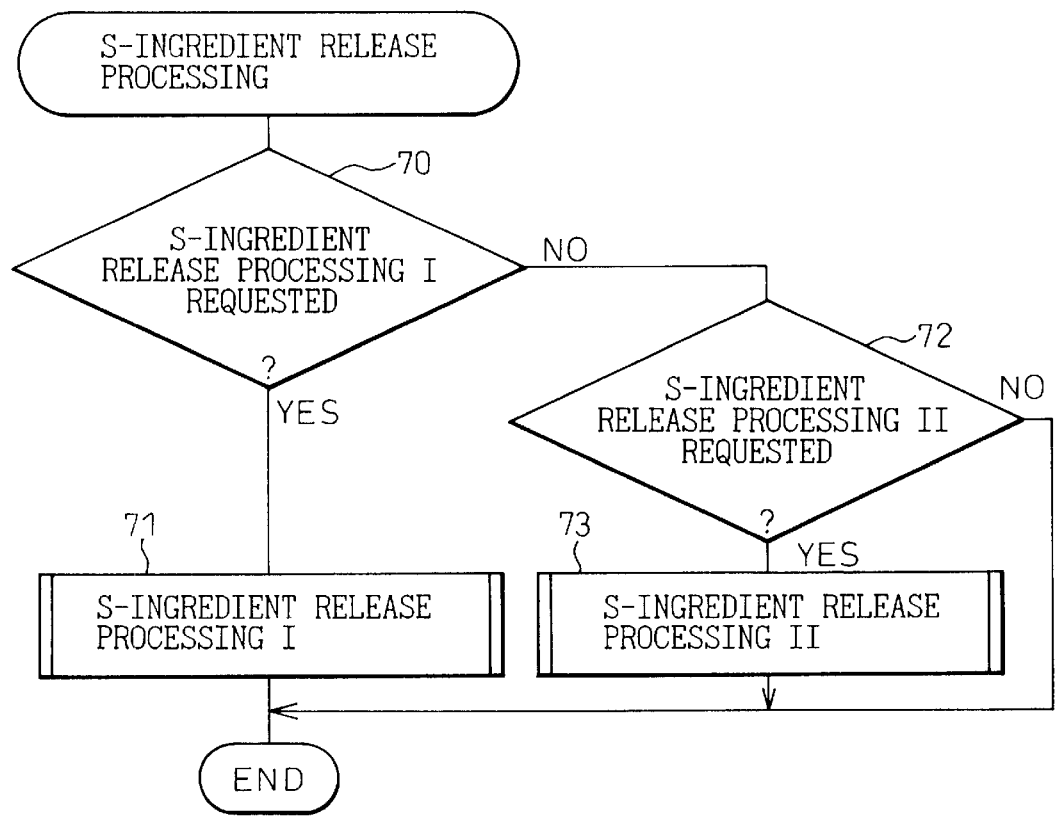
FIG. 9 is a flow chart for execution of S-ingredient release processing.

One example of the flow of execution of the S-ingredient release processing including the air-fuel ratio control of the present embodiment is shown in FIG. 9. In FIG. 9, first, at step 70, it is judged if the S-ingredient release processing I for releasing the S-ingredient from the first $NO_x$ catalyst has been requested. When it is judged at step 70 that the S-ingredient release processing I has been requested, the routine proceeds to step 71, where the S-ingredient release processing I is executed in accordance with the flow shown in FIG. 10. On the other hand, when it is judged at step 70 that the S-ingredient release processing I has not been requested, the routine proceeds to step 72.

At step 72, it is judged if the S-ingredient release processing II for releasing the S-ingredient from the second $NO_x$ catalyst has been requested. When it is judged at step 72 that the S-ingredient release processing II has been requested, the routine proceeds to step 73, where the S-ingredient release processing II is executed. On the other hand, when it is judged at step 72 that the S-ingredient release processing II has not been requested, the routine is ended.

Figure 10:
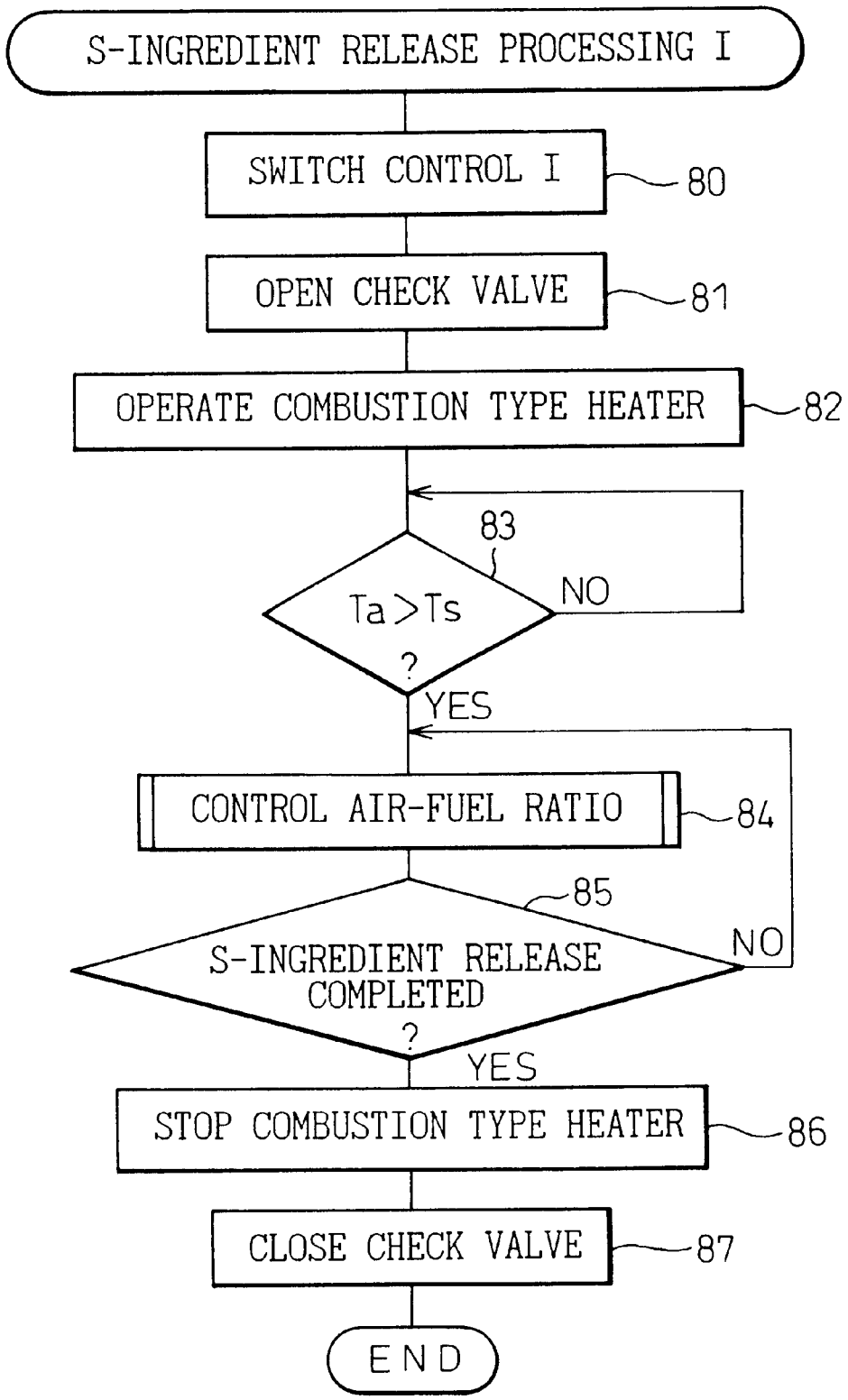
FIG. 10 is a flow chart for execution of S-ingredient release processing I.

In FIG. 10, first, at step 80, the switch control I is executed. In this switch control I, the operating state of the switch valve 72 is switched to the first operating state so that the inflow of engine exhaust gas to the first particulate filter 22a is suppressed. Next, at step 81, the check valve 76 is opened, then at step 82, the combustion type heater 74 is operated.

Next, at step 83, it is judged if the temperature Ta of the first particulate filter 22a is higher than the S-ingredient release temperature Ts. When it is judged at step 83 that Ta≦Ts, the routine returns to step 83. Therefore, step 83 is repeated until it is judged at that step that Ta>Ts. When it is judged at step 83 that Ta>Ts, the routine proceeds to step 84, where the air-fuel ratio control is executed in accordance with the flow shown in FIG. 11.

In FIG. 11, first, at step 90, it is judged if the engine speed N is larger than a predetermined value Ns. When it is judged at step 90 that N>Ns, the routine proceeds to step 91, where the air-fuel ratio control I is executed. In this air-fuel ratio control I, the air-fuel ratio of the heater exhaust gas fed from the combustion type heater 74 is made rich, then the routine proceeds to step 85 of FIG. 10. On the other hand, when it is judged at step 90 that N≦Ns, the routine proceeds to step 92, where the air-fuel ratio control II is executed. In this air-fuel ratio control II, the air-fuel ratio of the heater exhaust gas is made lean and the routine proceeds to step 85 of FIG. 10.

At step 85 of FIG. 10, it is judged if the release of the S-ingredient has been completed. When it is judged at step 85 that the release of the S-ingredient has not been completed, the routine returns to step 84. Therefore, steps 84 and 85 are repeated until it is judged at step 84 that the release of the S-ingredient has been completed. When it is judged at step 85 that the release of the S-ingredient has been completed, the routine proceeds to step 86, where the operation of the combustion type heater 74 is stopped, then at step 87, the check valve 76 is closed and the routine ended.

The S-ingredient release processing II of the present embodiment is executed in accordance with the flow shown in FIG. 10 except for the point described below. In the S-ingredient release processing II of the present embodiment, at step 80 of FIG. 10, the switch control II is executed. In this switch control II, the operating state of the switch valve 72 is switched to the second operating state so that the inflow of engine exhaust gas to the second particulate filter 22b is suppressed. The rest of the processing is the same as the processing in the S-ingredient release processing I of the present embodiment.

Note that if the filter temperature is maintained at least at the S-ingredient release temperature in order to cause the S-ingredient to be released from the $NO_x$ catalyst and the inside of the particulate filter continues to be kept at a rich atmosphere, depending on the level of the filter temperature or the level of the rich atmosphere, sometimes the S-ingredient will flow out from the particulate filter as hydrogen sulfide ($H_2S$) instead of sulfur dioxide ($SO_2$).

Hydrogen sulfide has the property of being easily adsorbed at the $NO_x$ catalyst and disassociating only with difficulty once adsorbed. If hydrogen sulfide is adsorbed at the $NO_x$ catalyst, the $NO_x$ absorption capability of the $NO_x$ catalyst will fall and as a result the $NO_x$ purification capability of the $NO_x$ catalyst will fall. Therefore, to maintain the $NO_x$ purification capability of the $NO_x$ catalyst at a high level, it is desirable that the S-ingredient be released from the $NO_x$ catalyst in the form of sulfur dioxide rather than the form of hydrogen sulfide.

Therefore, in the configuration shown in FIG. 2, it is also possible to execute the following S-ingredient release processing. That is, in the S-ingredient release control of the present embodiment, when the S-ingredient should be released, the operating state of the switch valve 2 is switched so as to suppress the inflow of engine exhaust gas to the particulate filter provided with the $NO_x$ catalyst in the state where the S-ingredient should be released, then the lean air-fuel ratio exhaust gas is fed from the combustion type heater 74 to the particulate filter. According to this, the particulate filter is heated by the heater exhaust gas and the filter temperature is made to rise.

Further, in the S-ingredient release control of the present embodiment, if the filter temperature reaches the S-ingredient release temperature, the rich air-fuel ratio heater exhaust gas and the lean air-fuel ratio heater exhaust gas are alternately fed to the particulate filter. If a rich air-fuel ratio heater exhaust gas and lean air-fuel ratio heater exhaust gas are alternately fed to the particulate filter in this way, even if the filter temperature rises, it is maintained at less than a certain temperature and the richness of the atmosphere in the particulate filter is maintained at below a certain degree. Therefore, according to the present embodiment, the S-ingredient is released from the $NO_x$ catalyst in the form of sulfur dioxide and as a result the $NO_x$ purification capability of the $NO_x$ catalyst is maintained at a high level.

Note that in the present embodiment, instead of alternately feeding the rich air-fuel ratio heater exhaust gas and lean air-fuel ratio heater exhaust gas to the particulate filter, it is also possible to feed rich air-fuel ratio heater exhaust gas and control the opening degree of the switch valve 72 to intermittently feed lean air-fuel ratio engine exhaust gas to the particulate filter with this well, even if the filter temperature rises, it is maintained at below a certain temperature and the richness of the atmosphere in the particulate filter is maintained at below a certain degree, so the S-ingredient is released from the $NO_x$ catalyst in the form of sulfur dioxide and as a result the $NO_x$ purification capability of the $NO_x$ catalyst is maintained at a high level.

Note that the inflow of engine exhaust gas to a particulate filter in the $NO_x$ reduction processing is suppressed by the switch valve 72. Here, the amount of the heater exhaust gas fed to the particulate filter is smaller than the amount of the engine exhaust gas arriving at the exhaust gas purification device 70, so the pressure in the particulate filter in the $NO_x$ reduction processing becomes lower than the pressure in the engine exhaust passage downstream of the particulate filter. In this case, the engine exhaust gas flowing out from the other particulate filter flows into that particulate filter from the downstream side.

In this case, to make the atmosphere inside that particulate filter a desired degree of a rich atmosphere, it is necessary to make the richness of the heater exhaust gas larger compared with when no engine exhaust gas at all flows into the particulate filter. In this case, the fuel efficiency of the combustion type heater 74 deteriorates. Therefore, to suppress deterioration of the fuel efficiency of the combustion type heater 74 due to this reason, it is desirable to suppress the inflow of engine exhaust gas from downstream of the particulate filter in the $NO_x$ reduction processing.

Therefore, it is also possible to adopt the configuration shown in FIG. 12 and execute the above $NO_x$ reduction processing. In the configuration shown in FIG. 12, the downstream side exhaust branch passages 92a and 92b are opened to the atmosphere as they are without being merged. According to this, the inflow of the exhaust gas flowing out from one downstream side exhaust branch passage to another downstream side exhaust branch passage is suppressed, and the inflow of engine exhaust gas to the particulate filter in the $NO_x$ reduction processing from downstream is suppressed. Therefore, according to the present embodiment, deterioration of the fuel efficiency of the combustion type heater 74 is suppressed.

Figure 13:
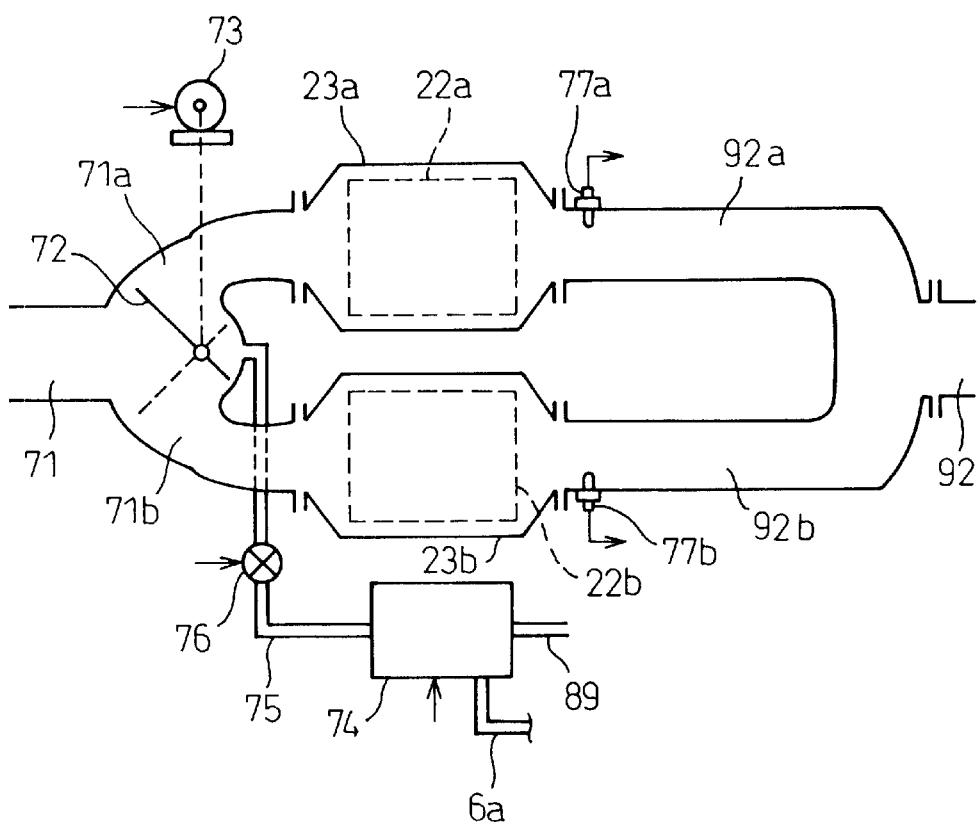
FIG. 13 is a view showing exhaust gas purification device of another embodiment.

Note that with the configuration shown in FIG. 13 as well, effects similar to the effects obtained from the configuration shown in FIG. 12 are obtained. In the configuration shown in FIG. 13, the downstream side exhaust branch passages 92a and 92b are not merged immediately at the downstream side of the particulate filter, but are extended over a relative long distance then are merged. Here, the distance from the particulate filters to the region where the downstream side exhaust branch passages 92a and 92b are merged (hereinafter referred to as "the exhaust passage merging region") is set to the distance where, when the inflow of engine exhaust gas to one particulate filter is suppressed, the inflow of the engine exhaust gas flowing out from the other particulate filter from downstream of the other particulate filter through the exhaust passage merging region is suppressed.

Figure 14:
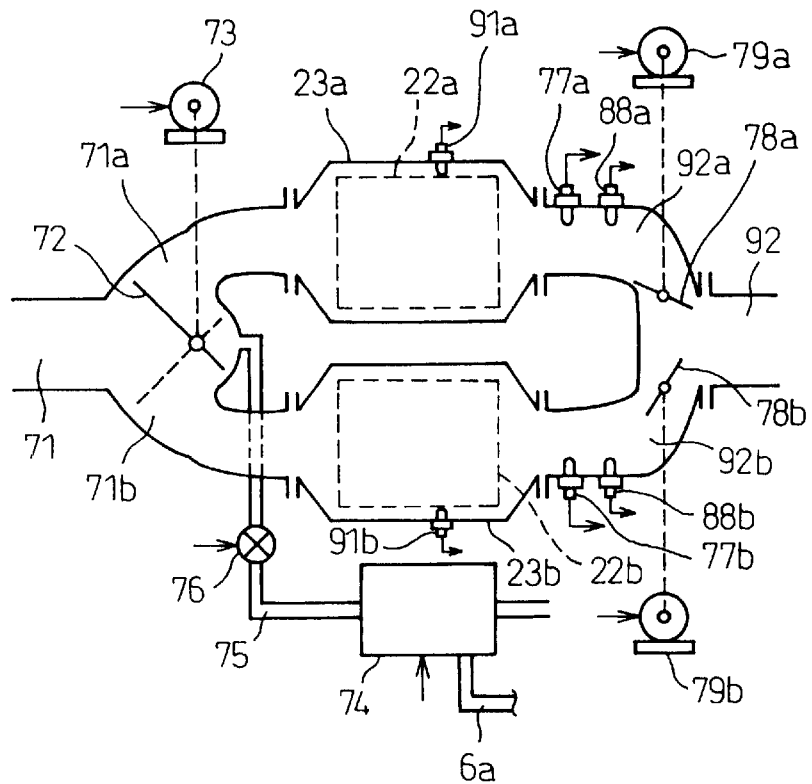
FIG. 14 is a view showing exhaust gas purification device of still another embodiment.

Further, as a separate configuration for suppressing the inflow of engine exhaust gas from downstream of the particulate filters in the $NO_x$ reduction processing, it is also possible to adopt the configuration shown in FIG. 14. In the configuration shown in FIG. 14, the downstream side exhaust branch passages 92a and 92b have exhaust valves 78a and 78b arranged in them. These exhaust valves 78a and 78b are connected to the step motors 79a and 79b. These step motors 79a and 79b are connected to the output port 36 through the corresponding drive circuits 38.

In the present embodiment, the exhaust valve 78a or 78b arranged in the downstream side exhaust branch passage 92a or 92b connected to the particulate filter where the inflow of engine exhaust gas is suppressed in the $NO_x$ reduction processing is closed by the step motor 79a or 79b. According to this, the inflow of engine exhaust gas from downstream to the particulate filters in the $NO_x$ reduction processing is suppressed by the exhaust valves 78a and 78b.

Further, since the downstream side exhaust branch passage 92a or 92b connected to the particulate filter engaged in the $NO_x$ reduction processing is closed by the exhaust valve 78a or 78b, the pressure in the particulate filter engaged in the $NO_x$ reduction processing rises. Due to this as well, the inflow of engine exhaust gas from downstream to the particulate filter engaged in the $NO_x$ reduction processing is suppressed.

Therefore, according to the present embodiment, the deterioration of the fuel efficiency of the combustion type heater 74 is suppressed.

Of course, suppression of the inflow of the engine exhaust gas from downstream to the particulate filters by the configuration explained above is also effective for suppressing deterioration of the fuel efficiency of the combustion type heater 74.

In the present embodiment, however, during the $NO_x$ reduction processing and the S-ingredient release processing, the upstream side of the particulate filter to which the heater exhaust gas is fed is closed by the switch valve 72 and its downstream side is closed by the exhaust valve 78a or 78b. Therefore, depending on the amount of the heater exhaust gas fed to the particulate filter per unit time, the pressure in the particulate filter becomes higher and it sometimes becomes difficult to feed the heater exhaust gas from the combustion type heater 74 to the particulate filter.

Therefore, to feed heater exhaust gas as desired from the combustion type heater 74 to the particulate filter, it is desirable to suppress the pressure in that particulate filter to a degree where feed of the heater exhaust gas to that particulate filter from the combustion type heater 74 will not become difficult.

Therefore, it is possible to employ the configuration shown in FIG. 14 and execute the following exhaust valve opening degree control. That is, in the configuration shown in FIG. 14, pressure sensors 88a and 88b for detecting the pressures in the particulate filters 22a and 22b are arranged in the exhaust branch passages 92a and 92b at the downstream sides of the particulate filters 22a and 22b. Further, in the exhaust valve opening degree control of the present embodiment, during the $NO_x$ reduction processing and S-ingredient release processing, the pressure inside the particulate filter to which the heater exhaust gas is being fed is detected by a pressure sensor. When the detected pressure becomes higher than a predetermined pressure, the opening degree of the exhaust valve arranged downstream of that particulate filter is made larger. Conversely, when the detected pressure becomes lower than a predetermined pressure, the opening degree of that exhaust valve is made smaller. Therefore, the predetermined pressure is set to the upper limit of the pressure where the heater exhaust gas is fed to the particulate filter as desired.

According to this, the pressure in a particulate filter is maintained at the pressure where the heater exhaust gas is fed to the particulate filter as desired.

Figure 15:
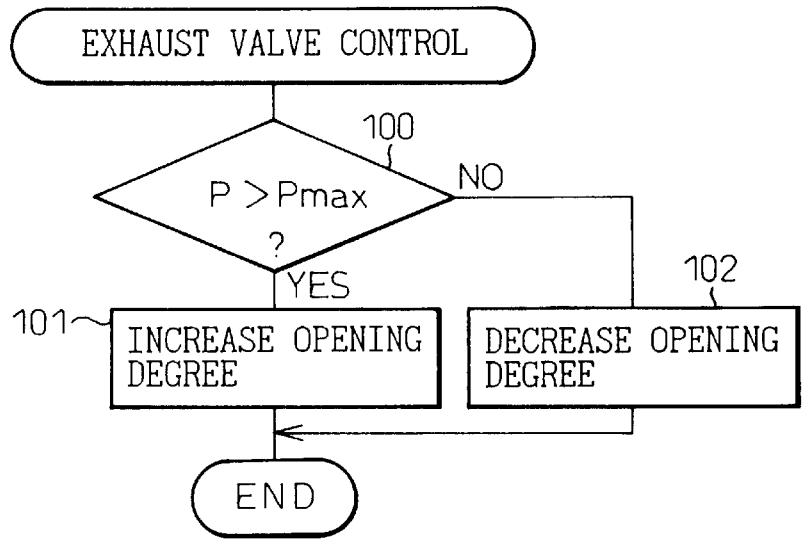
FIG. 15 is a flow chart for execution of exhaust valve control.

One example of the flow for executing the exhaust valve opening degree control of the present embodiment is shown in FIG. 15. In FIG. 15, first, at step 100, it is judged if the pressure P detected by the pressure sensor arranged downstream of the particulate filter to which the heater exhaust gas is being fed is higher than a predetermined pressure Pmax. Here, the predetermined pressure Pmax is set to the upper limit of the pressure at which the heater exhaust gas is fed to the particulate filter as desired.

When it is judged at step 100 that P>Pmax, the routine proceeds to step 101, where the opening degree of the exhaust valve arranged downstream of the particulate filter where the heater exhaust gas is being fed is made to increase and the routine is ended. On the other hand, when it is judged at step 100 that P<Pmax, the routine proceeds to step 102, where the opening degree of the exhaust valve is made to decrease and the routine is ended.

Further, to suppress the inflow of engine exhaust gas from downstream to a particulate filter in the $NO_x$ reduction processing or S-ingredient release processing, it is possible to adopt the configuration shown in FIG. 14 and execute the following exhaust valve opening degree control. That is, in the exhaust valve opening degree control of the present embodiment, during the $NO_x$ reduction processing or S-ingredient release processing, the pressures in the particulate filters are detected by the pressure sensors. Based on these pressures, the opening degree of the exhaust valve arranged downstream of the particulate filter to which the heater exhaust gas is being fed is controlled so that the pressure inside the particulate filter to which the heater exhaust gas is being fed becomes higher than the pressure inside the other particulate filter or so that at least the pressures of both particulate filters become equal.

According to this, the inflow of engine exhaust gas from downstream to the particulate filter engaged in the $NO_x$ reduction processing or S-ingredient release processing is suppressed.

Note that instead of controlling the opening degree of an exhaust valve according to the pressure inside the particulate filter, by reducing the amount of the exhaust gas introduced per unit time from the combustion type heater 74 to the particulate filter when it is judged that the pressure inside the particulate filter is higher than a predetermined value, while increasing the amount of exhaust gas introduced per unit time from the combustion type heater 74 to the particulate filter when it is judged that the pressure in the particulate filter is lower than a predetermined value, the pressure inside the particulate filter is maintained near a predetermined value.

Figure 16:
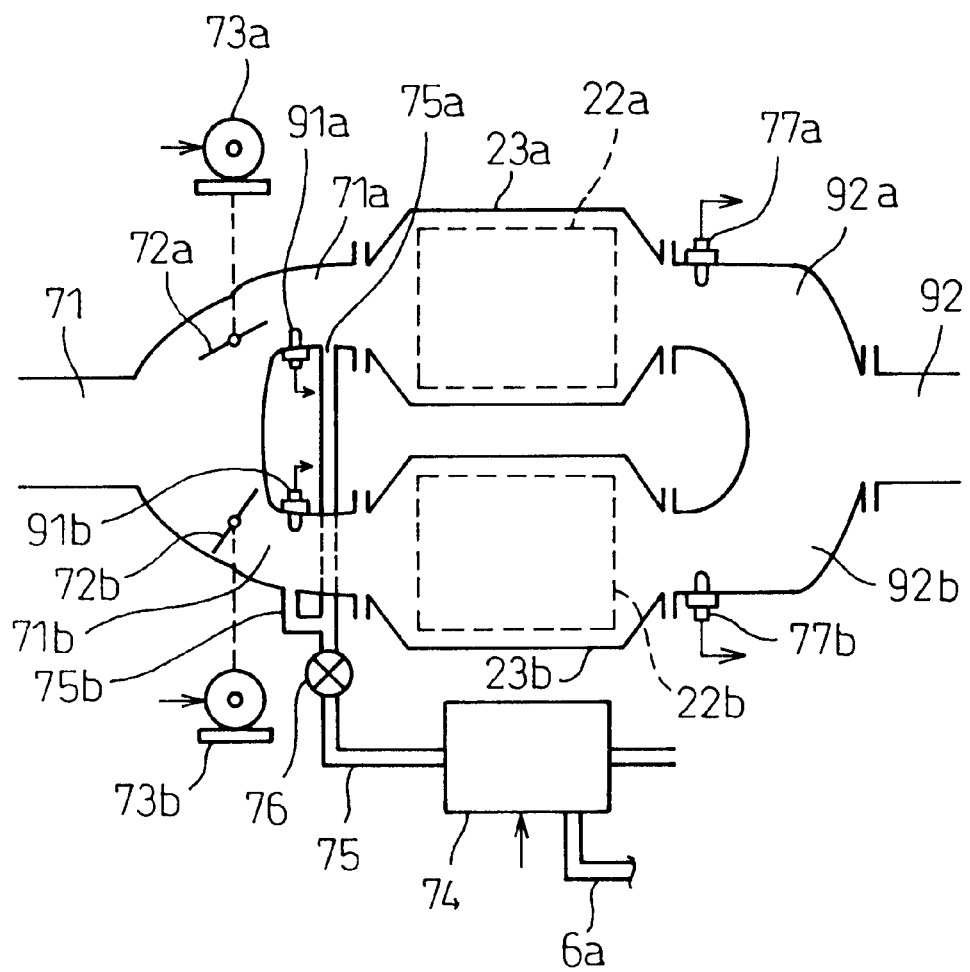
FIG. 16 is a view showing exhaust gas purification device of still another embodiment.

Note that instead of the configuration shown in FIG. 2, it is also possible to adopt the configuration shown in FIG. 16. In the configuration shown in FIG. 16, switch valves 72a and 72b are arranged in the upstream side exhaust branch passages 71a and 71b. These switch valves 72a and 72b are connected to corresponding step motors 73a and 73b. Further, the exhaust feed pipe 75 is branched into a first exhaust feed branch pipe 75a and a second exhaust feed branch pipe 75b. These exhaust feed branch pipes 75a and 75b are connected to upstream side exhaust branch passages 71a and 71b respectively, In this embodiment, when not feeding heater exhaust gas to the particulate filters 22a and 22b, the two switch valves 72a and 72b are fully opened, whereby the engine exhaust gas is made to flow into the two particulate filters 22a and 22b.

On the other hand, when feeding the heater exhaust gas to the first particulate filter 22a, the check valve 76 is opened, the exhaust feed pipe 75 is opened, the second switch valve 72b is left fully opened, the first switch valve 72a is fully closed, and the combustion type heater 74 is operated.

According to this, the inflow of the engine exhaust gas to the first particulate filter 22a is suppressed and almost all of the engine exhaust gas is made to flow into the second particulate filter 22b. Therefore, the pressure in the first upstream side exhaust branch passage 71a is lower than the pressure in the exhaust feed pipe 75, while the pressure inside the second upstream side exhaust branch passage 71b is higher than the pressure in the exhaust feed pipe 75. Therefore, almost none of the heater exhaust gas flows into the second upstream side exhaust branch passage 71b, while almost all of the heater exhaust gas flows into the first upstream side exhaust branch passage 71a. Therefore, the heater exhaust gas is fed to the first particulate filter 22a.

On the other hand, when heater exhaust gas is fed to the second particulate filter 22b, the check valve 76 is opened, the exhaust feed pipe 75 is opened, the first switch valve 72a is left fully opened, the second switch valve 72b is fully closed, and the combustion type heater 74 is made to operate. According to this, the heater exhaust gas is fed to the second particulate filter 22b.

Note that according to the present embodiment, it is possible to simultaneously feed heater exhaust gas to the two particulate filters 22a and 22b. If the two switch valves 72a and 72b are closed to simultaneously feed heater exhaust gas to the two particulate filters 22a and 22b, however, the engine exhaust gas will not be able to flow into either particulate filter, the back pressure will become extremely high, and the output of the internal combustion engine will end up falling. Therefore, in the present embodiment, either the heater exhaust gas is prevented from being fed simultaneously to the two particulate filters 22a and 22b or the heater exhaust gas is fed to the two particulate filters 22a and 22b without closing the switch valves 72a and 72b.

Figure 17:
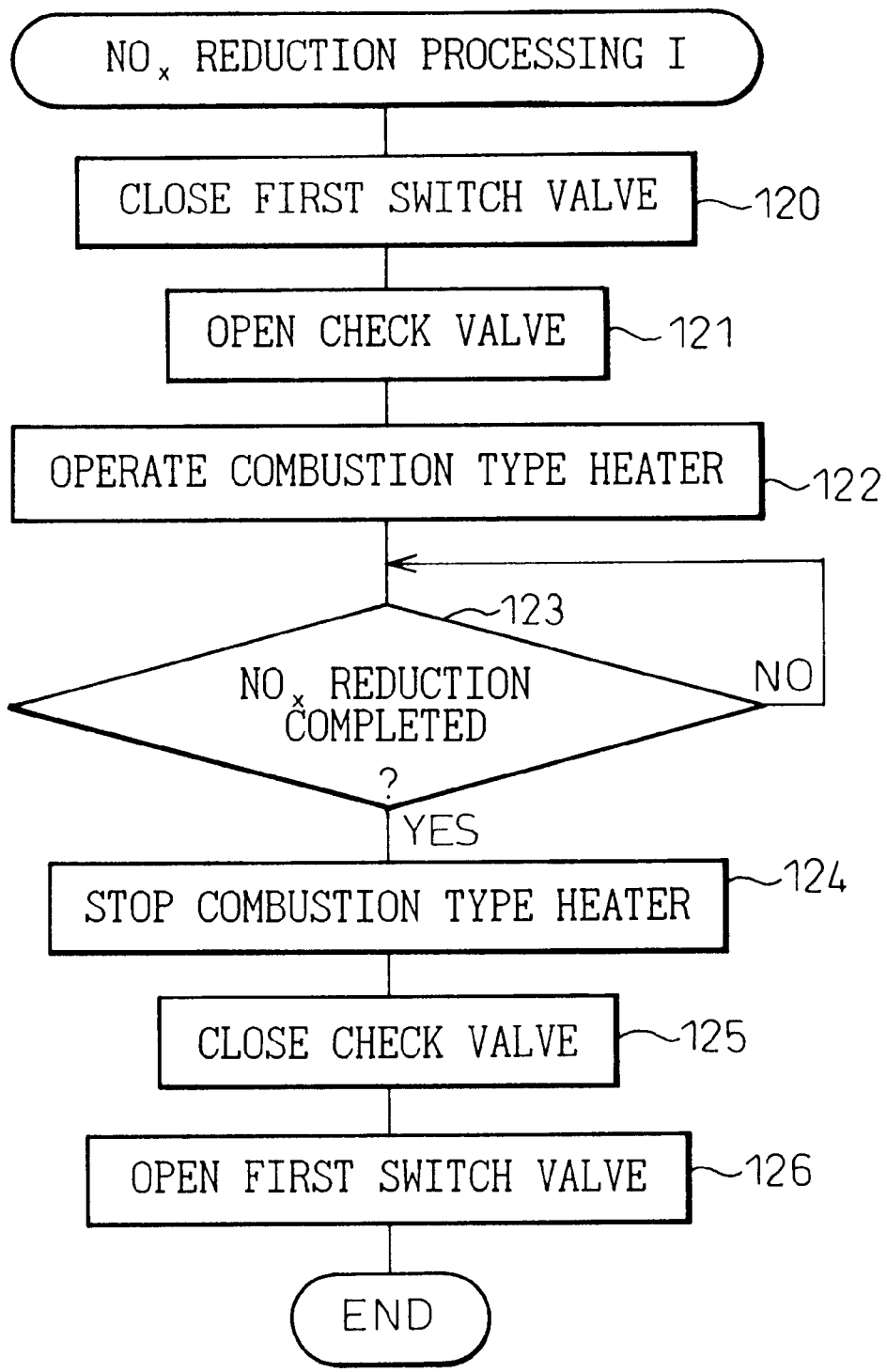
FIG. 17 is a flow chart for execution of $NO_x$ reduction processing I.

An example of the flow for executing the $NO_x$ reduction processing in an embodiment adopting the configuration shown in FIG. 16 is shown in FIG. 17. In the present embodiment, $NO_x$ purification processing is executed in accordance with the flow of FIG. 3, while the $NO_x$ reduction processing I of step 11 in the flow of FIG. 3 is executed in accordance with the flow of FIG. 17.

In FIG. 17, first, at step 120, the first switch valve 72a is closed, then at step 121, the check valve 76 is opened, then at step 122, the combustion type heater 74 is operated. Here, the rich air-fuel ratio exhaust gas is fed from the combustion type heater 74 to the first particulate filter 22a, and the $NO_x$ absorbed in the first $NO_x$ catalyst 22a is reduced and purified.

Next, at step 123, it is judged if the reduction and purification action of the $NO_x$ absorbed in the first $NO_x$ catalyst has been completed. When it is judged at step 123 that the $NO_x$ reduction and purification action has not been completed, the routine returns to step 123. Therefore, step 123 is repeated until it is judged at step 123 that the $NO_x$ reduction and purification action has been completed.

When it is judged at step 123 that the $NO_x$ reduction and purification action has been completed, the routine proceeds to step 124, where the operation of the combustion type heater 74 is stopped, then at step 125, the check valve 76 is closed, then at step 126, the first switch valve 72a is opened, and the routine is ended.

Note that in the present embodiment, the $NO_x$ reduction processing II at step 13 in the flow of FIG. 3 is executed in accordance with the flow of FIG. 17 except for the point explained below. That is, in the $NO_x$ reduction processing II, at step 120 of FIG. 17, the second switch valve 71b is closed, then at step 126, the second switch valve 72b is opened. The rest of the processing is the same as in the processing at the $NO_x$ reduction processing I of the present embodiment.

Note that in the embodiment employing the configuration shown in FIG. 16, when the combustion type heater 74 is being operated, the check valve 76 is opened. Therefore, in the configuration shown in FIG. 16, during the operation of the combustion type heater 74, the exhaust feed pipe 75 is made to open to the two upstream side exhaust branch passages 71a and 71b through the first exhaust feed branch pipe 75a and the second exhaust feed branch pipe 75b. Here, during the operation of the combustion type heater 74, the engine exhaust gas is flowing into one of the upstream side exhaust branch passages 71a and 71b, so the pressure in that upstream side exhaust branch passage becomes higher and there is a possibility of the engine exhaust gas flowing backward to the combustion type heater 74 through that upstream side exhaust branch passage.

In this case, particulate, HC, etc. build up in the exhaust feed pipes 75, 75a, and 75b and there is a possibility of the combustion type heater 74 subsequently malfunctioning. Therefore, to keep the operation of the combustion type heater 74 stable at all times, it is desirable to suppress back flow of the engine exhaust gas to the combustion type heater 74 even during operation of the combustion type heater 74.

Therefore, in the configuration shown in FIG. 16, pressure sensors 91a and 91b are arranged at the upstream side exhaust branch passages 71a and 71b at the downstream side of the switch valve 72. In this embodiment, during operation of the combustion type heater 74, when the pressure detected by the pressure sensor 91a or 91b becomes greater than a predetermined pressure, the check valve 76 is closed and the operation of the combustion type heater 74 is once stopped. According to this, since the back flow of the engine exhaust gas to the combustion type heater 74 is suppressed, the combustion type heater 74 operates stably at all times. Note that the predetermined pressure is set to the pressure where the engine exhaust gas starts to flow back to the combustion type heater 74.

Figure 18:
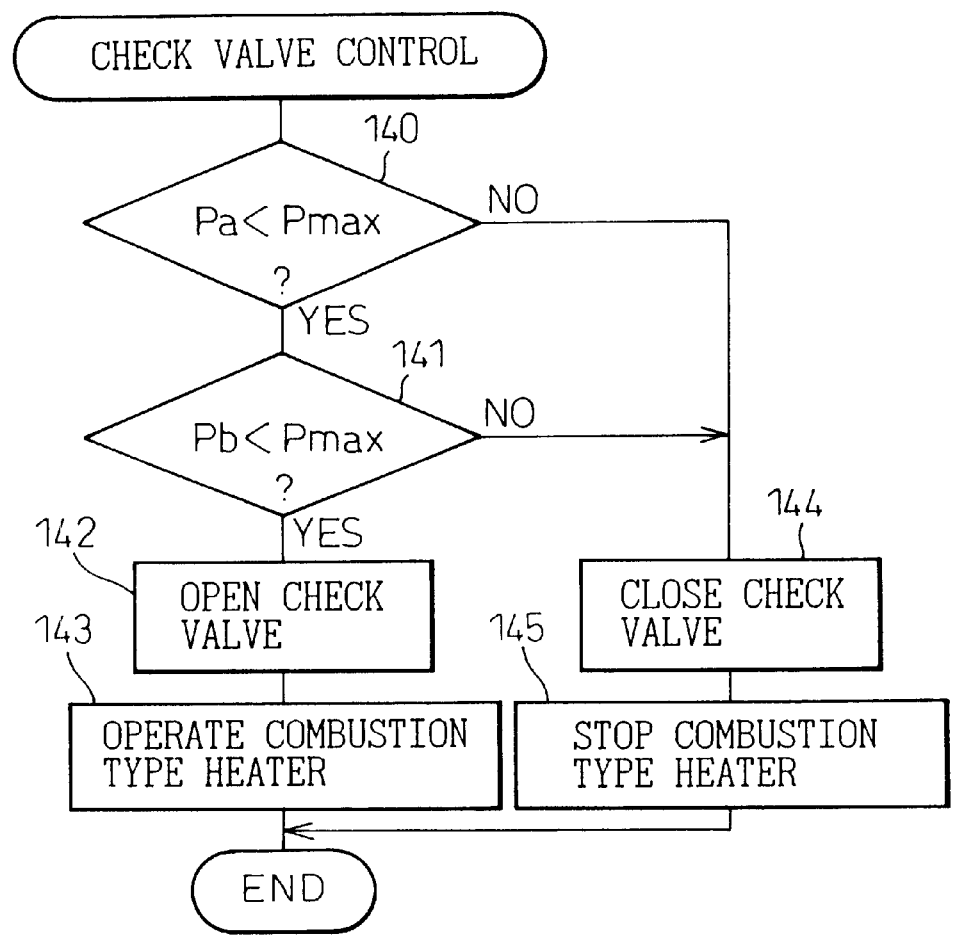
FIG. 18 is a flow chart for execution of check valve control.

An example of the flow for control of the opening and closing operation of the check valve 76 during operation of the combustion type heater 74 is shown in FIG. 18. In FIG. 18, first, at step 140, it is judged if the pressure Pa detected by the pressure sensor 91a arranged in the first upstream side exhaust branch passage 71a is lower than a predetermined pressure Pmax. When it is judged at step 140 that Pa<Pmax, the routine proceeds to step 141. On the other hand, when it is judged at step 140 that Pa≧Pmax, the routine proceeds to step 144, where the check valve 76 is closed, then at step 145, the operation of the combustion type heater 74 is stopped and the routine ended.

At step 141, it is judged if the pressure Pb detected by the pressure sensor 91b arranged at the second upstream side exhaust branch passage 71b is lower than the predetermined pressure Pmax. When it is judged at step 141 that Pb<Pmax, the routine proceeds to step 142, where the check valve 76 is opened, then at step 143, the combustion type heater 74 is operated and the routine ended. On the other hand, when it is judged at step 141 that Pb≧Pmax, the routine proceeds to step 144, where the check valve 76 is closed, then at step 145, the operation of the combustion type heater 74 is stopped and the routine ended.

Figure 19:
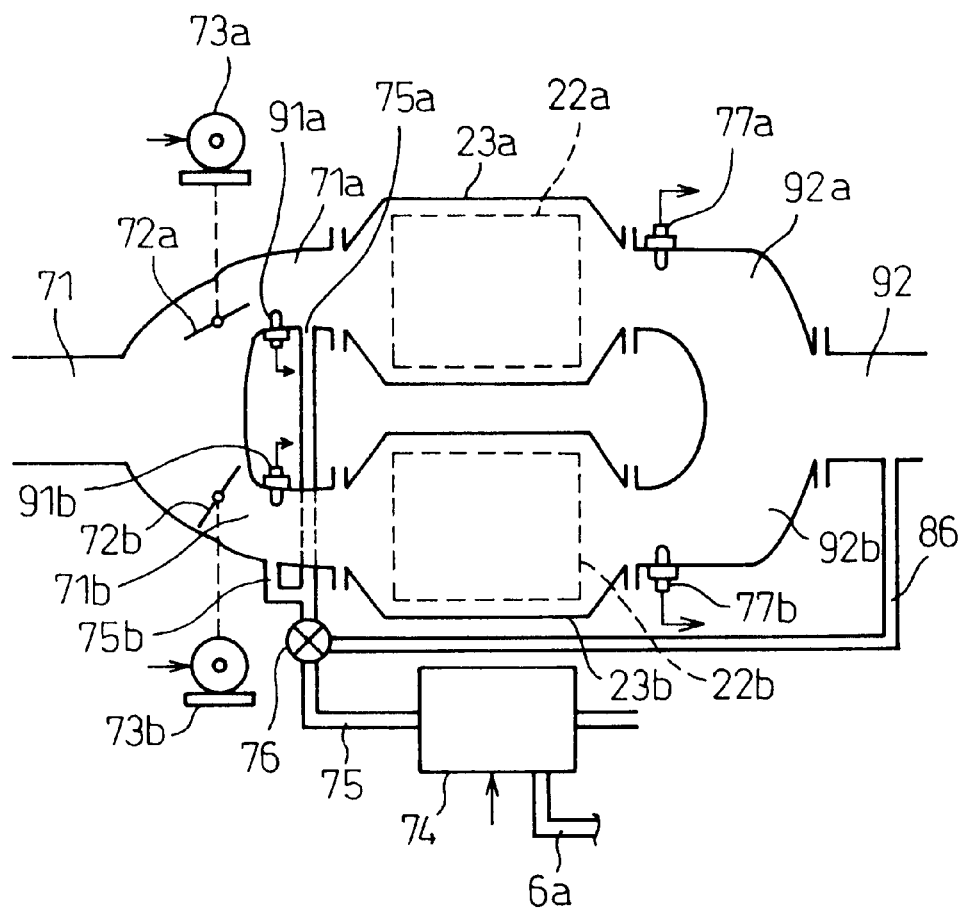
FIG. 19 is a view of exhaust gas purification device of still another embodiment.

Further, instead of the configuration shown in FIG. 16, it is also possible to adopt the configuration shown in FIG. 19 and execute the following back flow prevention control. That is, in FIG. 19, the check valve 76 is a three-way valve. This check valve 76 is connected to an exhaust relief passage 86 extending from the engine exhaust passage downstream of the particulate filter. In the back flow prevention control of the present embodiment, when the pressure detected by the pressure sensor 91a or 91b becomes higher than a predetermined pressure, the operating state of the check valve 76 is switched so that the exhaust gas emitted from the combustion type heater 74 (heater exhaust gas) is emitted to the engine exhaust passage 92 through the exhaust relief passage 86. When the pressures detected by the two pressure sensors 91a and 91b both become lower than the predetermined pressure, the operating state of the check valve 76 is switched so that the heater exhaust gas is emitted to the upstream side exhaust branch pipes 71a and 71b.

Note that the combustion type heater 74 produces exhaust gas by causing the same fuel to burn as the fuel fed to the engine body 1. Therefore, the combustion type heater 74 as well produces particulate and $NO_x$ though in small amounts. Of course, the heater exhaust gas emitted from the combustion type heater 74 passes through the particulate filters before being emitted to the atmosphere, so the particulate or $NO_x$ in the exhaust gas is processed by the particulate filters. However, to maintain the particulate oxidation removal level and the $NO_x$ purification level of the exhaust gas purification device 70 at high levels, it is desirable to suppress the amount of production of particulate or $NO_x$ in the combustion type heater 74.

Figure 20:
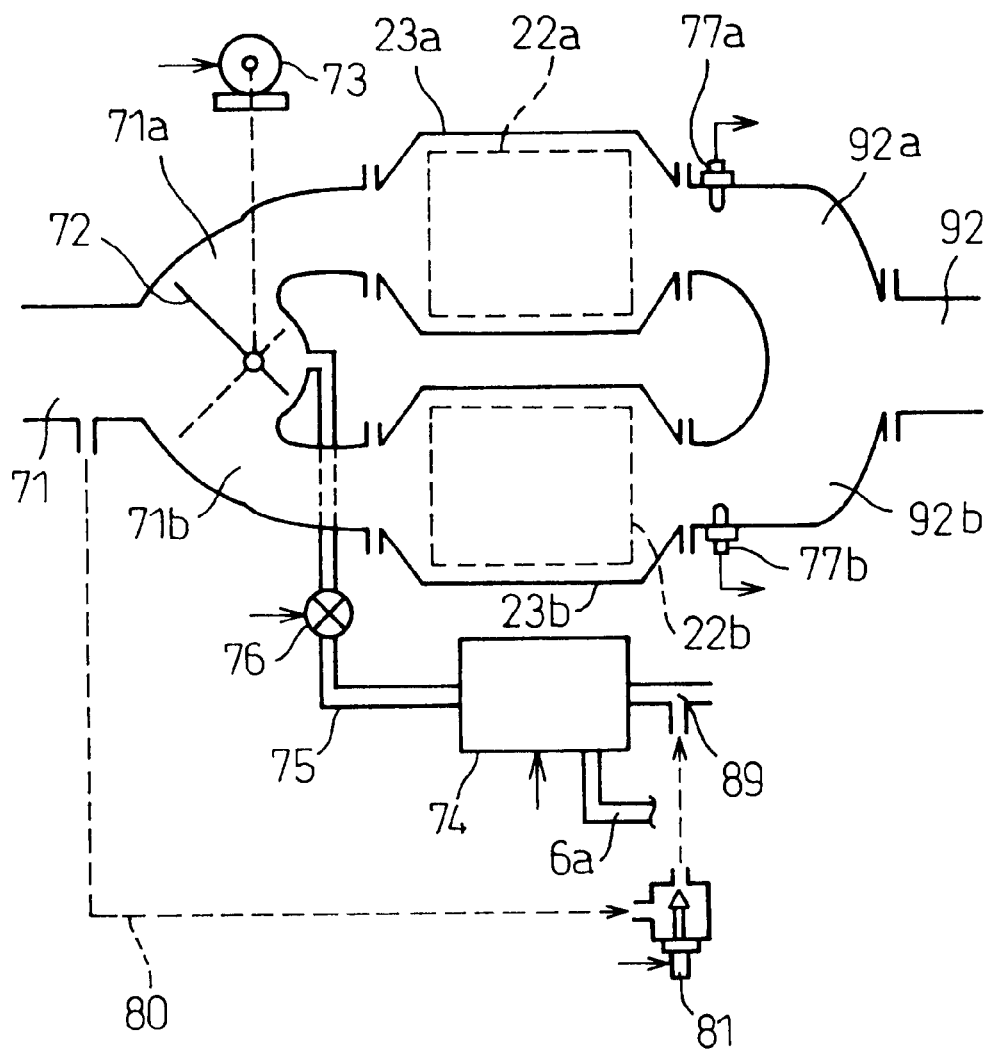
FIG. 20 is a view of exhaust gas purification device of still another embodiment.

Therefore, instead of the configuration shown in FIG. 2, it is also possible to adopt the configuration shown in FIG. 20 and execute the following particulate and $NO_x$ production suppression control. That is, in the configuration shown in FIG. 20, the engine exhaust passage 71 at the upstream side of the particulate filters 22a and 22b and the combustion type heater 74 are connected through an exhaust introduction pipe 80. In this exhaust introduction pipe 80 is arranged an introduction control valve 81 for controlling the amount of the engine exhaust gas introduced to the combustion type heater 74. In the particulate and $NO_x$ production suppression control of the present embodiment, during operation of the combustion type heater 74, the operation of the introduction control valve 81 is controlled so that a predetermined amount of the engine exhaust gas is introduced from the engine exhaust passage 71 at the upstream side of the particulate filters 22a and 22b to the combustion type heater 74.

In the particulate and $NO_x$ production suppression control of the present embodiment, the amount of the engine exhaust gas introduced to the combustion type heater 74 is set to an amount where the later explained so-called "low temperature combustion" is performed at the combustion type heater 74. If enabling low temperature combustion at the combustion type heater 74, the amount of production of the particulate and $NO_x$ in the combustion type heater 74 becomes extremely small.

Figure 21:
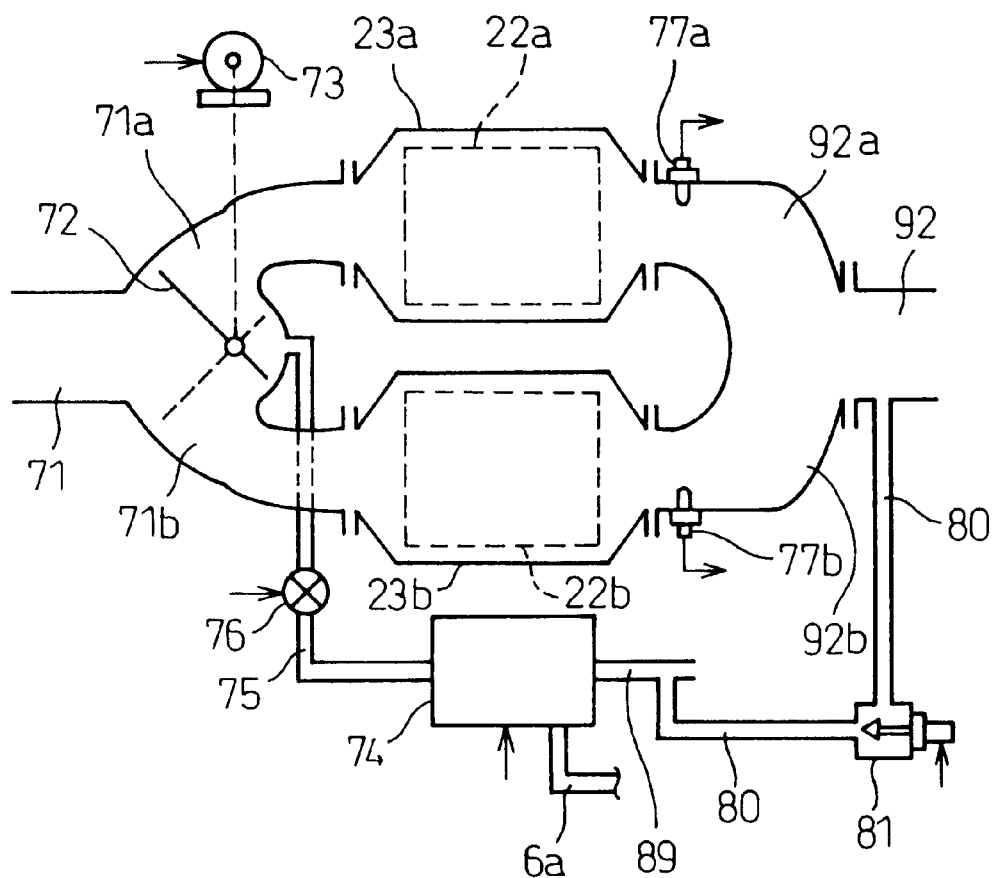
FIG. 21 is a view of exhaust gas purification device of still another embodiment.

Further, instead of the configuration shown in FIG. 20, it is also possible to adopt the configuration shown in FIG. 21 and execute the following particulate and $NO_x$ production suppression control. That is, in the configuration shown in FIG. 21, the engine exhaust passage 92 at the downstream side of the particulate filters and the air feed pipe 89 are connected through the exhaust introduction pipe 80. In the exhaust introduction pipe 80 is arranged an introduction control valve 81 for controlling the amount of the engine exhaust gas introduced to the combustion type heater 74. Further, in the particulate and $NO_x$ production suppression control of the present embodiment, during operation of the combustion type heater 74, the operation of the introduction control valve 81 is controlled so that the predetermined amount of the engine exhaust gas is introduced from the engine exhaust passage 92 at the downstream side of the particulate filters 22a and 22b to the combustion type heater 74. In the present embodiment as well, the amount of the engine exhaust gas introduced to the combustion type heater 74 is set to an amount where the later explained low temperature combustion is performed in the combustion type heater 74.

According to this, exhaust gas treated for particulate or HC by the particulate filters is introduced to the combustion type heater 74. Therefore, the concentration of the particulate or HC in the exhaust gas introduced into the combustion type heater 74 is extremely low. For this reason, in addition to the effects obtained from the embodiment shown in FIG. 20, according to the present embodiment, the clogging of the exhaust introduction pipe due to the deposition of the particulate or HC in the exhaust introduction pipe 80 is suppressed.

Note that during execution of the $NO_x$ reduction processing or S-ingredient release processing, the air-fuel ratio of the heater exhaust gas fed to the particulate filters is rich. Therefore, the exhaust gas flowing out from the particulate filters contains, though in a small amount, HC. Therefore, in the embodiment employing the configuration shown in FIG. 21, during operation of the combustion type heater 74, the exhaust gas flowing out from the particulate filters is introduced to the combustion type heater 74. Therefore, at this time, the HC in the exhaust gas introduced to the combustion type heater 74 might build up in the exhaust introduction pipe 80 or introduction control valve 81 and make it impossible for the predetermined amount of the exhaust gas to be introduced to the combustion type heater 74.

Therefore, during operation of the combustion type heater 74, to introduce the predetermined amount of exhaust gas to the combustion type heater 74, it is desirable that the exhaust gas introduced to the combustion type heater 74 not contain HC.

Figure 22:
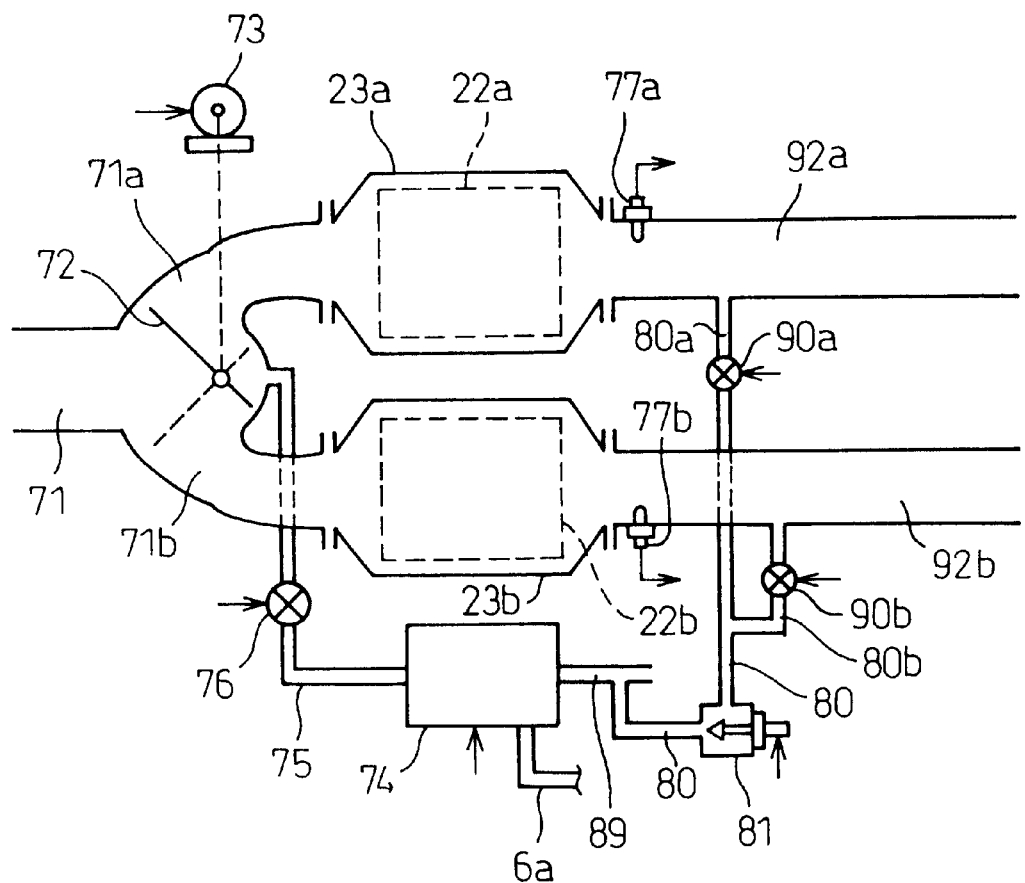
FIG. 22 is a view of exhaust gas purification device of still another embodiment.

Therefore, instead of the configuration shown in FIG. 21, it is also possible to employ the configuration shown in FIG. 22 and execute the following particulate and $NO_x$ production suppression control. That is, in the configuration shown in FIG. 22, the downstream side exhaust branch passages 92a and 92b are made to open to the atmosphere as they are without being merged. The first downstream side exhaust branch passage 92a has a first exhaust introduction branch pipe 80a connected to it, while the second downstream side exhaust branch passage 92b has the second exhaust introduction branch pipe 80b connected to it. These exhaust introduction branch pipes 80a and 80b are connected to a common exhaust introduction pipe 80. The exhaust introduction pipe 80 is connected to an air feed pipe 89. Further, the exhaust introduction pipe 80 has the introduction control valve 81 arranged in it, the first exhaust introduction branch pipe 80a has a first introduction control valve 90a for opening or shutting the flow path arranged in it, and the second exhaust introduction branch pipe 80b has a second introduction control valve 90b for opening or shutting the flow path arranged in it.

Further, in the particulate and $NO_x$ production suppression control of the present embodiment, exhaust gas is introduced to the combustion type heater 74 only through the exhaust introduction branch pipe connected to the downstream side exhaust branch passage where the inflow of the engine exhaust gas is not being suppressed by the switch valve 72. That is, during operation of the combustion type heater 74, the introduction control valve arranged in the exhaust introduction branch pipe connected to the downstream side exhaust branch passage where the inflow of engine exhaust gas is being suppressed is left in the closed state, the flow path of the exhaust introduction branch pipe is left shut, on the other hand, the introduction control valve arranged in the exhaust introduction branch pipe connected to the downstream side exhaust passage where the inflow of engine exhaust gas is not being suppressed is opened, the flow path of the exhaust introduction branch pipe is opened, and the introduction control valve 81 is controlled, whereby the exhaust gas is introduced to the combustion type heater 74 while the amount of the exhaust gas introduced to the combustion type heater 74 is controlled.

According to this, when rich air-fuel ratio exhaust gas is introduced from the combustion type heater 74 to the particulate filters, the amount of the HC in the exhaust gas introduced to the combustion type heater 74 is smaller than the case of introduction of exhaust gas from the engine exhaust passage downstream of the exhaust passage merging region to the combustion type heater 74. Therefore, the buildup of HC in the exhaust introduction pipe 80 or introduction control valve 81 is suppressed. Therefore, according to the present embodiment, a predetermined amount of exhaust gas is introduced to the combustion type heater 74.

Figure 23:
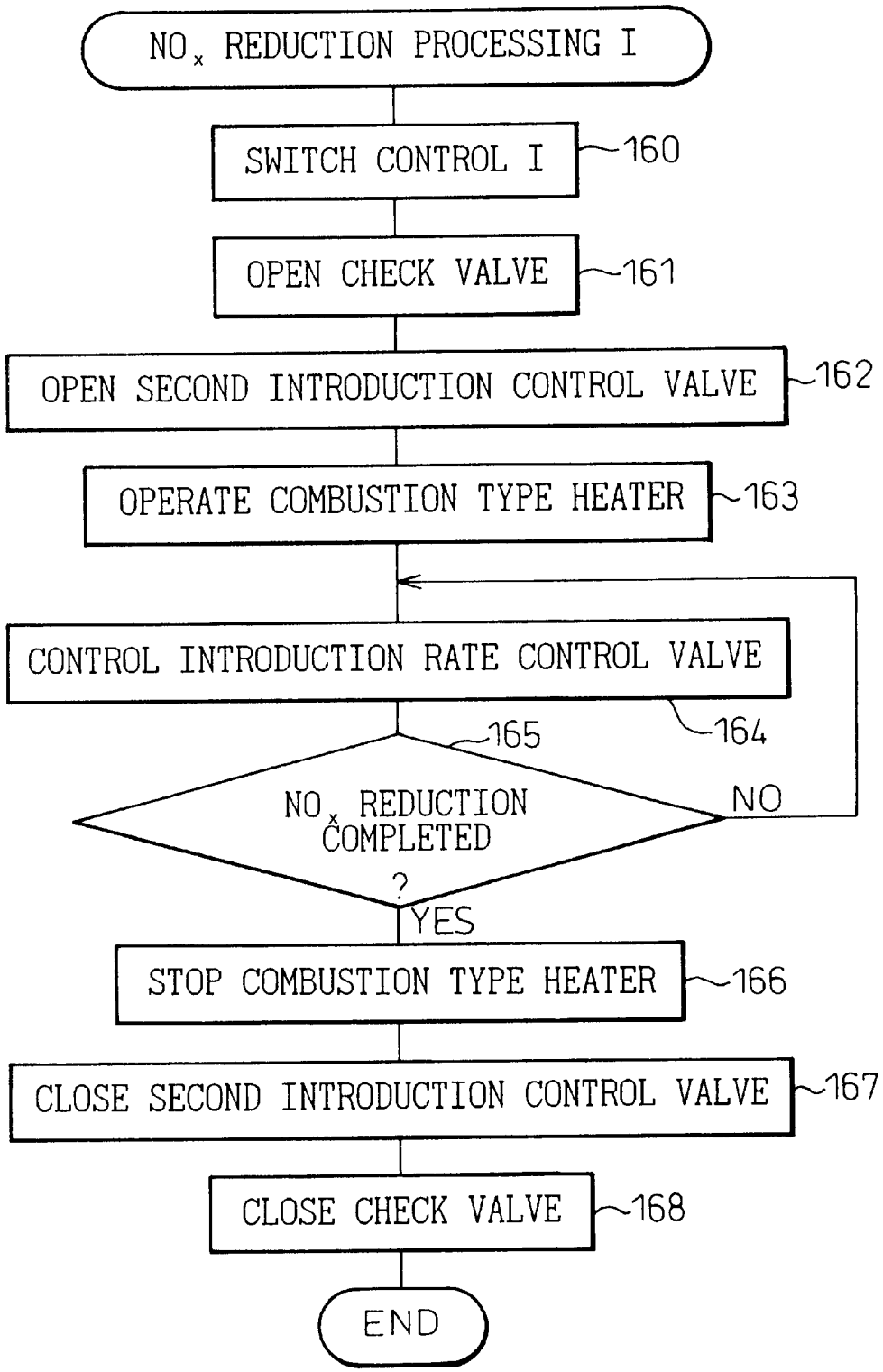
FIG. 23 is a flow chart for execution of $NO_x$ reduction processing I.

An example of the flow for execution of the $NO_x$ reduction processing I in the embodiment employing the configuration shown in FIG. 22 is shown in FIG. 23. The $NO_x$ purification processing in the present embodiment is executed by the flow of FIG. 3, while the $NO_x$ reduction processing I of step 11 of FIG. 3 is executed in accordance with the flow shown in FIG. 23.

In the flow of FIG. 23, first, at step 160, the switch control I is executed. In this switch control I, the operating state of the switch valve 72 is switched to the first operating state so that the inflow of engine exhaust gas to the first particulate filter 22a is suppressed. Next, at step 161, the check valve 76 is opened, then at step 162, the second introduction control valve 90b is opened, then at step 163, the combustion type heater 74 is operated. Here, the rich air-fuel ratio exhaust gas is fed from the combustion type heater 74 to the first particulate filter 22a, and the $NO_x$ absorbed in the first $NO_x$ catalyst is reduced and purified.

Next, at step 164, the amount of opening of the introduction control valve 81, that is, the amount of exhaust gas introduced to the combustion type heater 74, is controlled to become a desired amount. Next, at step 165, it is judged if the reduction and purification action of the $NO_x$ absorbed in the first $NO_x$ catalyst has been completed. When it is judged at step 165 that the $NO_x$ reduction and purification action has not been completed, the routine returns to step 164. Therefore, steps 164 and 165 are repeated until it is judged at step 165 that the $NO_x$ reduction and purification action has been completed.

When it is judged at step 165 that the $NO_x$ reduction and purification action has been completed, the routine proceeds to step 166, where the combustion type heater 74 is stopped, then at step 167, the second introduction control valve 90b is closed, then at step 168, the check valve 76 is closed and the routine is ended.

Further, in the present embodiment, the $NO_x$ reduction processing II in the flow of FIG. 3 is executed in accordance with the flow of FIG. 23 except for the point explained below. That is, in the $NO_x$ reduction processing II, the switch control II is executed at step 160 of FIG. 23. That is, at step 160 of FIG. 23, the operating state of the switch valve 72 is switched to the second operating state so that inflow of the engine exhaust gas to the second particulate filter 22b is suppressed. Further, in the $NO_x$ reduction processing II of the present embodiment, at step 162 of FIG. 23, the first introduction control valve 90a is opened, and at step 167 of FIG. 23, the first introduction control valve 90a is closed. The rest of the processing is the same as the processing at the $NO_x$ reduction processing I of the present embodiment.

Figure 24:
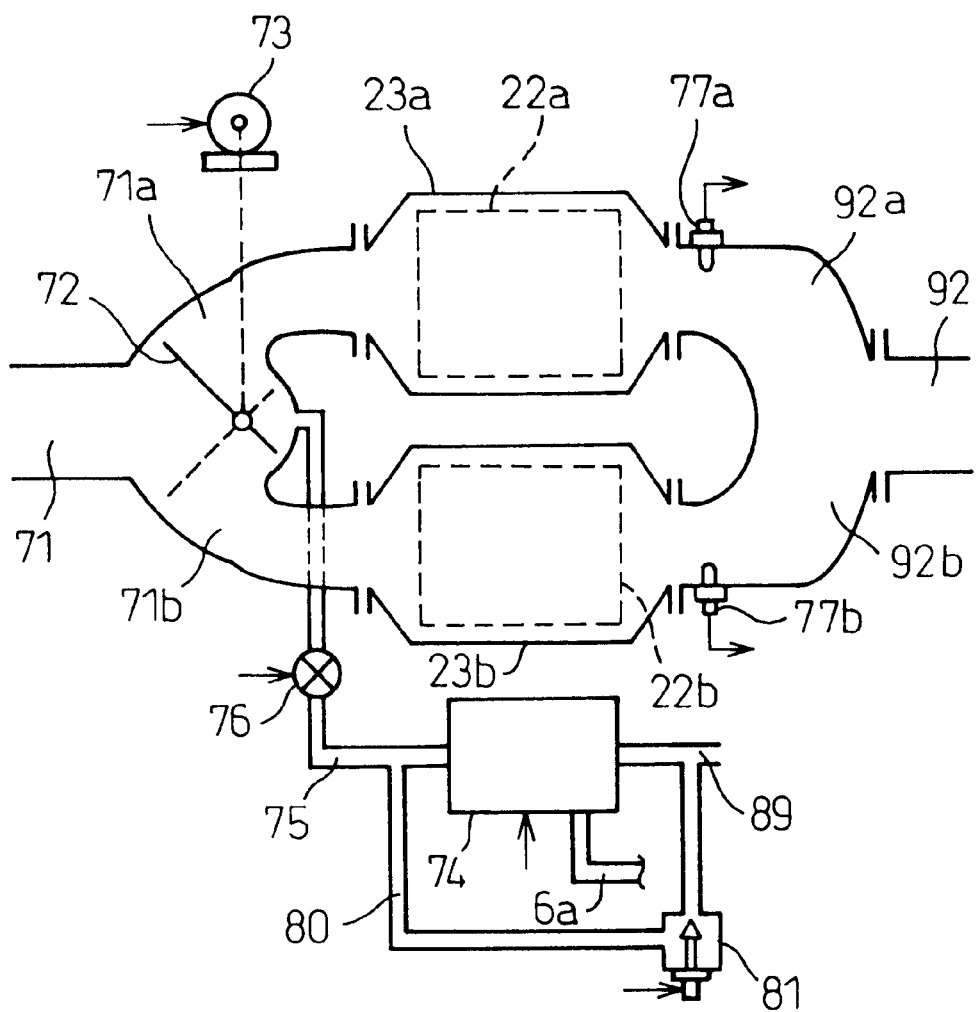
FIG. 24 is a view of exhaust gas purification device of still another embodiment.

Note that instead of the configuration shown in FIG. 20, it is also possible to employ the configuration shown in FIG. 24 and to execute the particulate and $NO_x$ production suppression control in the embodiment employing the configuration shown in FIG. 20. That is, in the configuration shown in FIG. 24, the exhaust introduction pipe 80 is connected to the exhaust feed pipe 75. According to this, during operation of the combustion type heater 74, the heater exhaust gas emitted from the combustion type heater 74 is made to be introduced to the combustion type heater 74.

Figure 25:
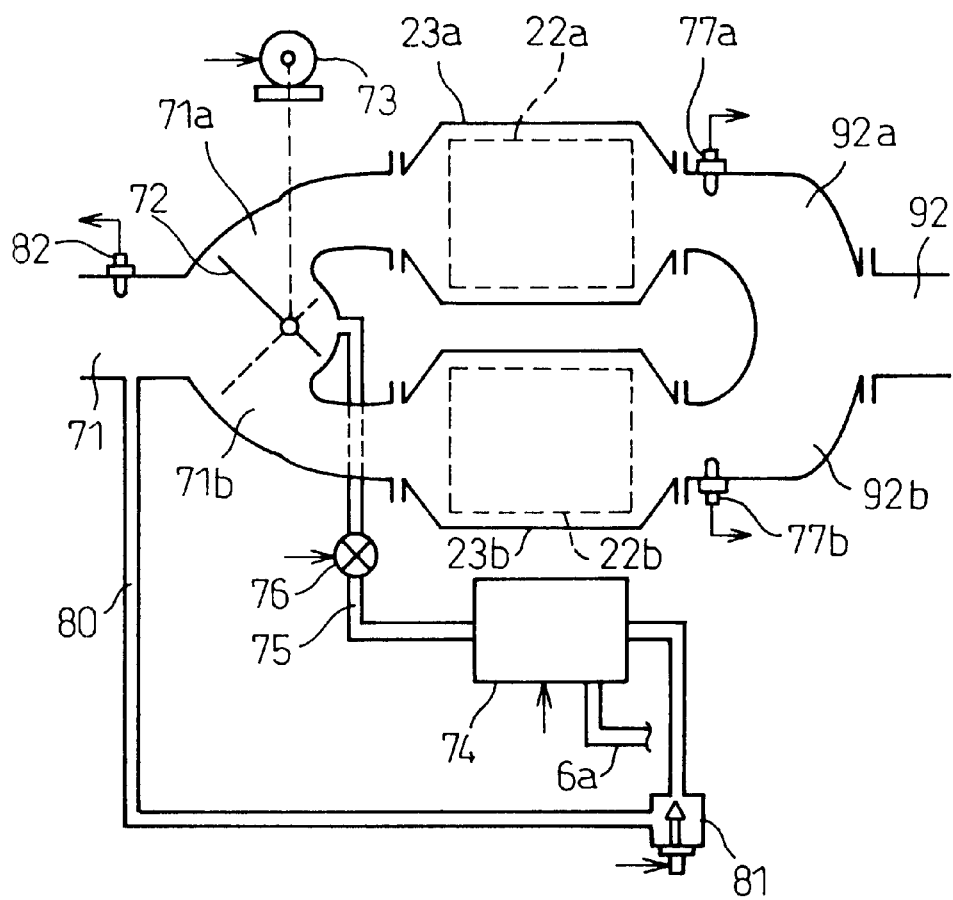
FIG. 25 is a view of exhaust gas purification device of still another embodiment.

Further, instead of the configuration shown in FIG. 20, it is possible to employ the configuration shown in FIG. 25 and execute the particulate and $NO_x$ production suppression control in the embodiment employing the configuration shown in FIG. 20. That is, in the configuration shown in FIG. 25, the atmosphere feed pipe is not connected to the combustion type heater 74. The exhaust introduction pipe 80 is connected to the combustion type heater 74. According to this, during operation of the combustion type heater 74, only engine exhaust gas is introduced to the combustion type heater 74. That is, in the combustion type heater 74, the fuel is made to be burned by the oxygen in the engine exhaust gas.

If the fuel is made to burn by the oxygen in the engine exhaust gas in the combustion type heater 74 in this way, in addition to the effects obtained from the embodiment employing the configuration shown in FIG. 20, it is possible to obtain the following effects. That is, since the concentration of oxygen in the engine exhaust gas is lower than the concentration of oxygen in the atmosphere, if introducing the engine exhaust gas as the gas for feeding the oxygen for making the fuel burn in the combustion type heater 74, compared with the case of introducing the atmosphere to the combustion type heater 74, the effect is obtained that the amount of the fuel required for making the air-fuel ratio of the heater exhaust gas rich may be made smaller.

Further, if producing rich air-fuel ratio heater exhaust gas from the same amount of fuel at the combustion type heater 74, the amount of engine exhaust gas introduced to the combustion type heater 74 becomes greater than the amount of fresh air in the case of introducing fresh air, the inside of the particulate filter can be made a uniformly rich atmosphere, and the $NO_x$ reduction processing efficiency is improved.

Of course, in the present embodiment, it is also possible to introduce the exhaust gas to the combustion type heater 74 from the engine exhaust passage at the downstream side of the particulate filters rather than introduce the engine exhaust gas to the combustion type heater 74 from the engine exhaust passage at the upstream side of the particulate filters.

When trying to introduce the engine exhaust gas to the combustion type heater 74, in particular when introducing only engine exhaust gas to the combustion type heater 74 without introducing air in the atmosphere to the combustion type heater 74, however, if the concentration of oxygen in the engine exhaust gas is low enough that combustion cannot be performed well in the combustion type heater 74, it is not possible to feed high temperature heater exhaust gas as desired to the particulate filter.

Therefore, in the configuration shown in FIG. 25, an oxygen concentration sensor 82 able to detect the concentration of oxygen in the engine exhaust gas is arranged in the upstream side engine exhaust passage 71. In the present embodiment, the engine operation is controlled so as to maintain the concentration of oxygen in the engine exhaust gas to at least a concentration of a degree where combustion in the combustion type heater 74 is sufficiently performed using the detected concentration of the oxygen concentration sensor 82. According to this, the combustion type heater 74 can be operated well at all times.

Note that if introducing only the engine exhaust gas into the combustion type heater 74 without introducing the air in the atmosphere into the combustion type heater 74 in this way and controlling the engine operation so as to maintain the concentration of oxygen in the engine exhaust gas at least at a concentration of an extent where combustion in the combustion type heater 74 can be sufficiently performed, oxygen should be fed to the combustion type heater 74 by another means when the concentration of oxygen in the engine exhaust gas cannot be maintained at least at a predetermined concentration by control of the engine operation or when the control of the engine operation should not be changed to maintain the concentration of oxygen in the engine exhaust gas at least at the predetermined concentration.

Figure 26:
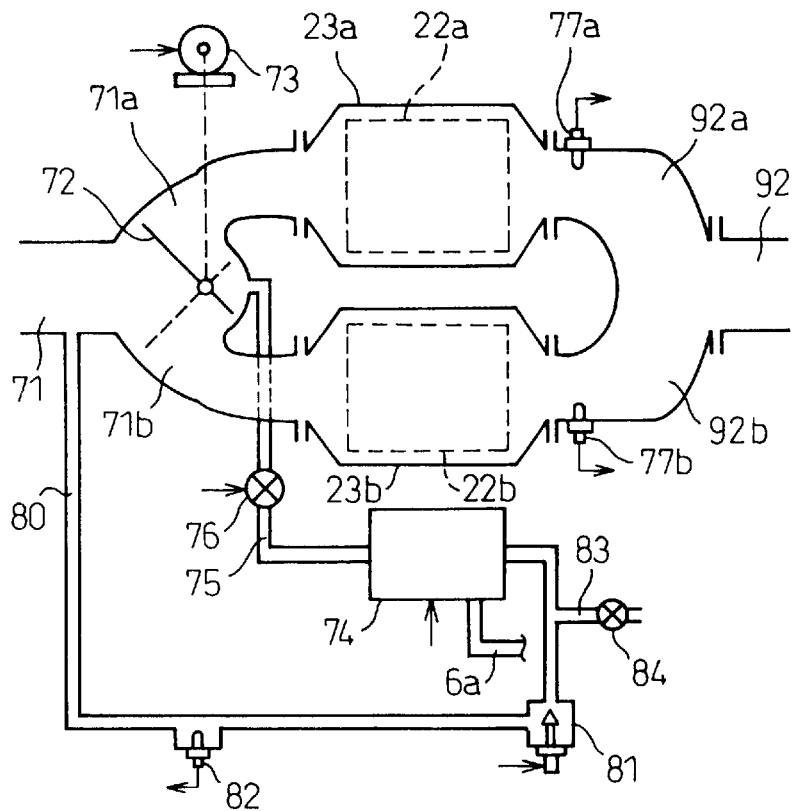
FIG. 26 is a view of exhaust gas purification device of still another embodiment.

Therefore, instead of the configuration shown in FIG. 25, it is also possible to employ the configuration shown in FIG. 26 and execute the following oxygen feed concentration. That is, in the configuration shown in FIG. 26, the exhaust introduction pipe 80 has an air introduction pipe 83 open to the atmosphere connected to it. An air control valve 84 for controlling the amount of the air introduced to the exhaust introduction pipe 80 is arranged in this air introduction pipe 83, while an oxygen concentration sensor 82 for detecting the concentration of oxygen in the engine exhaust gas is arranged in the exhaust introduction pipe 80 at the upstream side of the introduction control valve 81. In the oxygen feed control of the present embodiment, when the concentration of oxygen in the engine exhaust gas introduced to the combustion type heater 74 during operation of the combustion type heater 74 is less than the concentration of the extent where combustion in the combustion type heater 74 is sufficiently performed, the opening and closing action of the air control valve 84 is controlled so that an amount of air so that an amount of oxygen making up for the shortfall is introduced to the combustion type heater 74 is introduced to the combustion type heater 74. According to this, the combustion type heater 74 can be operated well at all times.

Figure 27:
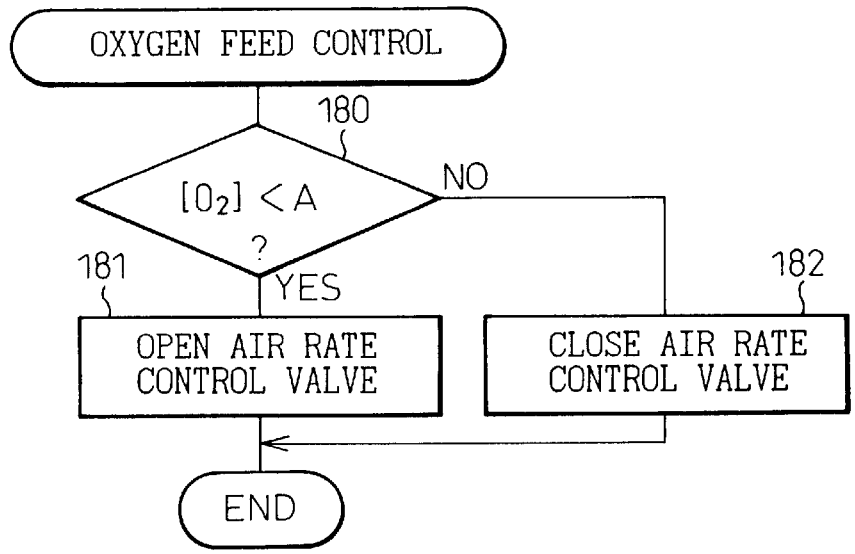
FIG. 27 is a flow chart for execution of air control valve control.

An example of the flow for executing the oxygen feed control of the present embodiment is shown in FIG. 27. In FIG. 27, first, at step 180, it is judged if the concentration of oxygen ($O_2$) in the engine exhaust gas is smaller than a predetermined concentration A. Here, the predetermined concentration A is set to a concentration of oxygen necessary for the combustion in the combustion type heater 74 to be performed well as desired.

When it is judged at step 180 that $[O_2]<A$, the routine proceeds to step 181, where the air control valve 84 is opened and the routine is ended. On the other hand, when it is judged at step 180 that $[O_2] \geq A$, the routine proceeds to step 182, where the air control valve 84 is closed and the routine is ended.

Note that in the present embodiment, the concentration of oxygen in the engine exhaust gas introduced into the combustion type heater 74 is detected by the oxygen concentration sensor 82, but it is also possible for example to calculate the concentration of oxygen from the air-fuel ratio of the engine exhaust gas introduced to the combustion type heater 74. Further, in the present embodiment, the opening and closing operation of the air control valve 84 is controlled based on the concentration of oxygen in the engine exhaust gas introduced into the combustion type heater 74, but it is also possible to control the opening and closing operation of the air control valve 84 based on the amount of oxygen introduced into the combustion type heater 74 per unit time calculated based on the concentration of oxygen in the engine exhaust gas and the amount of air taken into the engine body 1.

In the above embodiment, when the rich air-fuel ratio heater exhaust gas starts to be fed to a particulate filter to execute the $NO_x$ reduction processing or S-ingredient release processing, the concentration of oxygen in the exhaust gas flowing out from the particulate filter (hereinafter referred to as the "outflowing exhaust gas") falls. That is, as shown by the time chart of FIG. 28A, when the rich air-fuel ratio heater exhaust gas starts to be fed to the particulate filter at the time ts, the concentration of oxygen $[O_2]$ in the outflowing exhaust gas immediately falls and becomes lower than the boundary concentration LR. The boundary concentration LR here is the concentration of oxygen dividing the oxidizing atmosphere and reducing atmosphere. Therefore, at this time, the atmosphere in the particulate filter becomes a reducing atmosphere and the $NO_x$ in the $NO_x$ catalyst is reduced.

Along with the reduction of the $NO_x$ or the release of the S-ingredient, the concentration of oxygen $[O_2]$ in the outflowing exhaust gas further falls. When almost all of the $NO_x$ absorbed in the $NO_x$ catalyst is reduced or when almost all of the S-ingredient absorbed in the $NO_x$ catalyst is released, the concentration of oxygen $[O_2]$ in the outflowing exhaust gas becomes substantially zero.

As explained above, however, it is not possible to completely suppress the inflow of engine exhaust gas to a particulate filter during the $NO_x$ reduction processing or S-ingredient release processing by just the switch valve 72. That is, engine exhaust gas flows into the particulate filter during the $NO_x$ reduction processing or S-ingredient release processing as well. Further, the amount of the engine exhaust gas flowing into the particulate filter (hereinafter referred to as "the amount of the leakage engine exhaust gas") differs depending on the period of use of the switch valve 72, the pressure of the engine exhaust gas at the upstream side of the exhaust gas purification device 70, etc.

Therefore, when maintaining the richness of the air-fuel ratio of the heater exhaust gas at a certain degree, if the amount of leakage engine exhaust gas is relatively large, the atmosphere in the particulate filter cannot be made a reducing atmosphere.

That is, as shown by the time chart of FIG. 28B, if the rich air-fuel ratio heater exhaust gas starts to be fed at the time ts, the concentration of oxygen [$O_2$] in the outflowing exhaust gas immediately falls, but does not become lower than the boundary concentration LR. That is, the atmosphere in that particulate filter does not become a reducing atmosphere. Therefore, $NO_x$ is not released from the $NO_x$ catalyst or the S-ingredient is not released from the $NO_x$ catalyst and even after time elapses, the concentration of oxygen [$O_2$] in the outflowing exhaust gas will not fall much at all. In this case, not only will the fuel consumed in the combustion type heater 74 be wasted, but also the $NO_x$ in the $NO_x$ catalyst will not be able to be reduced and purified or the S-ingredient in the $NO_x$ catalyst will not be able to be released.

On the other hand, when maintaining the richness of the air-fuel ratio of the heater exhaust gas at a certain degree, if the amount of leakage engine exhaust gas is relatively small, the atmosphere in the particulate filter will end up becoming an excessively reducing atmosphere.

That is, as shown by the time chart of FIG. 28C, if the rich air-fuel ratio heater exhaust gas starts to be fed at the time ts, the concentration of oxygen [$O_2$] in the outflowing exhaust gas will immediately fall and pass the boundary concentration LR to end up becoming substantially zero. In this case, the HC fed to the particulate filter will be wasted and will end up flowing out to downstream of the particulate filter.

Therefore, to reliably reduce the $NO_x$ during the $NO_x$ reduction processing or reliably cause the release of the S-ingredient from the $NO_x$ catalyst during the S-ingredient release processing, it is desirable that the air-fuel ratio of the heater exhaust gas fed to the particulate filter be controlled to an air-fuel ratio whereby the amount of HC necessary for purification of the $NO_x$ or the amount of HC necessary for release of the S-ingredient will be fed exactly as required.

Figure 29:
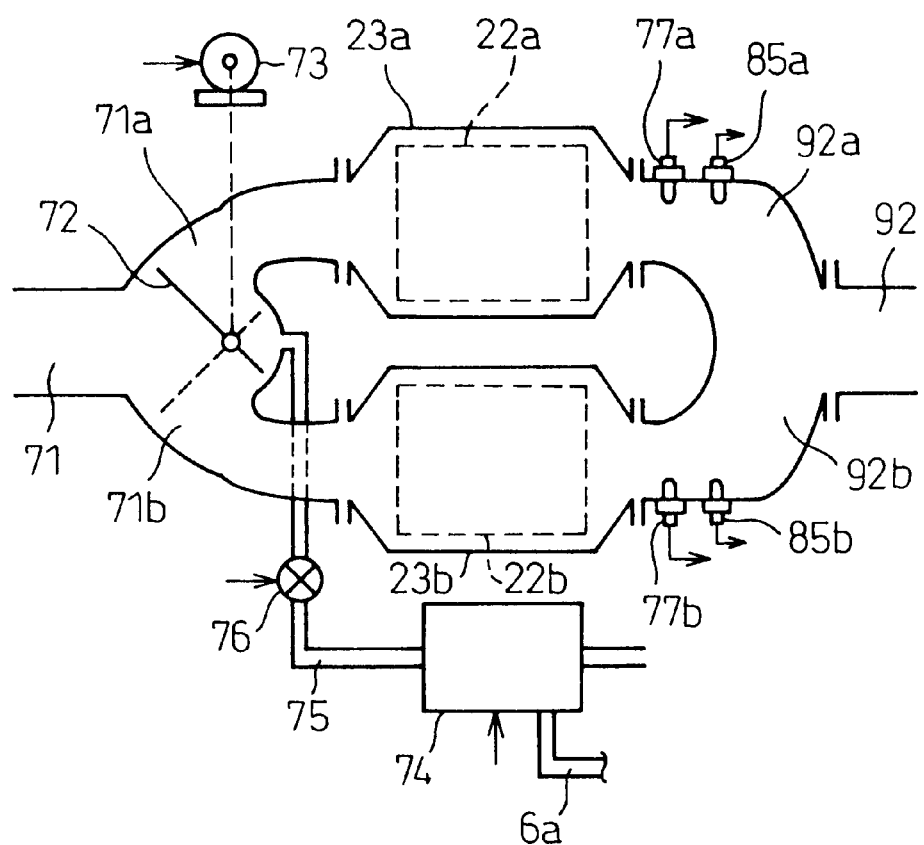
FIG. 29 is a view of exhaust gas purification device of still another embodiment.

Therefore, instead of the configuration shown in FIG. 2, it is also possible to employ the configuration shown in FIG. 29 and execute the following air-fuel ratio control. That is, in the configuration shown in FIG. 29, air-fuel ratio sensors 85a and 85b able to detect the air-fuel ratios of the exhaust gas flowing out from the particulate filters, more generally oxygen concentration sensors 85a and 85b able to detect the concentration of oxygen in the exhaust gas flowing out from the particulate filters, are arranged in the corresponding exhaust branch passages 71a and 71b.

Further, in the air-fuel ratio control of the present embodiment, when the concentration of oxygen detected by an oxygen concentration sensor 85a or 85b (hereinafter referred to as "the detected concentration of oxygen") during the $NO_x$ reduction processing or S-ingredient reduction processing is higher than a target concentration lower than the boundary concentration, the richness of the heater exhaust gas is made larger or the amount of exhaust gas flowing out from the combustion type heater 74 per unit time is made greater. On the other hand, when the detected concentration of oxygen is lower than the target concentration, the richness of the heater exhaust gas is made smaller or the amount of exhaust gas emitted from the combustion type heater 74 per unit time is made smaller.

When executing the air-fuel ratio control of the present embodiment in this way, for example, the concentration of oxygen in the outflowing exhaust gas changes as shown in FIGS. 30A–30C. For example, when the amount of leakage engine exhaust gas is relatively large, the concentration of oxygen in the outflowing exhaust gas changes as shown by FIG. 30A. That is, when rich air-fuel ratio heater exhaust gas starts to be fed to a particulate filter at the time ts, the concentration of oxygen [$O_2$] in the outflowing exhaust gas immediately falls, but the boundary concentration LR is not exceeded and therefore the target concentration TO is also not reached.

At this time, according to the air-fuel ratio control of the present embodiment, the degree of richness of the heater exhaust gas is gradually made to increase. Therefore, the concentration of oxygen [$O_2$] in the outflowing exhaust gas falls and passes the boundary concentration LR to reach the target concentration TO. In this case, after that, the $NO_x$ reduction or S-ingredient release proceeds, so the concentration of oxygen [$O_2$] gradually falls and becomes substantially zero.

On the other hand, when executing the air-fuel ratio control of the present embodiment, if the amount of leakage engine exhaust gas is relatively small, the concentration of oxygen in the outflowing exhaust gas changes as shown in FIG. 30B. That is, when the rich air-fuel ratio heater exhaust gas starts to be fed to a particulate filter at the time ts, the concentration of oxygen [$O_2$] in the outflowing exhaust gas falls all at once and passes the boundary concentration LR and target concentration TO to become substantially zero.

At this time, according to the air-fuel ratio control of the present embodiment, the degree of richness of the heater exhaust gas is made to gradually decrease. Therefore, the concentration of oxygen [$O_2$] in the outflowing exhaust gas rises and reaches the target concentration TO. In this case, after this, the $NO_x$ reduction or S-ingredient release proceeds, so the change in the concentration of oxygen [$O_2$] gradually declines and becomes substantially zero.

Therefore, according to the present embodiment, the amount of HC fed to a particulate filter will no longer be in excess of or short of the amount for reducing the $NO_x$ to the maximum extent, so the $NO_x$ is reduced and purified quickly by as small an amount of consumption of HC as possible.

Note that if the detected concentration of oxygen does not fall much at all even if the heater exhaust gas is introduced to a particulate filter, it is possible to judge that the switch valve 72 is malfunctioning and therefore a large amount of engine exhaust gas is flowing into that particulate filter and to warn that the switch valve 72 is malfunctioning.

Figure 31:
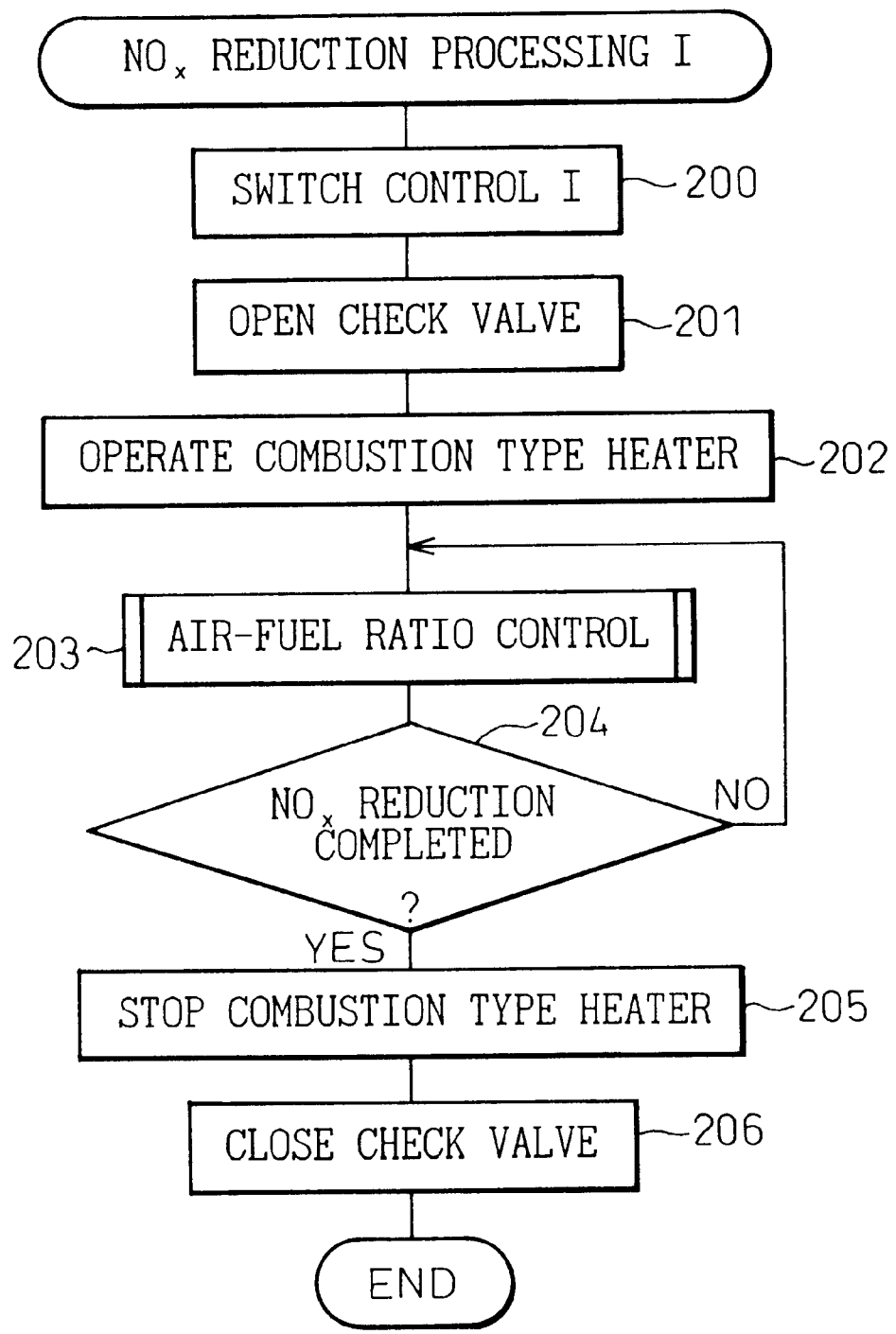
FIG. 31 is a flow chart for execution of $NO_x$ reduction processing I.
Figure 32:
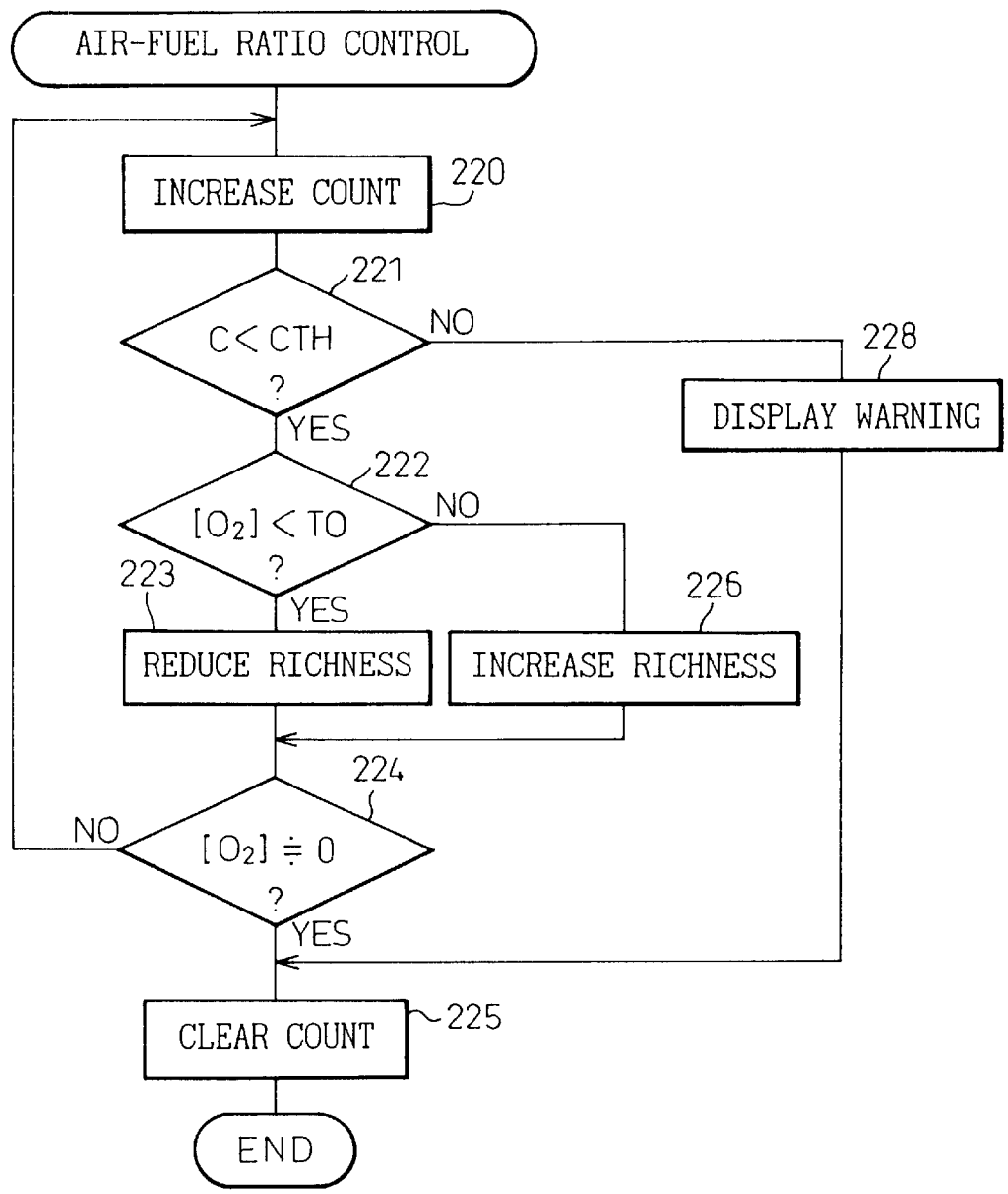
FIG. 32 is a flow chart for execution of $NO_x$ reduction processing I including HC removal processing.

One example of the flow for execution of the $NO_x$ reduction processing I including the air-fuel ratio control of the present embodiment is shown in FIG. 31 and FIG. 32. In the present embodiment, the $NO_x$ purification processing is executed in accordance with the flow of FIG. 3, and the $NO_x$ reduction processing I of step 11 in the flow of FIG. 3 is executed in accordance with the flow shown in FIG. 31 and FIG. 32.

In FIG. 31, first, at step 200, the switch control I is executed. In this switch control I, the operating state of the switch valve 72 is switched to the first operating state so that the inflow of engine exhaust gas to the first particulate filter 22a is suppressed. Next, at step 201, the check valve 76 is opened, then at step 202, the combustion type heater 74 is operated. Here, rich air-fuel ratio exhaust gas is fed from the combustion type heater 74 to the first particulate filter 22a.

Next, at step 203, air-fuel ratio control is executed in accordance with the flow shown in FIG. 32. In FIG. 32, first, at step 220, a count is incremented. This count is a parameter used for judging if the switch valve 72 is malfunctioning. Next, at step 221, it is judged if the count is smaller than a predetermined value CTH. When it is judged at step 221 that C≧CTH, that is, when a certain time has elapsed after the start of the $NO_x$ reduction processing, the routine proceeds to step 228, where a warning is displayed notifying the fact that the switch valve 72 is malfunctioning. Therefore, the predetermined value CTH is set to a value corresponding to a time sufficient for completion of the $NO_x$ reduction processing from its start. On the other hand, when it is judged at step 221 that C<CTH, the routine proceeds to step 222.

At step 222, it if judged if the concentration of oxygen $[O_2]$ in the exhaust gas flowing out from that particulate filter (outflowing exhaust gas) is smaller than a predetermined value TO, that is, if the richness of the exhaust gas flowing out from that particulate filter is smaller than a certain degree. The certain value TO here is a value close to zero.

When it is judged at step 222 that $[O_2]\geq TO$, that is, when it is judged that the richness of the exhaust gas flowing out from that particulate filter is smaller than a certain degree, the routine proceeds to step 223 where the richness of the heater exhaust gas is increased. On the other hand, when it is judged at step 222 that $[O_2]<TO$, that is, when the richness of the exhaust gas flowing out from that particulate filter is larger than a certain degree, the routine proceeds to step 223, where the richness of the heater exhaust gas is made smaller.

At step 224, it is judged if the concentration of oxygen $[O_2]$ in the outflowing exhaust gas is substantially zero. When it is judged at step 224 that $[O_2]\approx 0$ does not stand, that is, when it is judged that the reduction and purification action of $NO_x$ has not been completed, the routine returns to step 220. Therefore, steps 220 to 224 and 228 are repeated until it is judged at step 224 that $[O_2]\approx 0$.

When it is judged at step 224 that $[O_2]\approx 0$, that is, when it is judged that the reduction and purification action of $NO_x$ has been completed, the routine proceeds to step 225, where the count is cleared to zero and the routine ends.

When the air-fuel ratio control of FIG. 32 ends, the routine proceeds to step 204 of FIG. 31, where it is judged if the reduction and purification action of $NO_x$ absorbed in the first $NO_x$ catalyst has been completed. When it is judged at step 204 that the reduction and purification action of $NO_x$ has not been completed, the routine returns to step 203. Therefore, steps 203 and 204 are repeated until it is judged at step 204 that the $NO_x$ reduction and purification action has been completed.

When it is judged at step 204 that the $NO_x$ reduction and purification action has been completed, the routine proceeds to step 205, where the operation of the combustion type heater 74 is stopped, then at step 206, the check valve 76 is closed and the routine is ended.

Note that in the present embodiment, the $NO_x$ reduction processing II of step 13 in the flow of FIG. 3 is executed in accordance with the flow of FIG. 31 except for the point explained below. That is, in the $NO_x$ reduction and purification processing II of the present embodiment, at step 200 of FIG. 31, the switch control II is executed. At this switch control II, the operating state of the switch valve 72 is switched to the second operating state so that the inflow of engine exhaust gas to the second particulate filter 22b is suppressed. The rest of the processing is the same as the processing of the $NO_x$ reduction processing I.

Note that in the embodiment employing the configuration shown in FIG. 2, part of the HC fed to a particulate filter during $NO_x$ reduction processing or S-ingredient release processing is not consumed for reducing the $NO_x$, but deposits in the particulate filter and remains in the particulate filter in some cases even after the $NO_x$ reduction processing or after the S-ingredient release processing.

In this case, if the operating state of the switch valve 72 is switched so that the engine exhaust gas flows into the particulate filter for which the $NO_x$ reduction processing or S-ingredient release processing is performed without removing the HC deposited in the particulate filter, an amount of engine exhaust gas larger than the amount of heater exhaust gas which flowed into the particulate filter per unit time during the $NO_x$ reduction processing or S-ingredient release processing will flow into the particulate filter, so the HC depositing in the particulate filter will be made to detach from the particulate filter as it is due to the engine exhaust gas and flow out from the particulate filter and the exhaust emission will deteriorate.

To suppress deterioration of the exhaust emission due to this reason, it is desirable to burn off the HC depositing in the particulate filter after the $NO_x$ reduction processing or after the S-ingredient release processing.

Therefore, in the configuration shown in FIG. 2, it is also possible to execute the following HC removal processing. That is, in the HC removal processing of the present embodiment, when the $NO_x$ reduction or S-ingredient release has been completed, without stopping the operation of the combustion type heater 74, the air-fuel ratio of the exhaust gas fed from the combustion type heater 74 to the particulate filter is switched from rich to lean. According to this, the particulate filter continues to be heated by the heat of the heater exhaust gas, so the filter temperature is maintained at a high temperature and the atmosphere in the particulate filter becomes an oxidizing atmosphere. Therefore, the HC depositing in the particulate filter reacts with the oxygen in the heater exhaust gas and is burned off. Therefore, according to the present embodiment, the deterioration of the exhaust emission is prevented.

Figure 33:
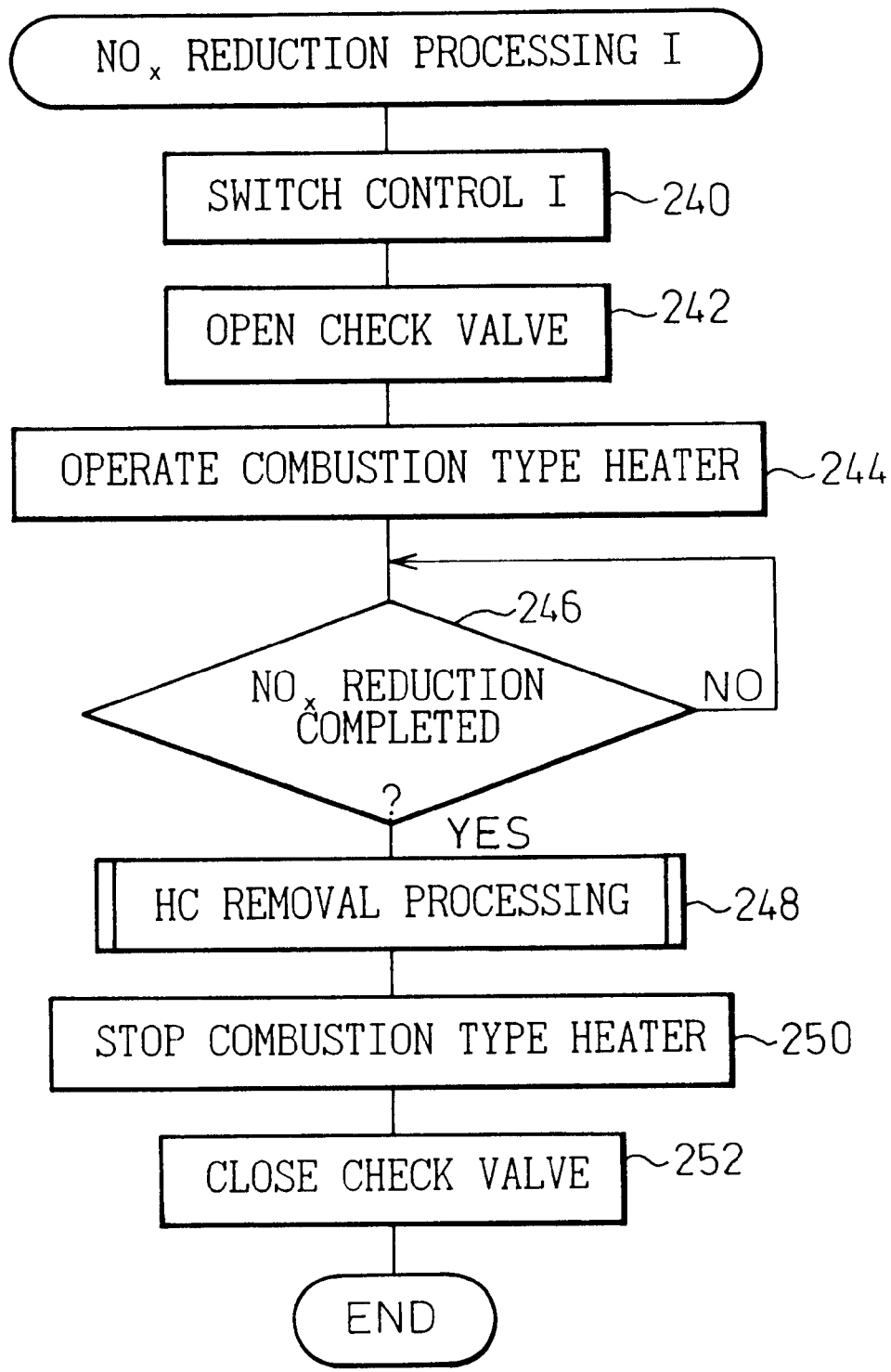
Figure 34:
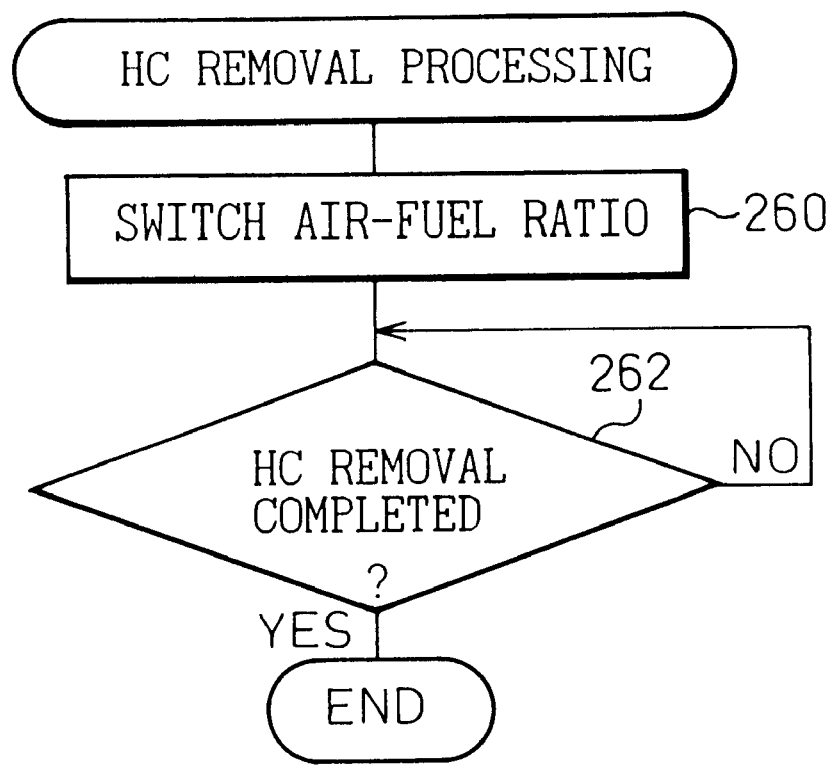
FIG. 34 is a flow chart for execution of HC removal processing.

One example of the flow for executing the $NO_x$ reduction processing I including the HC removal processing of the present embodiment is shown in FIG. 33 and FIG. 34. In the present embodiment, the $NO_x$ purification processing is executed in accordance with the flow of FIG. 3, while the $NO_x$ reduction processing I of step 11 in the flow of FIG. 3 is executed in accordance with the flow shown in FIG. 33 and FIG. 34.

In FIG. 33, first, at step 240, the switch control I is executed. In this switch control I, the operating state of the switch valve 72 is switched to the first operating state so that the inflow of engine exhaust gas to the first particulate filter 22a is suppressed. Next, at step 242, the check valve 76 is opened, then at step 244, the combustion type heater 74 is operated. Here, rich air-fuel ratio exhaust gas is fed from the combustion type heater 74 to the first particulate filter 22a.

Next, at step 246, it is judged if the reduction and purification action of the $NO_x$ absorbed in the first $NO_x$ catalyst has been completed. When it is judged at step 246 that the $NO_x$ reduction and purification action has not been completed, the routine returns to step 246. Therefore, step 246 is repeated until it is judged that the $NO_x$ reduction and purification action has been completed.

When it is judged at step 246 that the $NO_x$ reduction and purification action has been completed, the routine proceeds to step 248, where the air-fuel ratio control is executed in accordance with the flow shown in FIG. 34.

In FIG. 34, first, at step 260, the air-fuel ratio of the heater exhaust gas is switched to a lean one. Next, at step 262, it is judged if the burnoff of almost all of the HC adsorbed at the particulate filter has been completed.

When it is judged at step 262 that the burnoff of HC has not been completed, the routine returns to step 262. Therefore, step 262 is repeated until it is judged that the burnoff of HC has been completed. When it is judged at step 262 that the burnoff of HC has been completed, the routine ends.

When the HC removal processing of FIG. 34 ends, the routine proceeds to step 250 of FIG. 33, where the operation of the combustion type heater 74 is stopped, then at step 251, the check valve 76 is closed and the routine ends.

Note that in the present embodiment, the $NO_x$ reduction processing II is executed in accordance with the flow shown in FIG. 33 except for the point explained below. That is, in the $NO_x$ reduction processing II of the present embodiment, the switch control II is executed at step 240 of FIG. 33. In this switch control II, the operating state of the switch valve 72 is switched to the second operating state so that the inflow of engine exhaust gas to the second particulate filter 22b is suppressed. The rest of the processing is the same as the processing of the $NO_x$ reduction processing I of the present embodiment.

Note that in the configuration shown in FIG. 2, the check valve 76 is arranged at the exhaust feed pipe 75. This check valve 76 is designed to shut the exhaust feed pipe 75 when the operation of the combustion type heater 74 is stopped and open the exhaust feed pipe 75 when the combustion type heater 74 is made to operate. According to this, the deterioration of the operating performance of the combustion type heater 74 is suppressed.

That is, if for example the engine operation shifts to a high load operation and the pressure of the engine exhaust gas rises while the operation of the combustion type heater 74 is stopped, the pressure of the engine exhaust gas sometimes will become higher than the pressure in the exhaust feed pipe 75. Here, if the exhaust feed pipe 75 is not shut, the engine exhaust gas sometimes will flow through the exhaust feed pipe 75 to the combustion type heater 74. In this case, the particulate or HC in the engine exhaust gas will build up in the exhaust feed pipe 75 or the combustion type heater 74 and the combustion will become unstable when the combustion type heater 74 is made to operate or the heater exhaust gas will no longer be able to be fed to the particulate filter as desired and as a result the operating performance of the combustion type heater 74 will deteriorate.

According to the present embodiment, however, when the operation of the combustion type heater 74 is stopped, the exhaust feed pipe 75 is shut by the check valve 76, so the inflow of the engine exhaust gas to the combustion type heater 74 through the exhaust feed pipe 75 is suppressed and as a result the deterioration of the operating performance of the combustion type heater 74 is suppressed.

Of course, in the configuration shown in FIG. 16 as well, the check valve 76 shuts the exhaust feed pipe 75 when the operation of the combustion type heater 74 is stopped.

Note that in the configuration shown in FIG. 16, the check valve 76 is opened to open the exhaust feed pipe 75 during the operation of the combustion type heater 74. At this time, for example, if the engine operation becomes a high load operation and the pressure of the engine exhaust gas becomes high, the pressure in the exhaust branch passage where the check valve is not closed will become higher than the pressure in the exhaust feed pipe 75 and the engine exhaust gas will flow back through the exhaust feed pipe 75 to the combustion type heater 74, so as a result the operating performance of the combustion type heater 74 will sometimes deteriorate.

Therefore, to suppress deterioration of the operating performance of the combustion type heater due to this reason, it is desirable to suppress the back flow of the exhaust gas to the combustion type heater even during operation of the combustion type heater 74.

Figure 35:
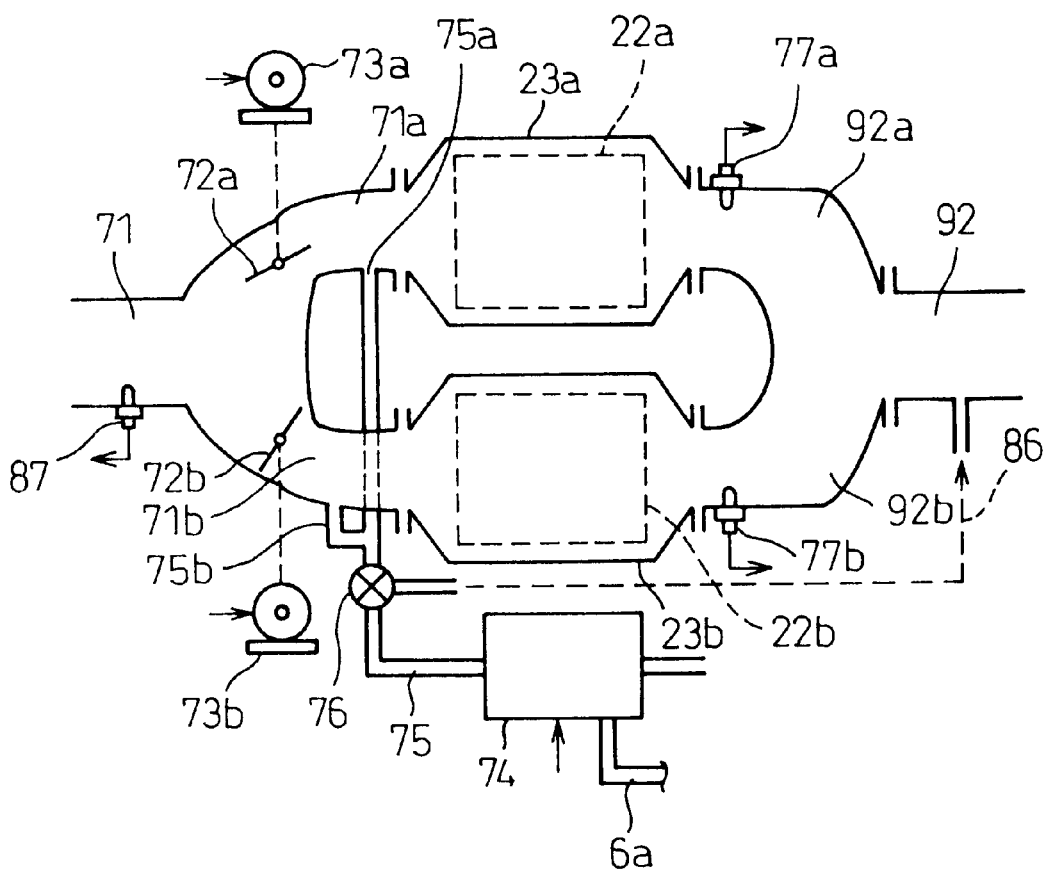
FIG. 35 is a view of exhaust gas purification device of still another embodiment.

Therefore, it is possible to employ the configuration shown in FIG. 35 and execute the following back flow prevention control. That is, in the configuration shown in FIG. 35, the check valve 76 is a three-way valve. An exhaust relief passage 86 extends from this three-way valve type check valve 76 to the engine exhaust passage 92 at the downstream side of the particulate filters. Further, a pressure sensor 87 for detecting the pressure of the engine exhaust gas is arranged in the engine exhaust passage 71 at the upstream side of the particulate filters Further, in the back flow prevention control of the present embodiment, during operation of the combustion type heater 74, the pressure of the engine exhaust gas is detected by the pressure sensor 87 to judge if the pressure of the engine exhaust gas has become higher than the pressure in the exhaust feed pipes 75a and 75b. When it is judged that the pressure of the engine exhaust gas has become higher than even the pressure of the exhaust feed pipes 75a and 75b, the operating state of the check valve 76 is switched so that the heater exhaust gas is emitted through the exhaust relief passage 86 to the engine exhaust passage 92 at the downstream side of the particulate filters.

On the other hand, when it is judged that the pressure of the engine exhaust gas has become lower than the pressure of the exhaust feed pipes 75a and 75b, the operating state of the check valve 76 is switched so that the heater exhaust gas is emitted to the exhaust branch passages 71a and 71b.

Therefore, according to the present embodiment, the inflow of the engine exhaust gas through the exhaust feed pipe 75 to the combustion type heater 74 is suppressed, so the deterioration of the operating performance of the combustion type heater 74 is suppressed.

Note that unless the temperature of a particulate filter becomes at least more than a certain set temperature (hereinafter referred to as "the particulate oxidation start temperature"), it will not oxidize and remove the particulate. On the other hand, unless the temperature of a $NO_x$ catalyst becomes at least more than a certain set temperature (hereinafter referred to as "the $NO_x$ absorption start temperature"), it will not absorb $NO_x$.

Note that the filter temperature right after engine operation starts is relatively low, so the particulate filters do not oxidize and remove the particulate and the $NO_x$ catalysts do not absorb or reduce the $NO_x$. In this case, the particulate oxidation removal level and $NO_x$ purification level of the exhaust gas purification device end up falling overall. Therefore, to maintain the particulate oxidation removal level and $NO_x$ purification level of the exhaust gas purification device at high levels, it is desirable that the filter temperature be made higher than the low temperature of the $NO_x$ absorption temperature range and higher than the particulate oxidation start temperature immediately after engine startup.

Therefore, in the present embodiment, to make the filter temperature higher than the particulate oxidation start temperature and higher than the low temperature of the $NO_x$ absorption temperature range immediately after engine startup, the following engine startup control is executed in the configuration shown in FIG. 2. That is, in the engine startup control of the present embodiment, the operating state of the switch valve 72 is switched so as to suppress the inflow of engine exhaust gas to one of the particulate filters at the time of engine startup and to feed lean air-fuel ratio exhaust gas from the combustion type heater 74 to that particulate filter. Here, the combustion type heater 74 is made to operate so that the temperature of the heater exhaust gas emitted from there becomes as high as possible and so that the flow rate becomes as large as possible.

Here, the amount of heat which the heater exhaust gas emitted from the combustion type heater 74 causes in that particulate filter per unit time is greater than the amount of heat which the engine exhaust gas causes in that particulate filter per unit time when made to flow into the two particulate filters. Therefore, according to the present embodiment, the time required for making the temperature of that particulate filter higher than the low temperature of the $NO_x$ absorption temperature range and higher than the particulate oxidation start temperature at the time of engine startup is shorter than the case of heating both particulate filters by the engine exhaust gas. Therefore, according to the present embodiment, the particulate oxidation removal level and $NO_x$ purification level of the exhaust gas purification device are maintained at high levels overall.

Further, according to the present embodiment, not half of the engine exhaust gas, but all of the engine exhaust gas flows into the other particulate filter. Therefore, the amount of heat caused by the engine exhaust gas per unit time in that particulate filter becomes greater than the case where the engine exhaust gas is made to flow into both particulate filters. Therefore, according to the present embodiment, the time required for making the temperature of that particulate filter higher than the low temperature of the $NO_x$ absorption temperature range and higher than the particulate oxidation start temperature at the time of engine startup is shorter than the case of heating both particulate filters by the engine exhaust gas. Therefore, according to the present embodiment, the particulate oxidation removal level and $NO_x$ purification level of the exhaust gas purification device are maintained at high levels overall.

Further, in the present embodiment, when the temperature of the particulate filter for which the inflow of engine exhaust gas is suppressed, that is, for which the heater exhaust gas is fed, reaches the low temperature of the $NO_x$ absorption temperature range and reaches the particulate oxidation start temperature, the temperature of the particulate filter into which the engine exhaust gas is made to flow is detected and it is judged if the temperature of the other particulate filter has reached the low temperature of the $NO_x$ absorption temperature range and has reached the particulate oxidation start temperature.

Here, when it is judged that the temperature of the other particulate filter has not reached the low temperature of the $NO_x$ absorption temperature range or has not reached the particulate oxidation start temperature, the operating state of the switch valve 72 is switched so as to suppress the inflow of exhaust gas to the other particulate filter, then lean air-fuel ratio exhaust gas is fed from the combustion type heater 74 to the other particulate filter. According to this, the temperature of the other particulate filter is also quickly made to rise to higher than the low temperature of the $NO_x$ absorption temperature range and higher than the particulate oxidation start temperature. Therefore, according to the present embodiment, the particulate oxidation removal level and $NO_x$ purification level of the exhaust gas purification device are maintained at high levels overall.

On the other hand, when it is judged that the temperature of the other particulate filter has reached the low temperature of the $NO_x$ absorption temperature range and has reached the particulate oxidation start temperature, the operation of the combustion type heater 74 is stopped and the operating state of the switch valve 72 is switched so as to suppress the inflow of the engine exhaust gas to that particulate filter and make the engine exhaust gas flow into one particulate filter.

Of course, when feeding heater exhaust gas to the other particulate filter, even when the temperature of the particulate filter reaches the low temperature of the $NO_x$ absorption temperature range and reaches the particulate oxidation start temperature, similarly the operation of the combustion type heater 74 is stopped and the operating state of the switch valve 72 is switched so as to make the engine exhaust gas flow to that particulate filter and suppress the inflow of engine exhaust gas to one particulate filter.

Note that in this engine startup control, it is also possible to cause the internal combustion engine to perform the later explained low temperature combustion. While details will be explained later, the temperature of the exhaust gas emitted from the engine body when low temperature combustion is being performed is higher than the temperature of the exhaust gas emitted from the engine body when normal combustion is being performed. Therefore, according to this, higher temperature engine exhaust gas flows into the other particulate filter, so it is possible to make the filter temperature higher than the low temperature of the $NO_x$ absorption temperature range and higher than the particulate oxidation start temperature more quickly.

Figure 36:
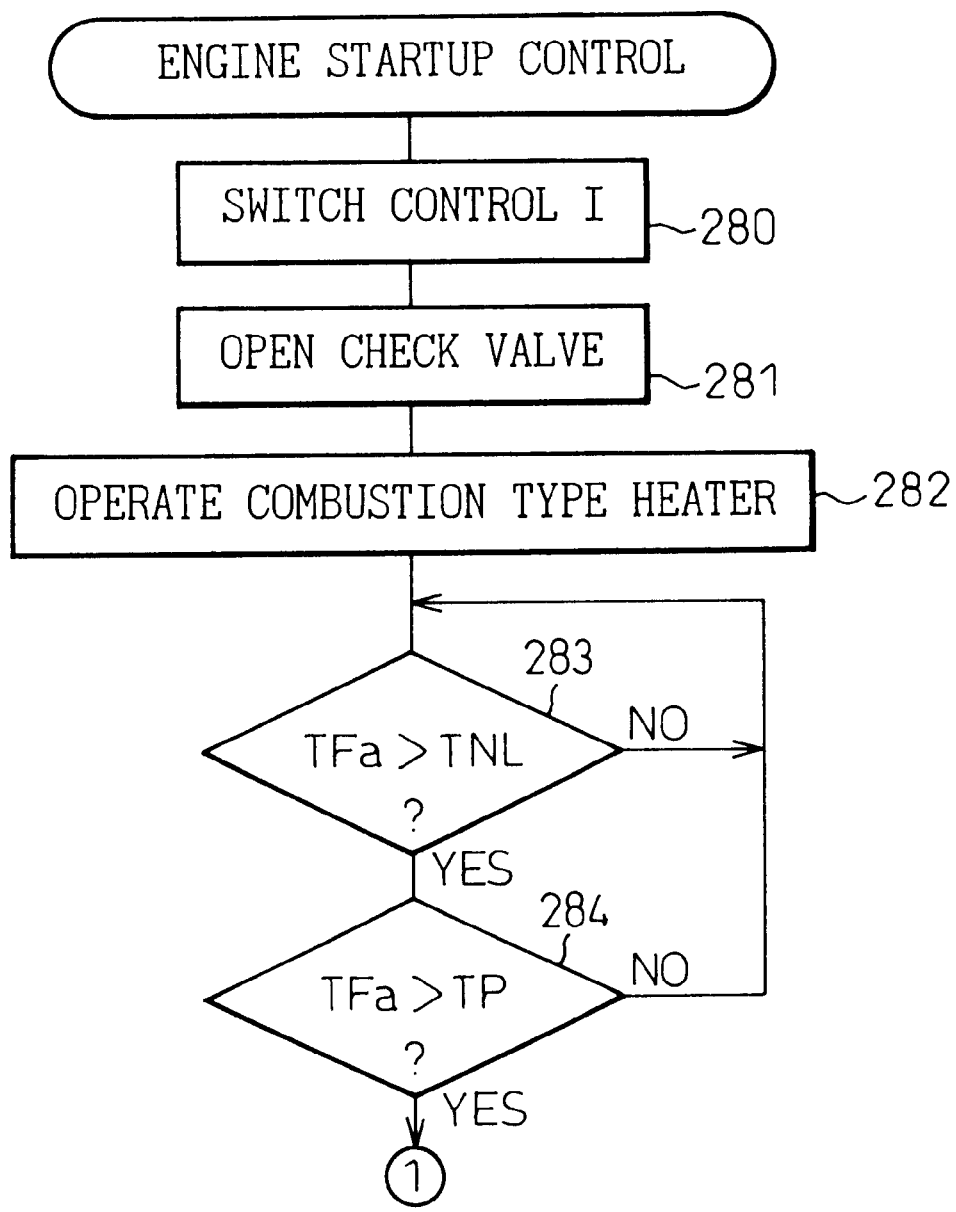
FIG. 36 is a part of flow chart for execution of engine startup control.
Figure 37:
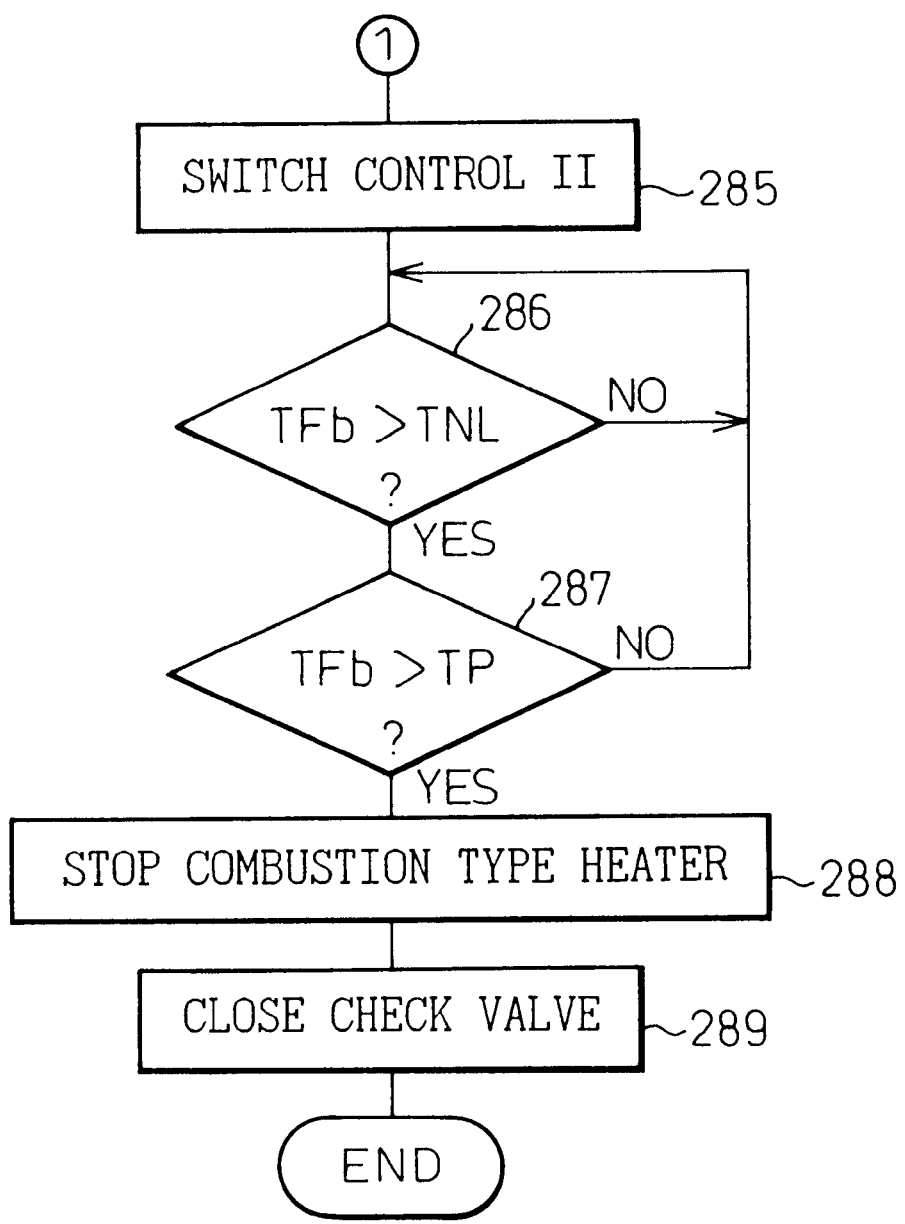
FIG. 37 is a part of flow chart for execution of engine startup control.

One example of the flow for executing the engine startup control of the present embodiment is shown in FIG. 36 and FIG. 37. In FIG. 36, first, at step 280, the switch control I is executed. In this switch control I, the operating state of the switch valve 72 is switched to the first operating state so that the inflow of engine exhaust gas to the first particulate filter 22a is suppressed. Next, at step 281, the check valve 76 is opened, then at step 282, the combustion type heater 74 is made to operate. Here, the lean air-fuel ratio exhaust gas is fed to the first particulate filter 22a from the combustion type heater 74.

Next, at step 283, it is judged if the temperature TFa of the first particulate filter is higher than the $NO_x$ absorption start temperature TNL. When it is judged at step 283 that TFa≦TNL, the routine returns to step 283. Therefore, step 283 is repeated until it is judged at step 283 that TFa>TNL. When it is judged at step 283 that TFa>TNL, the routine proceeds to step 284.

At step 284, it is judged if the temperature TFa of the first particulate filter 22a is higher than the particulate oxidation start temperature TP. When it is judged at step 284 that TFa≦TP, the routine returns to step 283. Therefore, steps 283 and 284 are repeated until it is judged at step 284 that TFa>TP. When it is judged at step 284 that TFa>TP, the routine proceeds to step 285 of FIG. 37.

At step 285 of FIG. 37, the switch control II is executed. In this switch control II, the operating state of the switch valve 72 is switched to the second operating state so that the engine exhaust gas flows to the first particulate filter 22b and the inflow of the engine exhaust gas to the second particulate filter 22a is suppressed.

Next, at step 286, it is judged if the temperature TFb of the second particulate filter 22b is higher than the $NO_x$ absorption start temperature TNL. When it is judged at step 286 that TFb≦TNL, the routine returns to step 286. Therefore, step 286 is repeated until it is judged at step 286 that TFb>TNL. When it is judged at step 286 that TFb>TNL, the routine proceeds to step 287.

At step 287, it is judged if the temperature TFb of the second particulate filter 22b is higher than the particulate oxidation start temperature TP. When it is judged at step 287 that TFb≦TP, the routine returns to step 286. Therefore, steps 286 and 287 are repeated until it is judged at step 287 that TFb>TP. When it is judged at step 287 that TFb>TP, the routine proceeds to step 288.

At step 288, the operation of the combustion type heater 74 is stopped, then at step 289, the check valve 276 is closed and the routine is ended.

Note that as explained above, in the present embodiment, after engine startup, to make the filter temperature higher than the low temperature of the $NO_x$ absorption temperature range and higher than the particulate oxidation start temperature quickly, the engine startup control is executed. During the execution of this engine startup control, even if the temperature of the particulate filter which is made to be heated by the heater exhaust gas does not reach the particulate oxidation start temperature, if feeding rich air-fuel ratio heater exhaust gas to that particulate filter when reaching the low temperature of the $NO_x$ reduction temperature range, it is possible to reduce and purify the $NO_x$ absorbed in the $NO_x$ catalyst of that particulate filter by the HC in the heater exhaust gas. According to this, the $NO_x$ purification level of the exhaust gas purification device is raised as a whole.

Of course, that particulate filter can be heated by the rich air-fuel ratio heater exhaust gas as well, so even if switching the air-fuel ratio of the heater exhaust gas from lean to rich, that particulate filter continues to be heated, so in the end the filter temperature reaches the particulate oxidation start temperature.

That is, during execution of the engine startup control, when the temperature of the particulate filter which is made to be heated by the heater exhaust gas does not reach the particulate oxidation start temperature, but reaches the lower limit of the $NO_x$ reduction temperature range, even if feeding rich air-fuel ratio heater exhaust gas to that particulate filter, the time required until making the filter temperature higher than the low temperature of the $NO_x$ reduction temperature range and higher than the particulate oxidation start temperature is no different from the case of continuing to feed rich air-fuel ratio heater exhaust gas to that particulate filter. On top of this, feeding rich air-fuel ratio heater exhaust gas enables more $NO_x$ to be reduced and purified by the $NO_x$ catalyst overall compared with continuing to feed lean air-fuel ratio heater exhaust gas to that particulate filter.

Therefore, in the above engine startup control, it is also possible, while feeding heater exhaust gas to one particulate filter, to switch the air-fuel ratio of the heater exhaust gas fed to that particulate filter from lean to rich when the temperature of that particulate filter does not reach the particulate oxidation start temperature, but reaches the low temperature of the $NO_x$ reduction temperature range.

According to this, even after the air-fuel ratio of the heater exhaust gas fed to that particulate filter is switched from lean to rich, that particulate filter continues to be heated and finally its temperature reaches the particulate oxidation start temperature. By switching the air-fuel ratio of the heater exhaust gas from lean to rich, the $NO_x$ is reduced and purified by the $NO_x$ catalyst of that particulate filter. Therefore, according to this, the particulate oxidation removal level and $NO_x$ purification level of the exhaust gas purification device are further enhanced.

Figure 38:
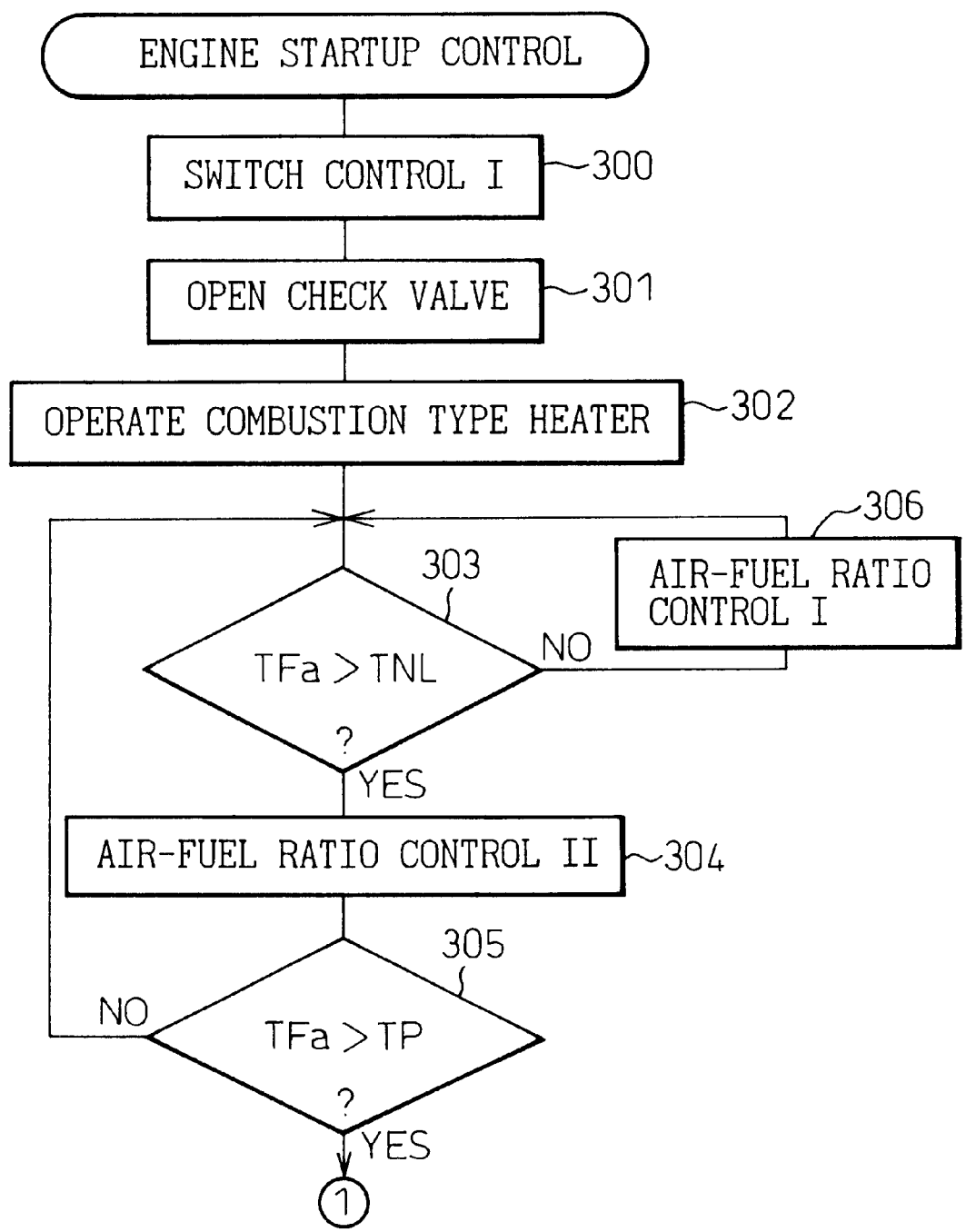
FIG. 38 is a part of flow chart for execution of engine startup control.
Figure 39:
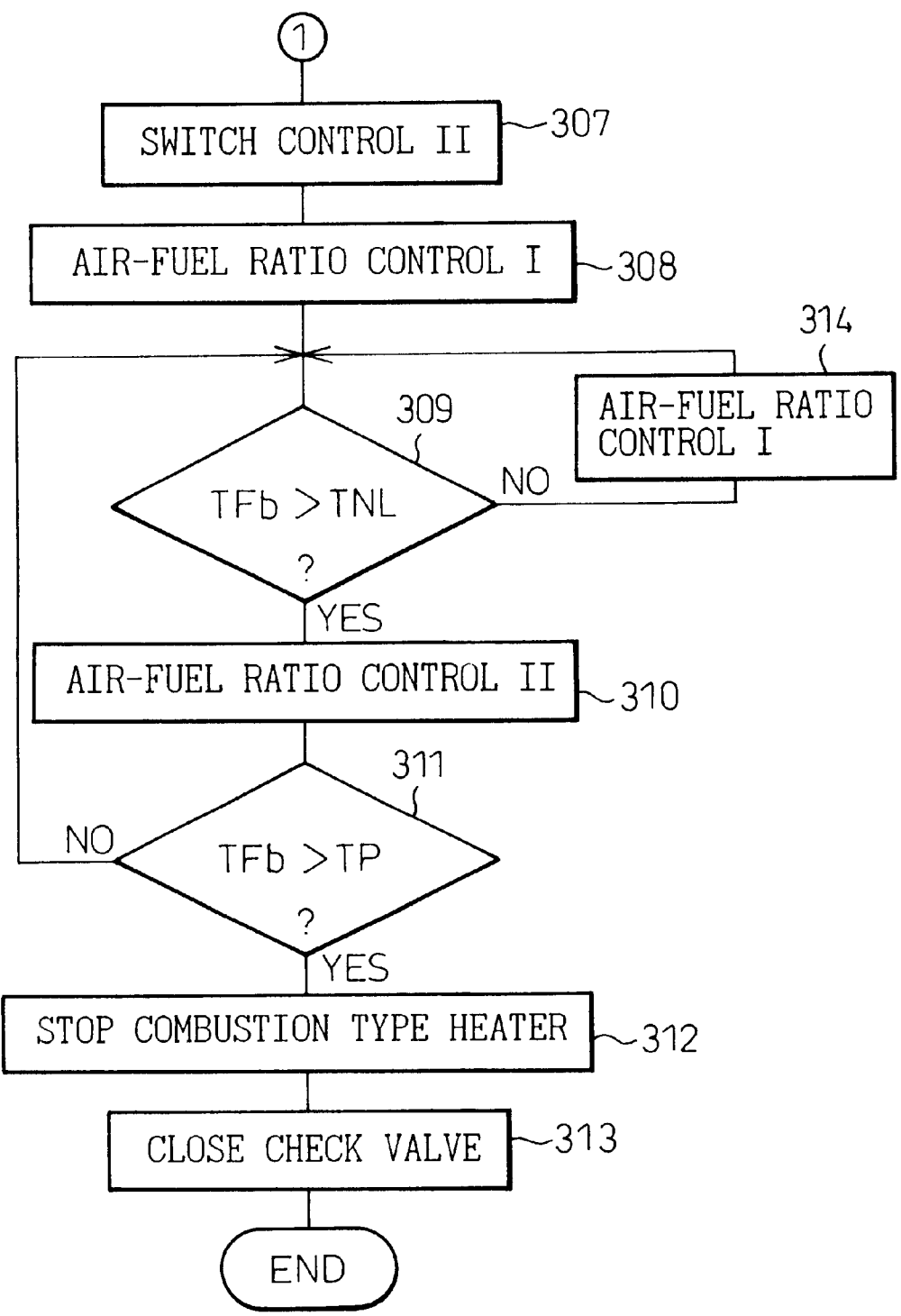
FIG. 39 is a part of flow chart for execution of engine startup control.

One example of the flow of execution of the engine startup control of the present embodiment is shown in FIG. 38 and FIG. 39. In FIG. 38, first, at step 300, the switch control I is executed. In this switch control I, the operating state of the switch valve 72 is switched to the first operating state so that the inflow of engine exhaust gas to the first particulate filter 22a is suppressed. Next, at step 301, the check valve 76 is opened, then at step 302, the combustion type heater 74 is made to operate. Here, the lean air-fuel ratio exhaust gas is fed from the combustion type heater 74 to the first particulate filter 22a.

Next, at step 303, it is judged if the temperature TFa of the first particulate filter 22a is higher than the $NO_x$ absorption start temperature TNL. When it is judged at step 303 that TFa>TNL, the routine proceeds to step 304, where the air-fuel ratio control II is executed. In this air-fuel ratio control II, the air-fuel ratio of the exhaust gas emitted from the combustion type heater 74 is switched from lean to rich.

On the other hand, when it is judged at step 303 that TFa≦TNL, the routine proceeds to step 306, where the air-fuel ratio control I is executed. In this air-fuel ratio control I, if the air-fuel ratio of the exhaust gas emitted from the combustion type heater 74 is lean, the air-fuel ratio is maintained lean as it is, while if the air-fuel ratio is rich, it is switched to lean, then the routine returns to step 303. Therefore, steps 303 and 306 are repeated until it is judged at step 303 that TFa>TNL.

At step 305, it is judged if the temperature TFa of the first particulate filter 22a is higher than the particulate oxidation start temperature TP. When it is judged at step 305 that TFa≦TP, the routine returns to step 303. Therefore, steps 303, 304, and 306 are repeated until it is judged at step 305 that TFa>TP. When it is judged at step 305 that TFa>TP, the routine proceeds to step 307 of FIG. 39.

At step 307 of FIG. 39, the switch control II is executed. At this switch control II, the operating state of the switch valve 72 is switched to the second operating state so that the engine exhaust gas flows into the first particulate filter 22a and the inflow of engine exhaust gas to the second particulate filter 22b is suppressed.

Next, at step 308, the air-fuel ratio control I is executed. That is, the air-fuel ratio of the exhaust gas flowing out from the combustion type heater 74 is switched from rich to lean.

Next, at step 309, it is judged if the temperature TFb of the second particulate filter 22b is higher than the $NO_x$ absorption start temperature TNL. When it is judged at step 309 that TFb>TNL, the routine proceeds to step 310, where the air-fuel ratio control II is executed. That is, the air-fuel ratio of the exhaust gas flowing out from the combustion type heater 74 is switched from lean to rich.

On the other hand, when it is judged at step 309 that TFb≦TNL, the routine proceeds to step 314, where the air-fuel ratio control I is executed. That is, if the air-fuel ratio of the exhaust gas flowing out from the combustion type heater 74 is lean, the air-fuel ratio is maintained lean as it is, while if the air-fuel ratio is rich, it is switched to lean, then the routine returns to 308. Therefore, steps 309 and 314 are repeated until it is judged at step 309 that TFb>TNL.

At step 311, it is judged if the temperature TFb of the second particulate filter 22b is higher than the particulate oxidation start temperature TP. When it is judged at that step that TFb≦TP, the routine returns to step 309. Therefore, steps 309, 310, and 314 are repeated until it is judged at step 311 that TFb>TP. When it is judged at step 311 that TFb>TP, the routine proceeds to step 312.

At step 312, the operation of the combustion type heater 74 is stopped, then at step 313, the check valve 76 is closed and the routine ends.

Next, the particulate filters will be explained in detail. In the following explanation, the first particulate filter 22a will be explained. The second particulate filter 22b is the same as the first particulate filter 22a, so its explanation will be omitted.

Figure 40A:
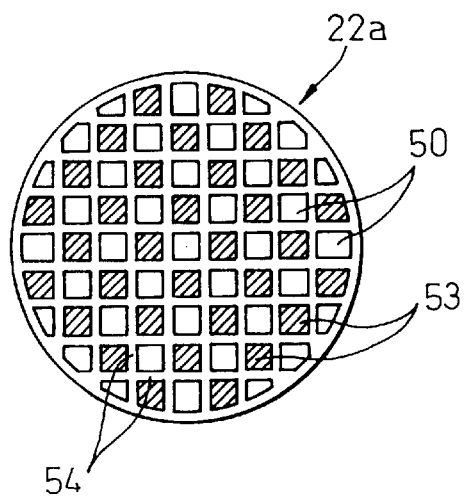
FIGS. 40A and 40B are views of particulate filter.
Figure 40B:
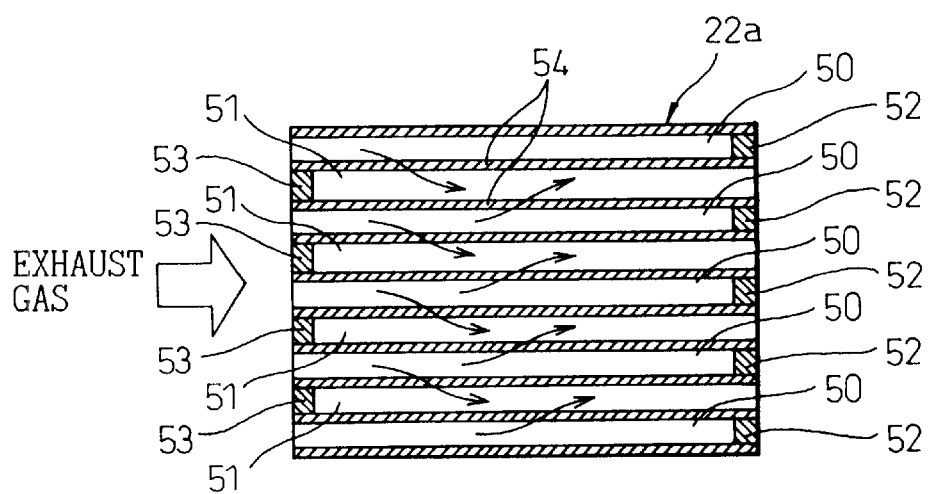

FIGS. 40A and 40B show the structure of the particulate filter 22a. Note that FIG. 40A is a front view of the particulate filter 22a, while FIG. 40B is a side sectional view of the particulate filter 22a. As shown in FIGS. 40A and 40B, the particulate filter 22a has a honeycomb structure and is provided with a plurality of exhaust flow passages 50 and 51 extending in parallel to each other. These exhaust flow passages are formed by the exhaust gas inflow passages 50 blocked at their downstream ends by plugs 52 and exhaust gas outflow passages 51 blocked at their upstream ends by plugs 53.

In FIG. 40A, the hatched portions show the plugs 53. Therefore, the exhaust gas inflow passages 50 and the exhaust gas outflow passages 51 are alternately arranged through thin partitions 54. In other words, among the exhaust gas inflow passages 50 and exhaust gas outflow passages 51, each exhaust gas inflow passage 50 is surrounded by four exhaust gas outflow passages 51, while each exhaust gas outflow passage 51 is surrounded by four exhaust gas inflow passages 50.

The particulate filter 22a is formed from a porous material like cordierite. Therefore, the exhaust gas flowing into the exhaust gas inflow passages 50 passes through the surrounding partitions and flows out into the adjoining exhaust gas outflow passages as shown by the arrows in FIG. 40B.

In the embodiments of the present invention, a layer of a carrier comprised of for example alumina is formed on the peripheral wall surfaces of the exhaust gas inflow passages 50 and the exhaust gas outflow passages 51, that is, the two side surfaces of the partitions 54, the outer end faces of the plugs 53, and the inner wall surfaces of the plugs 52 and 53. On this carrier are carried the precious metal catalyst and an active oxygen release agent taking in oxygen when there is excess oxygen in the surroundings and releasing the held oxygen in the form of active oxygen when the concentration of oxygen in the surroundings falls. The above-mentioned oxidizing substance is this active oxygen release agent.

In this embodiment of the present invention, platinum Pt is used as the precious metal catalyst. As the active oxygen release agent, it is possible to use at least one element selected from alkali metals such as potassium K, sodium Na, lithium Li, cesium Cs, and rubidium Rb, alkali earth metals such as barium Ba, calcium Ca, and strontium Sr, rare earths such as lanthanum La, yttrium Y, and cerium Ce, transition metals such as Fe, and carbon group metals such as tin Sn.

Note that as the active oxygen release agent, it is preferable to use an alkali metal or alkali earth metal having a higher ionization tendency than even calcium Ca, that is, potassium K, lithium Li, cesium Cs, rubidium Rb, barium Ba, or strontium Sr.

Next, the action of removal of particulate in the exhaust gas by the particulate filter 22a will be explained taking as an example the case of carrying platinum Pt and potassium K on a carrier, but a similar action of removal of particulate is performed even if using another precious metal, alkali metal, alkali earth metal, rare earth, or transition metal.

In a compression-ignition type internal combustion engine as shown in FIG. 1, combustion is performed under an excess of air. Therefore, the exhaust gas contains a large amount of excess air. That is, if the ratio between the air and fuel fed into the intake passage and combustion chamber 5 is called the "air-fuel ratio of the exhaust gas", in the compression-ignition type internal combustion engine shown in FIG. 1, the air-fuel ratio of the exhaust gas becomes lean. Further, in the combustion chamber 5, NO is produced, so the exhaust gas contains NO. Further, fuel contains a sulfur ingredient (S-ingredient). This S-ingredient reacts with the oxygen in the combustion chamber 5 to become $SO_2$. Therefore, the exhaust gas contains $SO_2$. Therefore, exhaust gas containing excess oxygen, $NO_2$, and $SO_2$ flows into the exhaust gas inflow passages 50 of the particulate filter 22a.

Figure 41A:
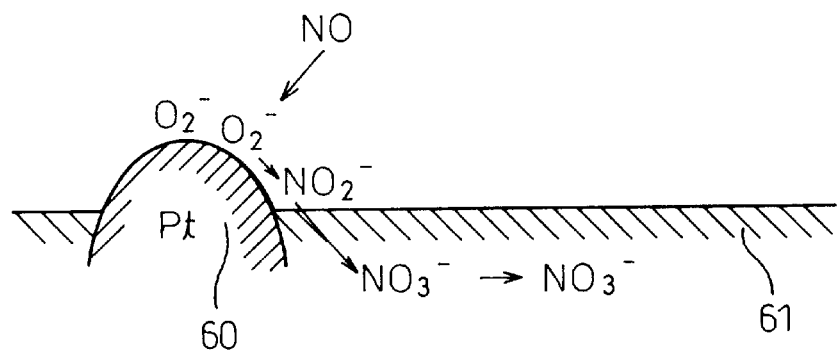
FIGS. 41A and 41B are views for explaining oxidation action of particulate.
Figure 41B:
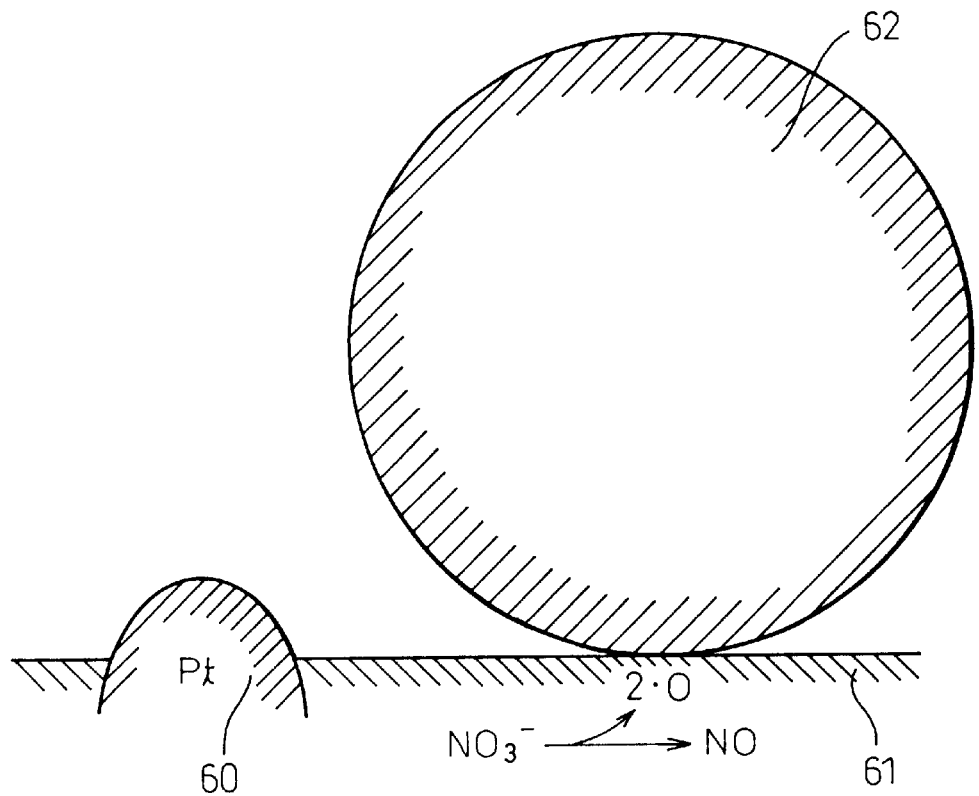

FIGS. 41A and 41B schematically show enlarged views of the surface of the carrier layer formed on the inner peripheral surface of the exhaust gas inflow passages 50. Note that in FIGS. 41A and 41B, 60 shows particulate of platinum Pt, while 61 shows an active oxygen release agent containing potassium K.

As explained above, since the exhaust gas contains a large amount of excess oxygen, if the exhaust gas flows into the exhaust gas inflow passages 50 of the particulate filter 22a, as shown in FIG. 41A, the oxygen $O_2$ deposits on the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO + O_2 \rightarrow 2NO_2$). Next, part of the $NO_2$ produced is absorbed in the active oxygen release agent 61 while being oxidized on the platinum Pt. It diffuses in the active oxygen release agent 61 in the form of nitrate ions $NO_3^-$ as shown in FIG. 41A while bonding with the potassium K to produce potassium nitrate $KNO_3$.

On the other hand, as explained above, the exhaust gas contains $SO_2$. This $SO_2$ is absorbed in the active oxygen release agent 61 by a similar mechanism as the NO. That is, as explained above, the oxygen $O_2$ deposits on the surface of the platinum Pt in the form of $O_2^-$ or $O^{2-}$. The $SO_2$ in the exhaust gas reacts with the $O_2^-$ or $O^{2-}$ on the surface of the platinum Pt to become $SO_3$. Next, part of the $SO_3$ produced is absorbed in the active oxygen release agent 61 while being further oxidized on the platinum Pt. It diffuses in the active oxygen release agent 61 in the form of sulfate ions $SO_4^{2-}$ while bonding with the potassium K to produce potassium sulfate $K_2SO_4$. In this way, potassium nitrate $KNO_3$ and potassium sulfate $K_2SO_4$ are produced in the active oxygen release agent 61.

On the other hand, in the combustion chamber 5, particulate comprised mainly of carbon C, that is, soot, is produced. Therefore, the exhaust gas contains this particulate. The particulate contained in the exhaust gas contacts and deposits on the surface of the carrier layer, for example, the surface of the active oxygen release agent 61, as shown by 62 in FIG. 41B when the exhaust gas flows inside the exhaust gas inflow passages 50 of the particulate filter 22a or heads from the exhaust gas inflow passages 50 to the exhaust gas outflow passages 51.

If the particulate 62 deposits on the surface of the active oxygen release agent 61 in this way, the concentration of oxygen falls at the contact surfaces between the particulate 62 and the active oxygen release agent 61. If the concentration of oxygen falls, a difference in concentration occurs with the inside of the high oxygen concentration active oxygen release agent 61 and therefore the oxygen in the active oxygen release agent 61 tries to move toward the contact surfaces between the particulate 62 and the active oxygen release agent 61. As a result, the potassium nitrate $KNO_3$ formed in the active oxygen release agent 61 is broken down into potassium K and oxygen O and NO, the oxygen O heads toward the contact surfaces of the particulate 62 and active oxygen release agent 61, and the NO is released to the outside from the active oxygen release agent 61. The NO released to the outside is oxidized on the downstream side platinum Pt and again absorbed in the active oxygen release agent 61.

Further, the potassium sulfate $K_2SO_4$ formed in the active oxygen release agent 61 at this time is also broken down into potassium K and oxygen O and $SO_2$, the oxygen O heads toward the contact surfaces of the particulate 62 and active oxygen release agent 61, and the $SO_2$ is released to the outside from the active oxygen release agent 61. The $SO_2$ released to the outside is oxidized on the downstream side platinum Pt and again absorbed in the active oxygen release agent 61. However, potassium sulfate $K_2SO_4$ is stable and hard to break down, so the potassium sulfate $K_2SO_4$ has a harder time releasing active oxygen than potassium nitrate $KNO_3$.

Further, the active oxygen release agent 61, as explained above, produces active oxygen in the reaction process with oxygen when absorbing $NO_x$ in the form of nitrate ions $NO_3^-$. Similarly, the active oxygen release agent 61, as explained above, produces active oxygen in the reaction process with oxygen when absorbing $SO_2$ in the form of sulfate ions $SO_4^{2-}$.

The oxygen, however, heading toward the contact surface between the particulate 62 and the active oxygen release agent 61 is oxygen broken down from a compound such as potassium nitrate $KNO_3$ or potassium sulfate $K_2SO_4$. Oxygen O broken down from a compound has a high energy and has an extremely high activity. Therefore, the oxygen heading toward the contact surfaces between the particulate 62 and the active oxygen release agent 61 becomes the active oxygen O. Similarly, the oxygen produced in the reaction process between the $NO_x$ and oxygen in the active oxygen release agent 61 and the oxygen produced in the reaction process between the $SO_2$ and oxygen become active oxygen. If this active oxygen O contacts the particulate 62, the particulate 62 is made to oxidize in a short time (several seconds to several tens of minutes) without emitting a luminous flame and the particulate 62 is completed extinguished. Therefore, almost no particulate 62 deposits on the particulate filter 22a.

When particulate deposited in layers on the particulate filter 22a is made to burn as in the past, the particulate filter 22a becomes red hot and the particulate burns accompanied with a flame. Therefore, to sustain the combustion accompanied with a flame, the temperature of the particulate filter 22a has to be maintained high.

As opposed to this, in the present invention, the particulate 62 is made to oxidize without emitting a luminous flame as explained above. That is, in other words, in the present invention, the particulate 62 is made to oxidize and be removed by a considerably low temperature compared with the past. Therefore, the particulate removal action by oxidation of the particulate 62 not emitting a luminous flame of the present invention is completely different from the conventional particulate removal action by combustion accompanied with a flame.

Note that platinum Pt and the active oxygen release agent 61 become more active the higher the temperature of the particulate filter 22a, so the amount of the particulate removable by oxidation per unit time without emitting a luminous flame (unit amount of continuous oxidation of particulate) increases the higher the temperature of the particulate filter 22a.

The solid line in FIG. 43 shows the amount of particulate G removable by oxidation per unit time without emitting a luminous flame (unit amount of continuous oxidation of particulate). Note that in FIG. 43, the abscissa indicates the temperature TF of the particulate filter 22a. If the amount of particulate flowing into the particulate filter 22a per unit time is called the unit amount of inflowing particulate M, when the unit amount of inflowing particulate M is less than the unit amount of continuous oxidation of particulate G, that is, when in the region I of FIG. 43, when all of the particulate emitted from the combustion chamber 5 contacts the particulate filter 22a, it is oxidized and removed without emitting a luminous flame on the particulate filter 22a in a short time (several seconds to several tens of minutes).

Figure 42A:
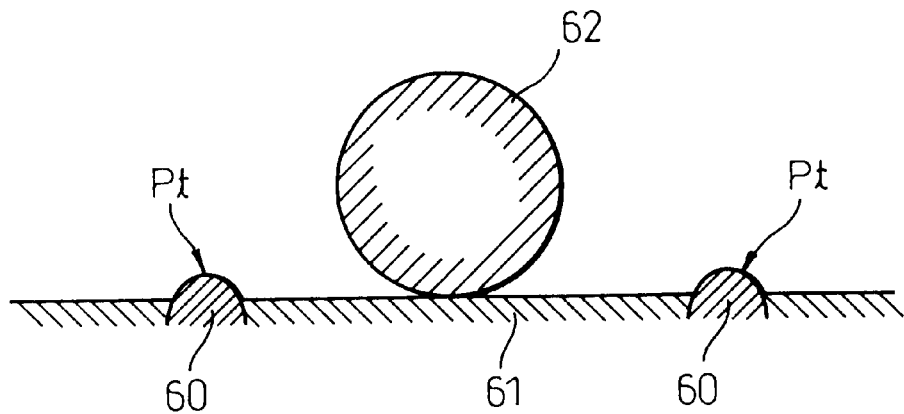
FIGS. 42A–42C are views for explaining deposition action of particulate.
Figure 42B:
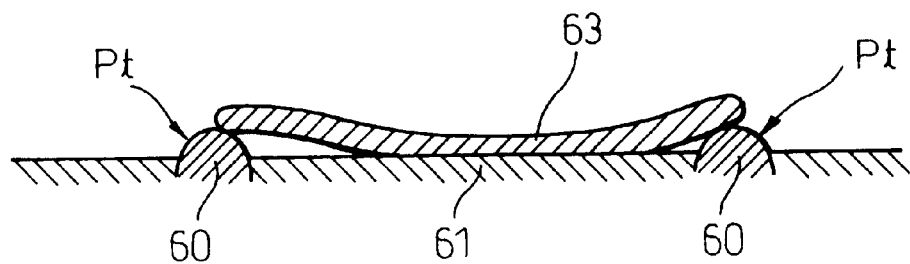
Figure 42C:
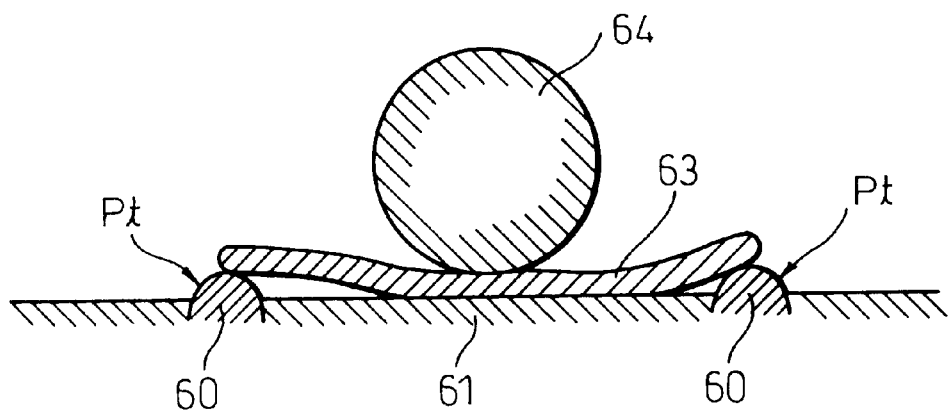

As opposed to this, when the unit amount of inflowing particulate M is greater than the unit amount of continuous oxidation of particulate G, that is, when in the region II of FIG. 43, the amount of active oxygen is insufficient for oxidizing all of the particulate. FIGS. 42A to 42C show the state of the oxidation of the particulate in such a case. That is, as shown in FIG. 42A, if particulate 62 deposits on the active oxygen release agent 61, only part of the particulate 62 is oxidized. The portion of the particulate which was not sufficiently oxidized remains on the carrier layer. If the state of an insufficient amount of active oxygen continues next, the successively non-oxidized portions of the particulate are left on the carrier layer. As a result, as shown in FIG. 42B, the surface of the carrier layer is covered by the remaining particulate portion 63.

If the surface of the carrier layer is covered by the remaining particulate portion 63, the action of oxidation of the NO and $SO_2$ performed by the platinum Pt and the action of release of the active oxygen by the active oxygen release agent 61 will no longer occur, so the residual particulate portion 63 will remain as it is without being oxidized and therefore other particulate 64 will successively build up on the residual particulate portion 63 as shown in FIG. 42C. That is, the particulate will build up in layers. If particulate builds up in layers in this way, the particulate will no longer be oxidized by the active oxygen O and therefore other particulate will further successively build up on the particulate 64. That is, if the state where the unit amount of inflowing particulate M is greater than the unit amount of continuous oxidation of particulate G continues, particulate will build up on the particulate filter 22a. Therefore, in so far as the temperature of the exhaust gas is not made a high temperature or the temperature of the particulate filter 22a is not made a high temperature, it will no longer be possible to ignite and burn the built up particulate.

In this way, in the region I of FIG. 43, the particulate is made to oxidize in a short time on the particulate filter 22a without emitting a luminous flame, while in the region II of FIG. 43, the particulate builds up in layers on the particulate filter 22a. Therefore, to prevent the particulate from building up in layers on the particulate filter 22a, it is necessary to make the unit amount of inflowing particulate M less than the unit amount of continuous oxidation of particulate G at all times.

As will be understood from FIG. 43, in the particulate filter 22a used in the embodiments of the present invention, even if the temperature TF of the particulate filter 22a is considerably low, it is possible to cause the particulate to oxidize. Therefore, in the compression-ignition type internal combustion engine shown in FIG. 1, it is possible to maintain the unit amount of inflowing particulate M and temperature TF of the particulate filter 22a so that the unit amount of inflowing particulate M becomes less than the unit amount of continuous oxidation of particulate G at all times. If the unit amount of inflowing particulate M is less than the unit amount of continuous oxidation of particulate G at all times in this way, almost no particulate will build up on the particulate filter 22a and therefore the back pressure will not rise much at all. Therefore, the engine output will not decline much at all.

On the other hand, as explained above, once particulate builds up in layers on the particulate filter 22a, even if the unit amount of inflowing particulate M becomes less than the unit amount of continuous oxidation of particulate G, it will be difficult to cause the particulate to oxidize by active oxygen O. However, if the amount of exhaust particulate M becomes smaller than the unit amount of continuous oxidation of particulate G when the portion of the not oxidized particulate starts to be left, that is, when particulate only builds up to less than a certain extent, this residual portion of particulate is oxidized and removed without emitting a luminous flame due to the active oxygen O.

Note that even if controlling the unit amount of inflowing particulate M and temperature TF of the particulate filter 22a in this way, sometimes particulate will build up in layers on the particulate filter 22a. In this case, it is possible to cause the particulate built up on the particulate filter 22a to oxidize without emitting a luminous flame by making the air-fuel ratio of part or all of the exhaust gas temporarily rich.

That is, if the state where the air-fuel ratio of the exhaust gas is lean continues over a certain period, oxygen will deposit in a large amount on the platinum Pt and therefore the catalytic action of the platinum Pt will end up dropping. If however the air-fuel ratio of the exhaust gas is made rich and the concentration of oxygen in the exhaust gas is lowered, the oxygen will be removed from the platinum Pt and therefore the catalytic action of the platinum Pt will be restored. Due to this, if the air-fuel ratio of the exhaust gas is made rich, it will become easier for the active oxygen O to be released all at once from the active oxygen release agent 61 to the outside. Therefore, the particulate built up due to the active oxygen O released all at once is made to change to an easily oxidizable state, and the particulate is burned away by the active oxygen without emitting a luminous flame. Therefore, if the air-fuel ratio of the exhaust gas is made rich, the unit amount of continuous oxidation of particulate G increases as a whole.

Note that in this case, when particulate builds up in layers on the particulate filter 22a, the air-fuel ratio of the exhaust gas may also be made rich. Further, the air-fuel ratio of the exhaust gas may be made rich periodically without regard as to if particulate is building up in layers.

As the method of making the air-fuel ratio of the exhaust gas rich, for example it is possible to use the method of controlling the opening degree of the throttle valve 17 and the opening degree of the EGR control valve 25 so that the EGR rate (amount of EGR gas/(amount of intake air+ amount of EGR gas)) becomes at least 65 percent when the engine load is relatively low and controlling the amount of injection so that the average air-fuel ratio in the combustion chamber 5 at this time becomes rich.

Note that fuel and lubrication oil contain calcium Ca. Therefore, the exhaust gas also continues calcium Ca. This calcium Ca produces calcium sulfate $CaSO_4$ in the presence of $SO_3$. This calcium sulfate $CaSO_4$ is a solid and hard to break down by heat. Therefore, if calcium sulfate $CaSO_4$ is produced, the pores in the particulate filter 22a will end up being clogged by the calcium sulfate $CaSO_4$ and as a result the exhaust gas will become harder to flow through the particulate filter 22a.

In this case, if an alkali metal or an alkali earth metal having a higher ionization tendency that calcium Ca, for example, potassium K, is used as an active oxygen release agent 61, the $SO_3$ diffusing in the active oxygen release agent 61 will bond with the potassium K to form potassium sulfate $K_2SO_4$ and the calcium Ca will pass through the partitions 54 of the particulate filter 22a and flow out into the exhaust gas outflow passages 51 without bonding with the $SO_3$. Therefore, the pores of the particulate filter 22a will not longer clog. Therefore, as mentioned above, it is desirable to use as the active oxygen release agent 61 an alkali metal or alkali earth metal having a higher ionization tendency than calcium Ca, that is, potassium K, lithium Li, cesium Cs, rubidium Rb, barium Ba, or strontium SR.

Further, the present invention may also be applied to the case of carrying only a precious metal such as platinum on the layers of carrier formed on the two surfaces of the particulate filter 22a. In this case, however, the solid line showing the unit amount of continuous oxidation of particulate G shifts somewhat to the right compared with the solid line shown in FIG. 43. In this case, active oxygen is released from the $NO_2$ or $SO_3$ held on the surface of the platinum Pt.

Further, as the active oxygen release agent, it is also possible to use a catalyst which adsorbs and holds $NO_2$ or $SO_3$ and can release active oxygen from the adsorbed $NO_2$ or $SO_3$.

Note that the above active oxygen release agent absorbs the $NO_x$ in the exhaust gas when the air-fuel ratio of the exhaust gas flowing into the particulate filter is lean, while releases the absorbed $NO_x$ when the air-fuel ratio of the inflowing exhaust gas becomes rich. Therefore, the active oxygen release agent also functions as an $NO_x$ absorbent. Further, the $NO_x$ released at this time is reduced and purified by the HC in the exhaust gas. Therefore, the $NO_x$ catalyst of the present embodiment is a catalyst provided with this $NO_x$ absorption agent.

Figure 44:
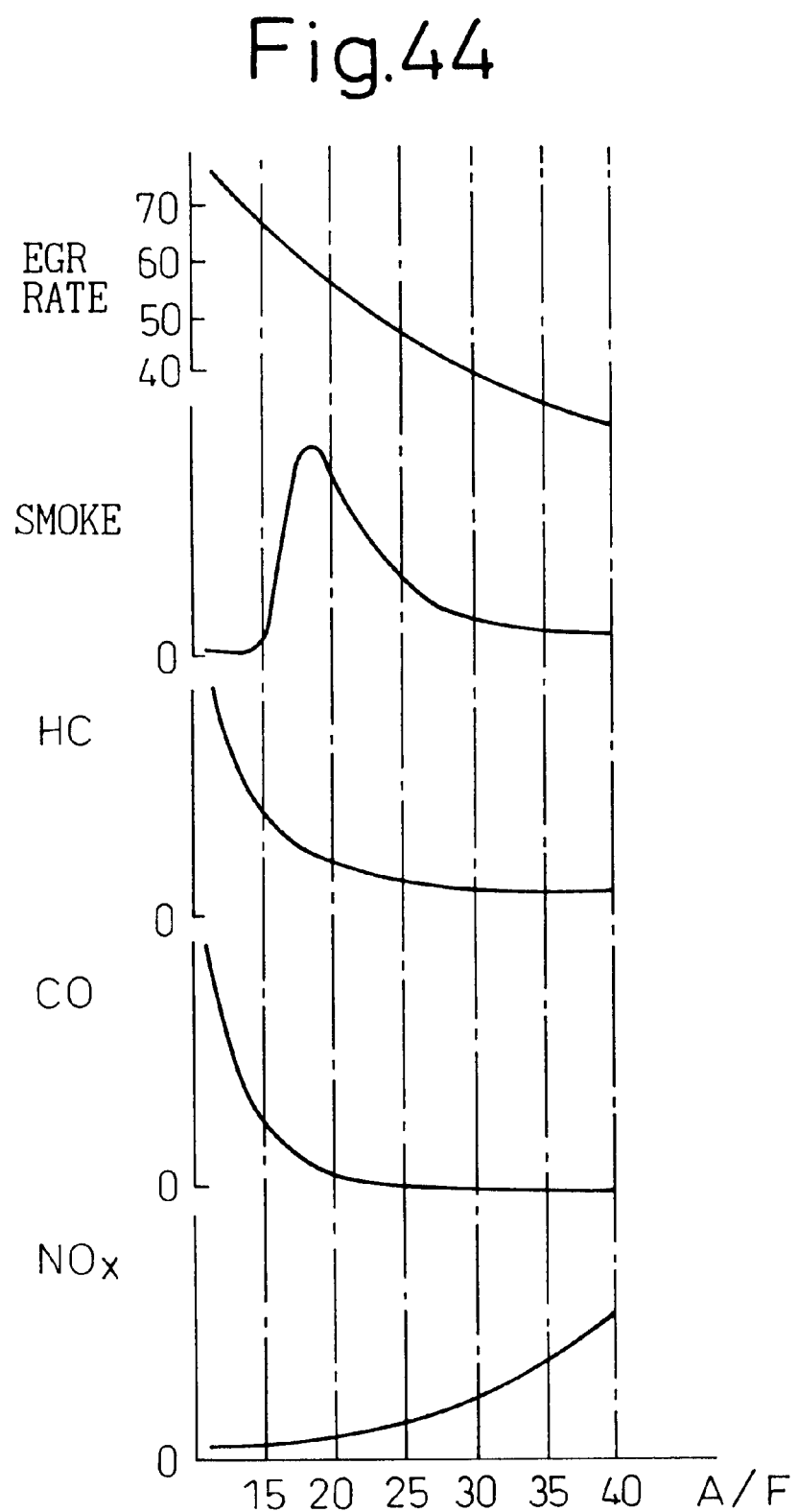
FIG. 44 is a view showing amounts of generation of smoke and $NO_x$ etc.

Finally, an explanation will be made of the low temperature combustion performed in the combustion type heater when making the combustion type heater burn fuel while introducing exhaust gas. FIG. 44 shows an example of an experiment showing the change in the amounts of emission of smoke, HC, CO, and $NO_x$ when changing the air-fuel ratio A/F (abscissa in FIG. 44) by making the EGR rate, that is, the ratio of the amount of exhaust gas introduced to the combustion type heater with respect to the amount of air taken into the combustion type heater, change. As will be understood from FIG. 44, in this experiment, the smaller the air-fuel ratio A/F, the larger the EGR rate. When less that the stoichiometric air-fuel ratio ($\approx$14.6), the EGR rate becomes at least 65 percent.

If increasing the EGR rate as shown in FIG. 44 to reduce the air-fuel ratio A/F, the EGR rate becomes close to 40 percent. When the air-fuel ratio A/F becomes about 30, the amount of production of the smoke starts to increase. Next, when the EGR rate is further raised to make the air-fuel ratio A/F smaller, the amount of production of smoke rapidly increases and peaks. Next, when the EGR rate is further raised to reduce the airfuel ratio A/F, the smoke rapidly falls. When the EGR rate is made at least 65 percent and the air-fuel ratio A/F becomes close to 15.0, the smoke becomes substantially zero. That is, almost no soot is produced any longer. At this time, the output torque of the engine falls somewhat and the amount of production of $NO_x$ becomes considerably low. On the other hand, at this time, the amounts of production of HC and CO start to increase.

Figure 45A:
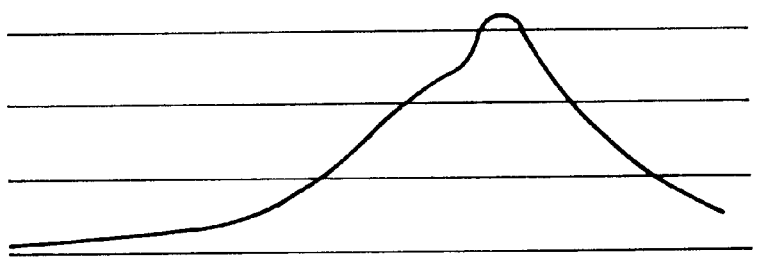
FIGS. 45A and 45B are views showing combustion pressure.
Figure 45B:
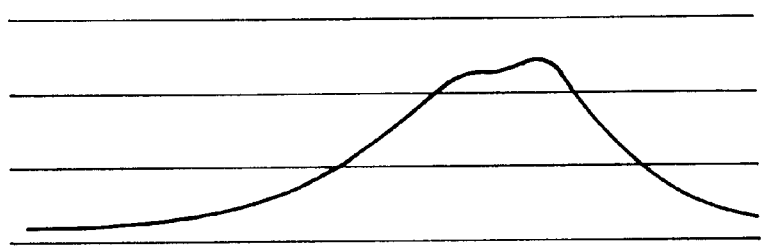

FIG. 45A shows the change in the combustion pressure in the combustion chamber of the combustion type heater near the air-fuel ratio A/F of 21 when the amount of production of smoke is the greatest, while FIG. 45B shows the change in the combustion pressure in the combustion chamber of the combustion type heater near the air-fuel ratio A/F of 18 when the amount of production of smoke is substantially zero. As will be understood from a comparison of FIG. 45A and FIG. 45B, the combustion pressure is lower in the case shown in FIG. 45B when the amount of production of smoke is substantially zero than in the case shown in FIG. 45A when the amount of production of smoke is large.

The following can be said from the results of the experiment shown in FIG. 44 and FIGS. 45A and 45B. That is, first, when the air-fuel ratio A/F is not more than 15.0 and the amount of production of smoke is substantially zero, as shown in FIG. 44, the amount of production of $NO_x$ becomes considerably low. When the amount of production of $NO_x$ falls, this means that the combustion temperature in the combustion chamber of the combustion type heater falls. Therefore, when almost no soot is produced, the combustion temperature in the combustion chamber of the combustion type heater can be said to become lower. The same can be said from FIGS. 45A and 45B. That is, in the state shown in FIG. 45B where almost no soot is produced, the combustion pressure becomes low. Therefore, at this time, the combustion temperature in the combustion chamber of the combustion type heater becomes low.

Second, when the amount of production of smoke, that is, the amount of production of soot, becomes substantially zero, as shown in FIG. 44, the amounts of emission of HC and CO increase. This means that the hydrocarbons are emitted without growing into soot. That is, when the straight chain hydrocarbons or aromatic hydrocarbons such as shown in FIG. 46 contained in the fuel are made to rise in temperature in an oxygen deficient state, they are broken down by the heat whereby precursors of soot are formed. Next, soot comprised of a solid mass of mainly the carbon atoms is produced. In this case, the actual process of production of soot is complicated. It is not clear what form the precursors of soot take, but whatever the case, hydrocarbons such as shown in FIG. 46 grow into soot through soot precursors. Therefore, as explained above, if the amount of production of soot becomes substantially zero, as shown in FIG. 44, the amounts of emission of HC and CO increase. The HC at this time are soot precursors or hydrocarbons in the state before that.

Summarizing these considerations based on the results of the experiments shown in FIG. 44 and FIGS. 45A and 45B, when the combustion temperature in the combustion chamber of the combustion type heater is low, the amount of production of soot becomes substantially zero. At this time, the soot precursors or the hydrocarbons in the state before that are emitted from the combustion chamber of the combustion type heater. More detailed experiments and research were conducted on this. As a result, it was learned that when the gas temperature of the fuel and its surroundings in the combustion chamber of the combustion type heater is below a certain temperature, the growth process of the soot ends up stopping midway, that is, no soot is produced at all, while when the gas temperature of the fuel and its surroundings in the combustion chamber of the combustion type heater becomes more than a certain temperature, soot is produced.

The temperature of the fuel and its surroundings when the growth process of hydrocarbons stops in the state of a soot precursor, that is, the above-mentioned certain temperature, changes depending on the type of fuel, the air-fuel ratio, the compression ratio, and other various factors, so what degree it is cannot be said, but this certain temperature has a close relationship with the amount of production of $NO_x$. Therefore, this certain temperature can be defined to a certain extent from the amount of production of $NO_x$. That is, the greater the EGR rate, the lower the gas temperature of the fuel and its surroundings at the time of combustion and the lower the amount of production of $NO_x$. At this time, almost no soot is produced any longer when the amount of production of $NO_x$ becomes around 10 ppm or less. Therefore, the above certain temperature substantially matches with the temperature when the amount of production of $NO_x$ becomes around 10 ppm or less.

Once produced, this soot cannot be purified even by post-treatment using a catalyst having an oxidizing function. As opposed to this, soot precursors or hydrocarbons in the state before this can be easily purified by post-treatment using a catalyst having an oxidizing function. If considering post-treatment by a catalyst having an oxidizing function, there is an extremely large difference between causing the hydrocarbons to be emitted from the combustion chamber of the combustion type heater as soot precursors or the state before that and causing them to be emitted from the combustion chamber of the combustion type heater in the form of soot.

Low temperature combustion is based on causing hydrocarbons to be emitted from the combustion chamber 5 in the form of soot precursors or a state before that without allowing them to grow into soot in the combustion chamber of the combustion type heater and causing the hydrocarbons to be oxidized by a catalyst having an oxidizing function.

Now, to make the growth of hydrocarbons stop in the state before production of soot, it is necessary to suppress the gas temperature of the fuel and its surroundings at the time of combustion in the combustion chamber of the combustion type heater to a temperature lower than the temperature at which soot is produced. In this case, it is found that the endothermic action of the gas around the fuel when burning the fuel has an extremely large effect in suppressing the gas temperature of the fuel and its surroundings.

That is, if there is only air around the fuel, the fuel immediate reacts with the oxygen in the air to burn. In this case, the temperature of the air away from the fuel does not rise that much. Only the temperature around the fuel locally becomes extremely high. That is, in this case, the air away from the fuel does not exhibit much of an endothermic action for the heat of combustion of the fuel. In this case, the combustion temperature becomes extremely high locally, so the unburned hydrocarbons receiving this heat of combustion produce soot.

On the other hand, when there is fuel present in a mixed gas of a large amount of inert gas and a small amount of air, the situation differs somewhat. In this case, the evaporated fuel diffuses in the surroundings and reacts with the oxygen mixed in the inert gas to burn. In this case, the heat of combustion is absorbed by the surrounding inert gas, so the combustion temperature does not rise that much. That is, it becomes possible to keep the heat of combustion low. That is, the presence of inert gas plays an important role in suppressing the heat of combustion. It becomes possible to keep the combustion temperature low by the endothermic action of the inert gas.

In this case, when controlling the gas temperature of the fuel and its surroundings to a temperature lower than the temperature where soot is produced, an amount of inert gas enough to absorb the amount of heat for this becomes necessary. Therefore, if the amount of fuel is increased, the amount of inert gas required increases along with this. Note that in this case, the larger the specific heat of the inert gas, the more powerful the endothermic action. Therefore, the inert gas is preferably a gas with a large specific heat. At this time, it can be said preferable to use $CO_2$ or EGR gas as the inert gas since they have relatively large specific heats.

FIG. 47 shows the relationship between the EGR rate and smoke when using EGR gas as the inert gas and changing the rate of cooling of the EGR gas. That is, in FIG. 47, the curve A shows the case of force cooling the EGR gas to maintain the temperature of the EGR gas at about 90° C., the curve B shows the case of cooling the EGR gas by a small sized cooling device, and the curve C shows the case when not force cooling the EGR gas.

As shown by the curve A of FIG. 47, when force cooling the EGR gas, the amount of production of soot peaks when the EGR rate is slightly lower than 50 percent. In this case, if the EGR rate is made at least 50 percent, almost no soot is produced any longer.

On the other hand, when cooling the EGR gas slightly as shown by the curve B of FIG. 47, the amount of production of soot peaks when the EGR rate is slightly higher than 50 percent. In this case, if the EGR rate is made least about 65 percent, almost no soot is produced any longer.

Further, as shown by the curve C of FIG. 47, when not force cooling the EGR gas, the amount of production of soot peaks near an EGR rate of 55 percent. In this case, if the EGR rate is made at least 70 percent, almost no soot is produced any longer.

Figure 48:
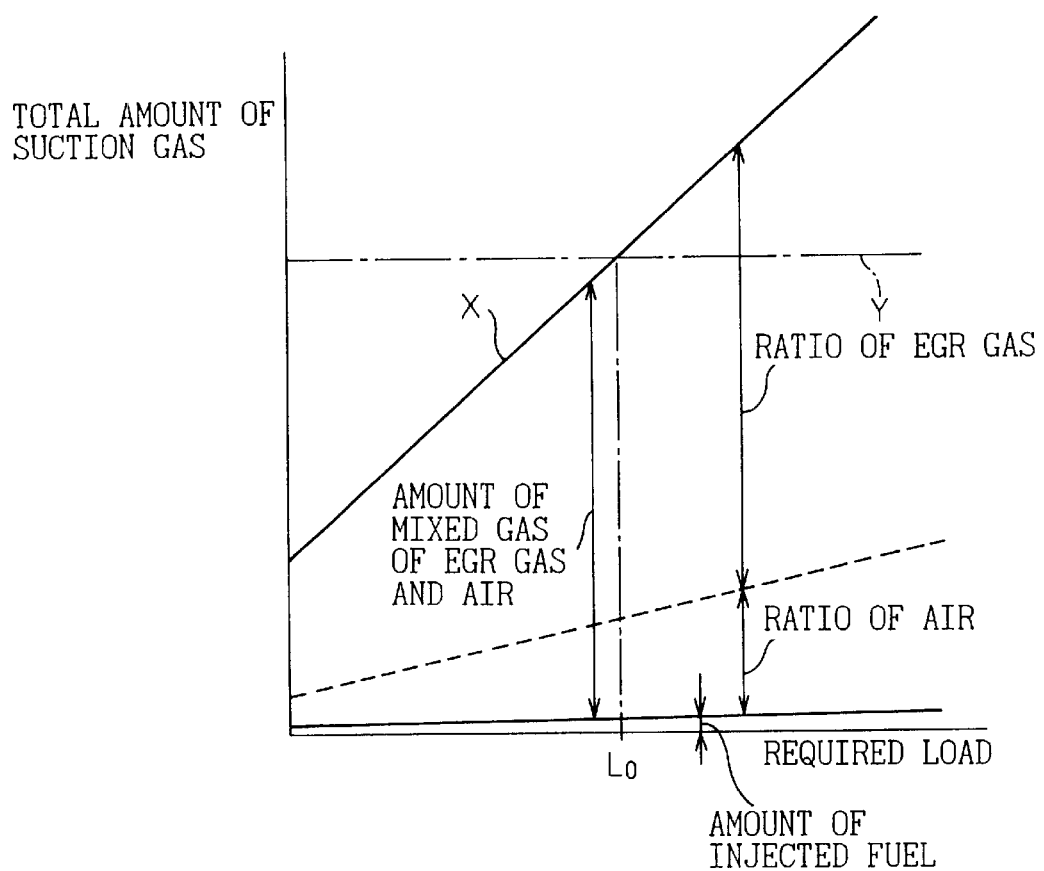
FIG. 48 is a view showing relationship between amount of fuel injection and amount of intake gas.

FIG. 48 shows the amount of mixed gas of the EGR gas and air, the ratio of air in this amount of mixed gas, and the ratio of EGR gas in this mixed gas necessary for making the gas temperature of the fuel and its surroundings at the time of combustion a temperature lower than the temperature where soot is produced in the case of using EGR gas as the inert gas. Note that in FIG. 48, the ordinate shows the total amount of suction gas taken into the combustion chamber of the combustion type heater, while the broken line Y shows the total amount of suction gas able to be taken into the combustion chamber of the combustion type heater when supercharging is not performed. Further, the abscissa shows the required torque.

Referring to FIG. 48, the ratio of air, that is, the amount of air in the mixed gas, shows the amount, of air required for making the fuel injected completely burn. That is, in the case shown in FIG. 48, the ratio of the amount of air and the amount of injected fuel becomes the stoichiometric air-fuel ratio. On the other hand, in FIG. 48, the ratio of the EGR gas, that is, the amount of EGR gas in the mixed gas, shows the minimum amount of EGR gas necessary for making the gas temperature of the fuel and its surroundings when injected fuel is made to burn a temperature lower than the temperature where soot is formed. This amount of EGR gas is at least about 55 percent if expressed by the EGR rate. In the embodiment shown in FIG. 48, it is at least 70 percent. That is, if the total amount of intake gas sucked into the combustion chamber of the combustion type heater is made the solid line X in FIG. 48 and the ratio of the amount of air and the amount of EGR gas in the total amount of intake gas x is made the ratio as shown in FIG. 48, the gas temperature of the fuel and its surroundings becomes a temperature lower than the temperature where soot is produced and therefore no soot will be produced at all any longer. Further, the amount of production of $NO_x$ at this time is around 10 ppm or less, therefore the amount of production of $NO_x$ becomes an extremely small amount.

If the amount of fuel injection increases, the amount of heat generated when the fuel burns increases, so to maintain the gas temperature of the fuel and its surroundings at a temperature lower than the temperature where soot is produced, it is necessary to increase the amount of absorption of heat by the EGR gas. Therefore, as shown in FIG. 48, the amount of EGR gas has to be made to increase along with an increase of the amount of injected fuel. That is, the amount of EGR gas has to be increased along with the rise in the required torque. Note that when supercharging is not being performed, the upper limit of the total amount of intake gas X sucked into the combustion chamber of the combustion type heater is Y.

As explained above, FIG. 48 shows the case of causing the fuel to burn under a stoichiometric air-fuel ratio, but even if making the amount of air smaller than the amount of air shown in FIG. 48, that is, even if making the air-fuel ratio rich, it is possible to reduce the amount of production of $NO_x$ to around 10 ppm or less while preventing the production of soot. Further, even if making the amount of air more than the amount of air shown in FIG. 48, that is, even if making the average value of the air-fuel ratio a lean 17 to 18, it is possible to reduce the amount of production of $NO_x$ to around 10 ppm or less while preventing the production of soot.

That is, if the air-fuel ratio is made rich, the fuel becomes in excess, but since the combustion temperature is suppressed to a low temperature, the excessive fuel does not grow into soot and therefore soot is not produced. Further, at this time, only an extremely small amount of $NO_x$ as well is produced. On the other hand, even when the average air-fuel ratio is lean or the air-fuel ratio is the stoichiometric air-fuel ratio, if the combustion temperature becomes high, a small amount of soot is produced, but in the present invention, the combustion temperature is suppressed to a low temperature, so no soot at all is produced. Further, only an extremely small amount of $NO_x$ is also produced.

When low temperature combustion is performed in this way, regardless of the air-fuel ratio, that is, whether the air-fuel ratio is rich, whether it is the stoichiometric air-fuel ratio, or whether the average air-fuel ratio is lean, soot is not produced and the amount of $NO_x$ produced becomes extremely small. Therefore, if considering the improvement of the fuel efficiency, it can be said to be preferable to make the average air-fuel ratio lean.

However, the gas temperature of the fuel and its surroundings at the time of combustion in the combustion chamber can be suppressed to not more than the temperature where growth of the hydrocarbons stops midway only at the time of medium and low load operation of the combustion type heater where the amount of heat generated due to the combustion is relatively small. Therefore, in this embodiment, at the time of high load operation of the combustion type heater, first combustion, that is, the conventionally normally performed combustion is performed, while at the time of medium and low load operation of the combustion type heater, the gas temperature of the fuel at its surroundings at the time of combustion is suppressed to below the temperature where growth of the hydrocarbons stops midway and second combustion, that is, low temperature combustion, is performed.

In actuality, the load required on the combustion type heater is relatively small, so second combustion, that is, low temperature combustion, can be performed in almost all of the operating regions.

Note that here, the second combustion, that is, the low temperature combustion, as clear from the explanation up to here, means combustion where the amount of inert gas in the combustion chamber is greater than the amount of inert gas where the amount of production of soot peaks and almost no soot is produced, while the first combustion, that is, the conventionally normally performed combustion, means combustion where the amount of inert gas in the combustion chamber is smaller than the amount of inert gas where the amount of production of soot peaks. Further, the normal combustion, that is, the normally performed combustion, is combustion controlled based on the required torque of the internal combustion engine and the engine speed.

Figure 49A:
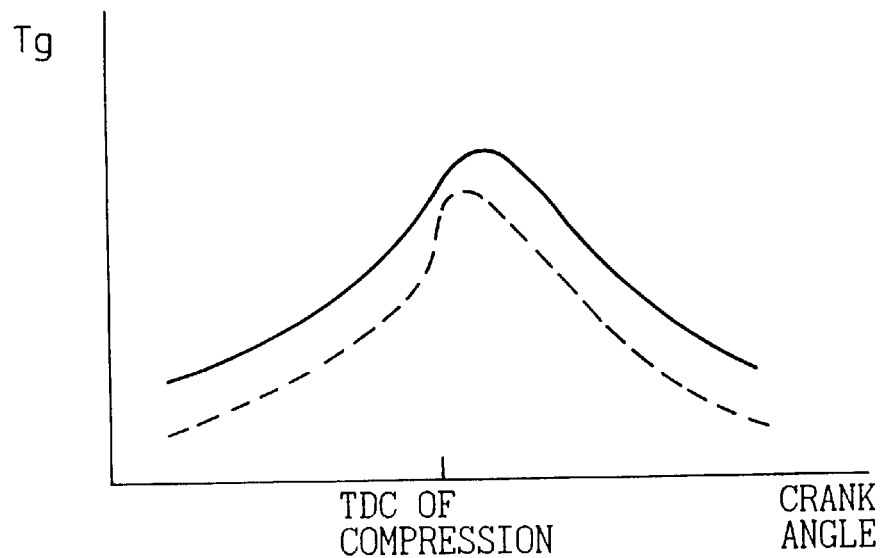
FIGS. 49A and 49B are views for explaining temperature of exhaust gas emitted at the time of low temperature combustion.
Figure 49B:
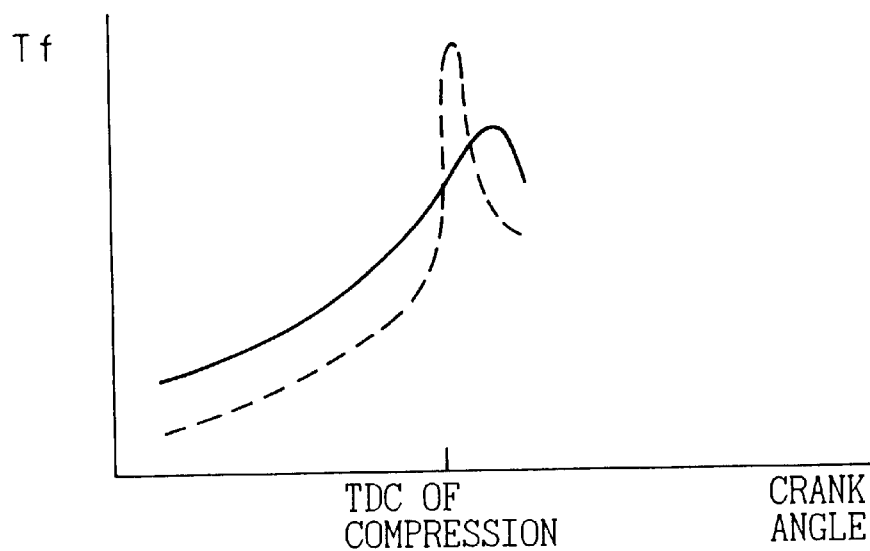

Note that the reason why the temperature of the exhaust gas emitted from the combustion type heater when low temperature combustion is being performed is higher than the temperature of the exhaust gas emitted from the combustion type heater when normal combustion is being performed is as follows. The solid line in FIG. 49A shows the relationship between the average gas temperature Tg in the combustion chamber when low temperature combustion is being performed and the crank angle, while the broken line in FIG. 49A shows the relationship between the average gas temperature Tg in the combustion chamber when normal combustion is being performed and the crank angle. Further, the solid line in FIG. 49B shows the relationship between the gas temperature Tf of the fuel and its surroundings when low temperature combustion is being performed and the crank angle, while the broken line in FIG. 49B shows the relationship between the gas temperature Tf of the fuel and its surroundings when normal combustion is being performed and the crank angle.

When low temperature combustion is being performed, compared with when normal combustion is being performed, the amount of EGR gas is greater, therefore, as shown in FIG. 49A, before top dead center of the compression stroke, that is, during the compression stroke, the average gas temperature Tg at the time of low temperature combustion shown by the solid line becomes higher than the average gas temperature Tg at the time of normal combustion shown by the broken line. Note that at this time, as shown in FIG. 49B, the gas temperature Tf of the fuel and its surroundings becomes a temperature substantially equal to the average gas temperature Tg.

Next, combustion is started near top dead center of the compression stroke. In this case, when low temperature combustion is being performed, the gas temperature Tf of the fuel and its surroundings will not become that high as shown by the solid line in FIG. 49B. As opposed to this, in the case where ordinary combustion is being performed, there is a large amount of oxygen present around the fuel, so the gas temperature Tf of the fuel and its surroundings becomes extremely high as shown by the broken line of FIG. 49B. In this way, when normal combustion is being performed, the gas temperature Tf of the fuel and its surroundings becomes considerably higher than when low temperature combustion is being performed, but the temperature of the other gas, which accounts for the majority, becomes lower when normal combustion is being performed compared with when low temperature combustion is being performed. Therefore, as shown in FIG. 49A, the average gas temperature Tg in the combustion chamber near top dead center of the compression stroke becomes higher when low temperature combustion is being performed compared with when normal combustion is being performed. As a result, as shown in FIG. 49A, the average gas temperature in the combustion chamber after combustion is completed becomes higher when low temperature combustion is being performed compared with when normal combustion is being performed and therefore the temperature of the exhaust gas becomes higher when low temperature combustion is performed.

Therefore, the low temperature combustion can be said to be combustion emitting from the combustion chamber exhaust gas of a temperature higher than the temperature of the exhaust gas emitted from the combustion chamber at the time of normal combustion (normal engine operation).

[Effects of the Invention]

According to the present invention, in the state where the amount of engine exhaust gas flowing into a particulate filter is made small, the temperature of the particulate filter is made to rise by the exhaust gas from the combustion device, and the temperature of the particulate filter is maintained higher than the particulate continuous oxidation temperature in the $NO_x$ reduction temperature range. Here, the exhaust gas emitted from the combustion device of the present invention has a higher temperature elevation capability for making the temperature of the particulate filter rise than the temperature elevation capability of the engine exhaust gas. Therefore, according to the present invention, compared with the case of making the temperature of the particulate filter rise by engine exhaust gas, it is possible to make the temperature of the particulate filter rise quicker. Further, according to the present invention, when feeding exhaust gas to the particulate filter from the combustion device so as to make the temperature of the particulate filter rise, the amount of the engine exhaust gas flowing into the particulate filter is reduced. Therefore, according to the present invention, the amount of heat robbed from the particulate filter by the engine exhaust gas is small, so due to this as well it is possible to make the temperature of the particulate filter quickly rise. Therefore, the particulate oxidation removal level and $No_x$ purification level of the exhaust gas purification device of the present invention are enhanced overall.

What is claimed is:

1. An exhaust gas purification device of an internal combustion engine provided with a pair of particulate filters arranged in parallel in an engine exhaust passage, an exhaust flow switching means for switching almost all of the engine exhaust gas emitted from an engine to cause it to flow into one of the particulate filters, and a combustion device for feeding to a particulate filter an exhaust gas having a higher temperature elevation capability than a temperature elevation capability of an engine exhaust gas able to cause the temperature of the particulate filters to rise, an $NO_x$ catalyst able to absorb $NO_x$ in the exhaust gas when an air-fuel ratio of the inflowing exhaust gas is lean and to release the absorbed $NO_x$ when the air-fuel ratio of the inflowing exhaust gas becomes rich so as to enable the $NO_x$ to be reduced and purified by hydrocarbons in the exhaust gas and an oxidizing substance able to continuously oxidize and remove particulate being carried in the particulate filters, said $NO_x$ catalyst being able to release and reduce $NO_x$ when its temperature is in an $NO_x$ reduction temperature range, and said oxidizing substance being able to continuously oxidize and remove almost all inflowing particulate when the temperature of said oxidizing substance is higher than a particulate continuous oxidation temperature, said exhaust gas purification device of an internal combustion engine characterized by being provided with a reduction judging means for judging if the $NO_x$ absorbed in the $NO_x$ catalyst should be reduced, suppressing by said exhaust flow switching means the inflow of engine exhaust gas to the one of the particulate filters carrying the $NO_x$ catalyst for which it is judged the $NO_x$ absorbed in the $NO_x$ catalyst should be reduced when it is judged by said reduction judging means that the $NO_x$ absorbed in the NC should be reduced, and feeding rich air-fuel ratio exhaust gas to said particulate filter from a combustion device so that the temperature of said particulate filter is maintained higher the particulate continuous oxidation temperature in a $NO_x$ reduction temperature range.

2. An exhaust gas purification device of an internal combustion engine as set forth in claim 1, characterized by suppressing the inflow of engine exhaust gas to a particulate filter by said exhaust flow switching means when it is judged by said reduction judging means the $NO_x$ absorbed in the $NO_x$ catalyst should be reduced and when the temperature of the one of the particulate filters carrying the $NO_x$ catalyst for which it is judged that said $NO_x$ should be reduced is lower than a low temperature of the $NO_x$ reduction temperature range, feeding a rich air-fuel ratio exhaust gas having a concentration of oxygen higher than a predetermined concentration from said combustion device to said particulate filter to raise the temperature of said particulate filter to within the $NO_x$ reduction temperature range when the temperature of said combustion device is lower than said predetermined concentration, and feeding to said particulate filter a rich air-fuel ratio exhaust gas having a concentration of oxygen lower than said predetermined concentration from said combustion device when the temperature of said particulate filter becomes in the $NO_x$ reduction temperature range.

3. An exhaust gas purification device of an internal combustion engine as set forth in claim 1, characterized by, when it is judged by said reduction judging means that the $NO_x$ absorbed in the $NO_x$ catalyst should be reduced, suppressing the inflow of engine exhaust gas to the one of the particulate filters provided with the $NO_x$ for which it is judged said $NO_x$ should be reduced and feeding lean air-fuel ratio exhaust gas from said combustion device to said particulate filter to make the temperature of said particulate filter rise to within the $NO_x$ reduction temperature range when the temperature of said one particulate filter is lower than the low temperature of the $NO_x$ reduction temperature range and feeding rich air-fuel ratio exhaust gas from said combustion device to said particulate filter when the temperature of said particulate filter becomes within the $NO_x$ reduction temperature range.

4. An exhaust gas purification device of an internal combustion engine as set forth in claim 1, characterized by feeding lean air-fuel ratio exhaust gas from said combustion device to said particulate filter when the reduction of the $NO_x$ absorbed in the $NO_x$ catalyst is completed.

5. An exhaust gas purification device of an internal combustion engine as set forth in claim 1, characterized by being provided with an air-fuel ratio sensor able to detect the air-fuel ratio of the exhaust gas flowing out from a particulate filter and controlling the air-fuel ratio of the exhaust gas being fed from said combustion device to said particulate filter based on the output of said air-fuel ratio sensor.

6. An exhaust gas purification device of an internal combustion engine as set forth in claim 1, characterized by suppressing the inflow of engine exhaust gas to one of the particulate filters by said exhaust flow switching means at the time of engine startup and feeding exhaust gas from said combustion device to said one particulate filter to make the temperature of said one particulate filter rise.

7. An exhaust gas purification device of an internal combustion engine as set forth in claim 6, characterized by being provided with an engine operation controlling means for selectively executing a first engine operation where the engine operation is controlled based on a required torque and engine speed and a second engine operation where an engine exhaust gas having a temperature higher than the temperature of the engine exhaust gas emitted from the engine when said first engine operation is executed is made to be emitted from the engine and by executing second engine operation control by said engine operation controlling means to make the temperature of the other particulate filter rise at the time of engine startup.

8. An exhaust gas purification device of an internal combustion engine as set forth in claim 1, characterized by having said $NO_x$ catalyst able to absorb a sulfur ingredient in the exhaust gas when the air-fuel ratio of the inflowing exhaust gas is lean and to release the absorbed sulfur ingredient when the air-fuel ratio of the inflowing exhaust gas becomes rich and its temperature is higher than a sulfur ingredient release temperature where the absorbed sulfur ingredient can be released; being provided with a sulfur ingredient release judging means for judging whether the sulfur ingredient absorbed in the $NO_x$ catalyst should be released from the $NO_x$ catalyst; causing the temperature of said particulate filter to rise to a sulfur ingredient release temperature when it is judged by said sulfur ingredient release judging means that the sulfur ingredient absorbed in the $NO_x$ catalyst should be released and the temperature of the one of the particulate filters for which it is judged that the sulfur ingredient should be released is lower than a sulfur ingredient release temperature and suppressing the inflow of engine exhaust gas to said particulate filter by said exhaust flow switching means and feeding rich air-fuel ratio exhaust gas from said combustion device to said particulate filter when the temperature of said particulate filter reaches the sulfur ingredient release temperature.

9. An exhaust gas purification device of an internal combustion engine as set forth in claim 8, characterized by being provided with an engine operation controlling means for selectively executing a first engine operation where engine operation is controlled based on a required torque and engine speed and a second engine operation for making the engine emit an engine exhaust gas having a temperature higher than the temperature of the engine exhaust gas emitted from the engine when said first engine operation is executed and by executing the second engine operation by said engine operation controlling means so as to make the temperature of the one of the particulate filters for which it is judged that said sulfur ingredient should be released rise to the sulfur ingredient release temperature when it is judged by said sulfur ingredient release judging means that the sulfur ingredient absorbed in the $NO_x$ catalyst should be released.

10. An exhaust gas purification device of an internal combustion engine as set forth in claim 1, characterized by having said $NO_x$ catalyst able to absorb a sulfur ingredient in the exhaust gas when the air-fuel ratio of the inflowing exhaust gas is lean and to release the absorbed sulfur ingredient when the air-fuel ratio of the inflowing exhaust gas becomes rich and its temperature is higher than a sulfur ingredient release temperature where the absorbed sulfur ingredient can be released; being provided with a sulfur ingredient release judging means for judging whether the sulfur ingredient absorbed in the $NO_x$ catalyst should be released from the $NO_x$ catalyst; causing the temperature of said particulate filter to rise to a sulfur ingredient release temperature when it is judged by said sulfur ingredient release judging means that the sulfur ingredient absorbed in the $NO_x$ catalyst should be released and the temperature of the one of the particulate filters for which it is judged that the sulfur ingredient should be released is lower than a sulfur ingredient release temperature and suppressing the inflow of engine exhaust gas to said particulate filter by said exhaust flow switching means and alternately feeding rich air-fuel ratio exhaust gas and lean air-fuel ratio exhaust gas from said combustion device to said particulate filter when the temperature of said particulate filter reaches the sulfur ingredient release temperature.

11. An exhaust gas purification device of an internal combustion engine as set forth in claim 10, characterized by maintaining the air-fuel ratio of the exhaust gas fed from said combustion device to the particulate filter lean when the sulfur ingredient is being released from the $NO_x$ catalyst and the engine speed becomes smaller than a predetermined value.

12. An exhaust gas purification device of an internal combustion engine as set forth in claim 1, characterized by having said combustion device take in engine exhaust gas and cause the fuel to burn by the oxygen in said engine exhaust gas.

13. An exhaust gas purification device of an internal combustion engine as set forth in claim 12, characterized by having an air feeding means for feeding air into the engine exhaust gas which said combustion device takes in.

14. An exhaust gas purification device of an internal combustion engine as set forth in claim 1, characterized by having said combustion device take in air and take in exhaust gas.

15. An exhaust gas purification device of an internal combustion engine as set forth in claim 14, characterized by having said combustion device take in exhaust gas flowing out from a particulate filter.

16. An exhaust gas purification device of an internal combustion engine as set forth in claim 1, characterized by being provided with outflow suppressing means for suppressing the outflow of exhaust gas from downstream of a particulate filter and by suppressing the output of exhaust gas to downstream of one of the particulate filters by said outflow suppressing means when suppressing the inflow of engine exhaust gas to said one of the particulate filters by said exhaust flow switching means.

17. An exhaust gas purification device of an internal combustion engine as set forth in claim 16, characterized by being provided with a pressure sensor for detecting a pressure in a particulate filter, detecting by a pressure sensor the pressure in one of the particulate filters when suppressing the inflow of engine exhaust gas to said one of the particulate filters by said exhaust flow switching means and suppressing the outflow of exhaust gas from downstream of said one of the particulate filters by said outflow suppressing means, and controlling the degree of suppression of outflow by said outflow suppressing means so that the pressure in said one of the particulate filters does not exceed a pressure so high as to inhibit operation of the combustion device.

18. An exhaust gas purification device of an internal combustion engine as set forth in claim 1, characterized by separately extending engine exhaust passages of a downstream side of the particulate filters over at least predetermined distances from said particulate filters and setting said predetermined distances to distances where the engine exhaust gas flowing out from the other of the particulate filters will not flow to one of the particulate filters from downstream when suppressing the inflow of engine exhaust gas to one of the particulate filters by said exhaust flow switching means so as to cause almost all of the engine exhaust gas to flow into the other of the particulate filters.

19. An exhaust gas purification device of an internal combustion engine as set forth in claim 1, characterized in that a check valve for preventing back flow of an exhaust gas from a particulate filter to the combustion device is arranged in an exhaust feed passage feeding exhaust gas from said combustion device to the particulate filter.

* * * * *